(12) United States Patent
Marcouiller et al.

(10) Patent No.: US 11,852,882 B2
(45) Date of Patent: Dec. 26, 2023

(54) PACKAGING ASSEMBLY FOR TELECOMMUNICATIONS EQUIPMENT

(71) Applicant: COMMSCOPE TECHNOLOGIES LLC, Hickory, NC (US)

(72) Inventors: Thomas Marcouiller, Shakopee, MN (US); Paula Lockhart, New Prague, MN (US); Michael J. Schomisch, Rosemount, MN (US); Tomas Fucsek, Brno-Slatina (CZ); Roman Solich, Hysly (CZ)

(73) Assignee: CommScope Technologies LLC, Hickory, NC (US)

( * ) Notice: Subject to any disclaimer, the term of this patent is extended or adjusted under 35 U.S.C. 154(b) by 737 days.

(21) Appl. No.: 16/976,172

(22) PCT Filed: Feb. 28, 2019

(86) PCT No.: PCT/US2019/020077
§ 371 (c)(1),
(2) Date: Aug. 27, 2020

(87) PCT Pub. No.: WO2019/169148
PCT Pub. Date: Sep. 6, 2019

(65) Prior Publication Data
US 2020/0409009 A1    Dec. 31, 2020

Related U.S. Application Data

(60) Provisional application No. 62/663,778, filed on Apr. 27, 2018, provisional application No. 62/636,556, filed on Feb. 28, 2018.

(51) Int. Cl.
*G02B 6/44*    (2006.01)
*B65H 49/28*    (2006.01)
(Continued)

(52) U.S. Cl.
CPC .......... *G02B 6/4457* (2013.01); *B65H 49/28* (2013.01); *B65H 57/02* (2013.01); *B65H 75/14* (2013.01);
(Continued)

(58) Field of Classification Search
CPC ........ G02B 6/44; G02B 6/4457; B65H 49/28; B65H 57/02; B65H 2701/32; B65H 2701/536
See application file for complete search history.

(56) References Cited

U.S. PATENT DOCUMENTS 2,805,106 A     9/1957   Penkala
2,864,656 A     12/1958  Yorinks
(Continued)

FOREIGN PATENT DOCUMENTS

AU    40995/85 A    4/1985
AU    55314/86 A    3/1986
(Continued)

OTHER PUBLICATIONS

International Search Report and Written Opinion of the International Searching Authority for International Patent Application No. PCT/US2019/020077 dated Jun. 14, 2019, 16 pages.
(Continued)

*Primary Examiner* — Tina M Wong
(74) *Attorney, Agent, or Firm* — Merchant & Gould P.C.

(57) ABSTRACT

A packaging assembly for telecommunications modules comprises a plurality of telecommunications modules provided in a stacked arrangement in a first container, a plurality of telecommunications modules provided in a stacked arrangement in an adjacent second container, and a removable radius limiter mounted between the first and second
(Continued)

containers for guiding all of the fiber optic cabling extending from the telecommunications modules with minimum bend radius protection.

14 Claims, 49 Drawing Sheets

(51) Int. Cl.
 *B65H 57/02* (2006.01)
 *B65H 75/04* (2006.01)
 *B65H 75/14* (2006.01)

(52) U.S. Cl.
 CPC .... *B65H 2701/32* (2013.01); *B65H 2701/536* (2013.01)

(56) References Cited

U.S. PATENT DOCUMENTS

| | | | |
|---|---|---|---|
| 3,901,564 A | 8/1975 | Armstrong |
| 4,070,076 A | 1/1978 | Zwillinger |
| 4,172,625 A | 10/1979 | Swain |
| 4,359,262 A | 1/1982 | Dolan |
| 4,320,934 A | 3/1982 | Röck et al. |
| 4,373,776 A | 2/1983 | Purdy |
| 4,494,806 A | 1/1985 | Williams et al. |
| 4,502,754 A | 3/1985 | Kawa |
| 4,585,303 A | 4/1986 | Pinsard et al. |
| 4,595,255 A | 6/1986 | Bhatt et al. |
| 4,630,886 A | 12/1986 | Lauriello et al. |
| 4,697,874 A | 10/1987 | Nozick |
| 4,699,455 A | 10/1987 | Erbe et al. |
| 4,708,430 A | 11/1987 | Donaldson et al. |
| 4,717,231 A | 1/1988 | Dewez et al. |
| 4,737,039 A | 4/1988 | Sekerich |
| 4,765,710 A | 8/1988 | Burmeister et al. |
| 4,792,203 A | 12/1988 | Nelson et al. |
| 4,820,007 A | 4/1989 | Ross et al. |
| 4,840,449 A | 6/1989 | Ghandeharizadeh |
| 4,898,448 A | 2/1990 | Cooper |
| 4,971,421 A | 11/1990 | Ori |
| 4,986,762 A | 1/1991 | Keith |
| 4,995,688 A | 2/1991 | Anton et al. |
| 5,024,498 A | 6/1991 | Becker et al. |
| 5,066,149 A | 11/1991 | Wheeler et al. |
| 5,067,678 A | 11/1991 | Henneberger et al. |
| 5,067,784 A | 11/1991 | Debertoli et al. |
| 5,071,211 A | 12/1991 | Debortoli et al. |
| 5,100,221 A | 3/1992 | Carney et al. |
| 5,127,082 A | 6/1992 | Below et al. |
| 5,129,030 A | 7/1992 | Petrunia |
| 5,138,688 A | 8/1992 | Debortoli |
| 5,142,606 A | 8/1992 | Carney et al. |
| 5,142,607 A | 8/1992 | Petrotta et al. |
| 5,167,001 A | 11/1992 | Debortoli et al. |
| 5,174,675 A | 12/1992 | Martin |
| 5,240,209 A | 8/1993 | Kutsch |
| 5,247,603 A | 9/1993 | Vidacovich et al. |
| 5,275,064 A | 1/1994 | Hobbs |
| 5,285,515 A | 2/1994 | Milanowski et al. |
| 5,289,558 A | 2/1994 | Teichler et al. |
| 5,316,243 A | 5/1994 | Henneberger |
| 5,323,480 A | 6/1994 | Mullaney et al. |
| 5,335,349 A | 8/1994 | Kutsch et al. |
| 5,339,379 A | 8/1994 | Kutsch et al. |
| 5,353,367 A | 10/1994 | Czosnowski et al. |
| 5,363,466 A | 11/1994 | Milanowskki et al. |
| 5,363,467 A | 11/1994 | Keith |
| 5,402,515 A | 3/1995 | Vidacovich et al. |
| 5,412,751 A | 5/1995 | Siemon et al. |
| 5,430,823 A | 7/1995 | Dupont et al. |
| 5,438,641 A | 8/1995 | Malacame |
| 5,446,822 A | 8/1995 | Keith |
| 5,490,229 A | 2/1996 | Ghanderharizadeh et al. |
| 5,497,444 A | 3/1996 | Wheeler |
| 5,509,096 A | 4/1996 | Easley |
| 5,511,144 A | 4/1996 | Hawkins et al. |
| 5,530,783 A | 6/1996 | Belopolsky et al. |
| 5,570,450 A | 10/1996 | Fernandez et al. |
| 5,613,030 A | 3/1997 | Hoffer et al. |
| 5,640,481 A | 6/1997 | Llewellyn et al. |
| 5,655,044 A | 8/1997 | Finzel et al. |
| 5,717,810 A | 2/1998 | Wheeler |
| 5,717,811 A | 2/1998 | Macken |
| 5,724,469 A | 3/1998 | Orlando |
| 5,802,237 A | 9/1998 | Pulido |
| 5,811,055 A | 9/1998 | Geiger |
| 5,836,148 A | 11/1998 | Fukao |
| 5,882,100 A | 3/1999 | Rock |
| 5,887,106 A | 3/1999 | Cheeseman et al. |
| 5,917,984 A | 6/1999 | Röseler et al. |
| 5,923,753 A | 7/1999 | Haataja et al. |
| 5,946,440 A | 8/1999 | Puetz |
| 5,966,492 A | 10/1999 | Bechamps et al. |
| 5,971,626 A | 10/1999 | Knodell et al. |
| 5,975,769 A | 11/1999 | Larson et al. |
| 5,978,540 A | 11/1999 | Bechamps et al. |
| 6,009,224 A | 12/1999 | Allen |
| 6,022,150 A | 2/2000 | Erdman et al. |
| 6,027,252 A | 2/2000 | Erdman et al. |
| 6,044,194 A | 3/2000 | Meyerhoefer |
| 6,076,908 A | 6/2000 | Maffeo |
| 6,099,224 A | 8/2000 | Uchida et al. |
| 6,215,938 B1 | 4/2001 | Reitmeier et al. |
| 6,226,436 B1 | 5/2001 | Daoud et al. |
| 6,236,795 B1 | 5/2001 | Rodgers |
| 6,263,141 B1 | 7/2001 | Smith |
| 6,269,214 B1 | 7/2001 | Naudin et al. |
| 6,301,424 B1 | 10/2001 | Hwang |
| 6,360,050 B1 | 3/2002 | Moua et al. |
| 6,377,722 B1 | 4/2002 | Hoekstra |
| 6,438,310 B1 | 8/2002 | Lance et al. |
| 6,439,523 B1 | 8/2002 | Chandler et al. |
| 6,480,660 B1 | 11/2002 | Reitmeier et al. |
| 6,496,638 B1 | 12/2002 | Andersen |
| 6,504,988 B1 | 1/2003 | Trebesch et al. |
| 6,591,051 B2 | 7/2003 | Solheid et al. |
| 6,594,434 B1 | 7/2003 | Davidson et al. |
| 6,600,866 B2 | 7/2003 | Gatica et al. |
| 6,612,515 B1 | 9/2003 | Tinucci et al. |
| 6,625,374 B2 | 9/2003 | Holman et al. |
| RE38,311 E | 11/2003 | Burmeister et al. |
| 6,677,520 B1 | 1/2004 | Kim et al. |
| 6,711,339 B2 | 3/2004 | Puetz et al. |
| 6,715,619 B2 | 4/2004 | Kim et al. |
| 6,738,555 B1 | 5/2004 | Cooke et al. |
| 6,748,155 B2 | 6/2004 | Kim et al. |
| 6,768,860 B2 | 7/2004 | Liberty |
| 6,796,437 B2 | 9/2004 | Krampotich et al. |
| 6,804,447 B2 | 10/2004 | Smith et al. |
| 6,809,258 B1 | 10/2004 | Dang et al. |
| 6,810,193 B1 | 10/2004 | Müller |
| 6,819,857 B2 | 11/2004 | Douglas et al. |
| 6,845,208 B2 | 1/2005 | Thibault et al. |
| 6,850,685 B2 | 2/2005 | Tinucci et al. |
| 6,865,331 B2 | 3/2005 | Mertesdorf |
| 6,915,057 B2 | 7/2005 | Vincent et al. |
| 6,925,241 B2 | 8/2005 | Bohle et al. |
| 6,934,457 B2 | 8/2005 | Vincent et al. |
| 6,937,807 B2 | 8/2005 | Franklin et al. |
| 6,944,383 B1 | 9/2005 | Herzog et al. |
| 6,945,620 B2 | 9/2005 | Lam et al. |
| 6,968,111 B2 | 11/2005 | Trebesch et al. |
| 6,981,750 B2 | 1/2006 | Krampotich |
| 7,006,748 B2 | 2/2006 | Dagley et al. |
| 7,068,907 B2 | 6/2006 | Schray |
| 7,079,744 B2 | 7/2006 | Douglas et al. |
| 7,116,777 B2 | 10/2006 | Knudsen et al. |
| 7,120,348 B2 | 10/2006 | Trebesch et al. |
| 7,171,099 B2 | 1/2007 | Barnes et al. |
| 7,231,125 B2 | 6/2007 | Douglas et al. |
| 7,274,852 B1 | 9/2007 | Smrha et al. |
| 7,302,153 B2 | 11/2007 | Thom |
| 7,302,154 B2 | 11/2007 | Trebesch et al. |

(56) References Cited

U.S. PATENT DOCUMENTS

| | | |
|---|---|---|
| 7,308,184 B2 | 12/2007 | Barnes et al. |
| 7,362,942 B2 | 4/2008 | Beck |
| 7,367,823 B2 | 5/2008 | Rapp et al. |
| 7,373,031 B2 | 5/2008 | Wang et al. |
| 7,373,071 B2 | 5/2008 | Douglas et al. |
| 7,397,996 B2 | 7/2008 | Herzog et al. |
| 7,406,240 B2 | 7/2008 | Murano |
| 7,409,137 B1 | 8/2008 | Barnes |
| 7,418,182 B2 | 8/2008 | Krampotich |
| 7,437,049 B2 | 10/2008 | Krampotich |
| 7,454,113 B2 | 11/2008 | Barnes |
| 7,457,504 B2 | 11/2008 | Smrha et al. |
| 7,460,757 B2 | 12/2008 | Hoehne et al. |
| 7,463,811 B2 | 12/2008 | Trebesch et al. |
| 7,480,438 B2 | 1/2009 | Douglas et al. |
| 7,496,268 B2 | 2/2009 | Escoto et al. |
| 7,499,623 B2 | 3/2009 | Barnes et al. |
| 7,567,744 B2 | 7/2009 | Krampotich et al. |
| 7,570,860 B2 | 8/2009 | Smrha et al. |
| 7,570,861 B2 | 8/2009 | Smrha et al. |
| 7,599,599 B2 | 10/2009 | Herzog et al. |
| 7,664,361 B2 | 2/2010 | Trebesch et al. |
| 7,689,089 B2 | 3/2010 | Wagner et al. |
| 7,706,656 B2 | 4/2010 | Zimmel |
| 7,715,681 B2 | 5/2010 | Krampotich et al. |
| 7,747,125 B1 | 6/2010 | Lee et al. |
| RE41,460 E | 7/2010 | Wheeler |
| 7,751,674 B2 | 7/2010 | Hill |
| 7,764,859 B2 | 7/2010 | Krampotich et al. |
| 7,856,166 B2 | 12/2010 | Biribuze et al. |
| 7,869,683 B2 | 1/2011 | Barnes et al. |
| 7,876,993 B2 | 1/2011 | Krampotich et al. |
| 7,889,961 B2 | 2/2011 | Cote et al. |
| 7,945,135 B2 | 5/2011 | Cooke et al. |
| 7,945,138 B2 | 5/2011 | Hill et al. |
| 7,978,957 B2 | 7/2011 | Sano et al. |
| 8,027,558 B2 | 9/2011 | Barnes et al. |
| 8,041,175 B2 | 10/2011 | Krampotich et al. |
| 8,059,932 B2 | 11/2011 | Hill et al. |
| 8,078,030 B2 | 12/2011 | Trebesch et al. |
| 8,165,442 B2 | 4/2012 | Burek |
| 8,179,684 B2 | 5/2012 | Smrha et al. |
| 8,195,022 B2 | 6/2012 | Coburn et al. |
| 8,285,104 B2 | 10/2012 | Davis et al. |
| 8,374,477 B2 | 2/2013 | Hill |
| 8,433,171 B2 | 4/2013 | Cooke et al. |
| 8,452,148 B2 | 5/2013 | Cooke et al. |
| 8,452,149 B2 | 5/2013 | Krampotich et al. |
| 8,526,774 B2 | 9/2013 | Krampotich et al. |
| 8,559,785 B2 | 10/2013 | Barlowe et al. |
| 8,600,208 B2 | 12/2013 | Badar et al. |
| 8,639,081 B2 | 1/2014 | Barnes et al. |
| 8,655,136 B2 | 2/2014 | Trebesch et al. |
| 8,690,593 B2 | 4/2014 | Anderson et al. |
| 8,705,926 B2 | 4/2014 | Giraud et al. |
| 8,731,361 B2 | 5/2014 | Anderson et al. |
| 9,020,320 B2 | 4/2015 | Cooke et al. |
| 9,075,217 B2 | 7/2015 | Giraud et al. |
| 9,494,757 B2 | 11/2016 | Schomisch et al. |
| 9,519,119 B2 | 12/2016 | Solheid et al. |
| 9,563,031 B2 | 2/2017 | Loeffelholz et al. |
| 9,581,780 B2 | 2/2017 | Kowalczyk et al. |
| 10,082,636 B2 | 9/2018 | Solheid et al. |
| 2001/0001270 A1 | 5/2001 | Williams Vigliaturo |
| 2002/0125800 A1* | 9/2002 | Knudsen .............. G02B 6/4452 312/223.6 |
| 2002/0159746 A1 | 10/2002 | Howell et al. |
| 2002/0181922 A1 | 12/2002 | Xin et al. |
| 2003/0007767 A1 | 1/2003 | Douglas et al. |
| 2003/0128951 A1 | 7/2003 | Lecomte et al. |
| 2003/0165315 A1 | 9/2003 | Trebesch et al. |
| 2003/0174996 A1 | 9/2003 | Henschel et al. |
| 2003/0190035 A1 | 10/2003 | Knudsen et al. |
| 2004/0011750 A1 | 1/2004 | Kim et al. |
| 2004/0013390 A1 | 1/2004 | Kim et al. |
| 2004/0033027 A1 | 2/2004 | Pang et al. |
| 2004/0136676 A1 | 7/2004 | Mertesdorf |
| 2004/0175090 A1 | 9/2004 | Vastmans et al. |
| 2004/0227443 A1 | 11/2004 | Sandoval |
| 2004/0228582 A1 | 11/2004 | Yamada et al. |
| 2004/0258384 A1 | 12/2004 | Trebesch et al. |
| 2005/0025444 A1 | 2/2005 | Barnes et al. |
| 2005/0058421 A1 | 3/2005 | Dagley et al. |
| 2005/0078929 A1 | 4/2005 | Iwanek |
| 2005/0100301 A1 | 5/2005 | Solheid et al. |
| 2005/0111809 A1 | 5/2005 | Giraud et al. |
| 2005/0123261 A1 | 6/2005 | Bellekens et al. |
| 2006/0093302 A1 | 5/2006 | Solheid et al. |
| 2006/0116084 A1 | 6/2006 | Miki et al. |
| 2006/0193586 A1 | 8/2006 | Hoehne et al. |
| 2006/0269206 A1 | 11/2006 | Zimmel |
| 2006/0275008 A1 | 12/2006 | Xin |
| 2007/0003204 A1 | 1/2007 | Saravanos et al. |
| 2007/0031099 A1 | 2/2007 | Herzog et al. |
| 2007/0036503 A1 | 2/2007 | Solheid et al. |
| 2007/0047893 A1 | 3/2007 | Kramer et al. |
| 2007/0058918 A1 | 3/2007 | Trebesch et al. |
| 2007/0201806 A1 | 8/2007 | Douglas et al. |
| 2008/0063350 A1 | 3/2008 | Trebesch et al. |
| 2008/0080828 A1 | 4/2008 | Leon et al. |
| 2008/0124038 A1 | 5/2008 | Kowalczyk et al. |
| 2008/0169116 A1 | 7/2008 | Mullaney et al. |
| 2008/0175550 A1 | 7/2008 | Coburn et al. |
| 2008/0205843 A1 | 8/2008 | Castonguay et al. |
| 2009/0067800 A1 | 3/2009 | Vazquez et al. |
| 2009/0067802 A1 | 3/2009 | Hoehne et al. |
| 2009/0097813 A1 | 4/2009 | Hill |
| 2009/0129033 A1 | 5/2009 | Smrha et al. |
| 2009/0136196 A1 | 5/2009 | Trebesch et al. |
| 2009/0214171 A1 | 8/2009 | Coburn et al. |
| 2009/0226142 A1 | 9/2009 | Barnes |
| 2009/0245743 A1 | 10/2009 | Cote et al. |
| 2009/0274430 A1 | 11/2009 | Krampotich et al. |
| 2009/0274431 A1 | 11/2009 | Krampotich et al. |
| 2010/0061693 A1 | 3/2010 | Bran de Leon et al. |
| 2010/0129043 A1 | 5/2010 | Cooke et al. |
| 2010/0142910 A1 | 6/2010 | Hill et al. |
| 2010/0158465 A1 | 6/2010 | Smrha |
| 2010/0150518 A1 | 7/2010 | Leon et al. |
| 2010/0183276 A1 | 7/2010 | Smith |
| 2010/0189403 A1 | 7/2010 | Keith et al. |
| 2010/0195968 A1 | 8/2010 | Trebesch et al. |
| 2010/0266253 A1 | 10/2010 | Krampotich et al. |
| 2010/0310225 A1 | 12/2010 | Anderson et al. |
| 2010/0316346 A1 | 12/2010 | Krampotich et al. |
| 2010/0322578 A1 | 12/2010 | Cooke et al. |
| 2010/0322580 A1 | 12/2010 | Beamon et al. |
| 2011/0018809 A1 | 1/2011 | Nochi et al. |
| 2011/0123165 A1 | 5/2011 | Barth et al. |
| 2011/0188809 A1 | 8/2011 | LeBlanc et al. |
| 2011/0206336 A1 | 8/2011 | Krampotich et al. |
| 2011/0211799 A1 | 9/2011 | Conner et al. |
| 2011/0217016 A1 | 9/2011 | Mullsteff |
| 2011/0267742 A1 | 11/2011 | Togami et al. |
| 2011/0267794 A1 | 11/2011 | Anderson et al. |
| 2011/0268404 A1 | 11/2011 | Cote et al. |
| 2011/0268407 A1 | 11/2011 | Cowen et al. |
| 2011/0268408 A1 | 11/2011 | Giraud et al. |
| 2011/0268410 A1 | 11/2011 | Giraud et al. |
| 2011/0268412 A1 | 11/2011 | Giraud et al. |
| 2011/0286712 A1 | 11/2011 | Puetz et al. |
| 2011/0317974 A1 | 12/2011 | Krampotich et al. |
| 2012/0051708 A1 | 3/2012 | Badar et al. |
| 2012/0057838 A1 | 3/2012 | Hill et al. |
| 2012/0093475 A1 | 4/2012 | Trebesch et al. |
| 2012/0230646 A1 | 9/2012 | Thompson et al. |
| 2012/0237173 A1 | 9/2012 | Alston et al. |
| 2012/0321269 A1 | 12/2012 | Kramer et al. |
| 2013/0039623 A1 | 2/2013 | Zhang |
| 2013/0089292 A1 | 4/2013 | Ott et al. |
| 2013/0089298 A1 | 4/2013 | Holmberg et al. |
| 2013/0108231 A1 | 5/2013 | Mertesdorf |
| 2013/0148936 A1 | 6/2013 | Hill |
| 2013/0183018 A1 | 7/2013 | Holmberg |

(56) References Cited

U.S. PATENT DOCUMENTS

| | | | |
|---|---|---|---|
| 2013/0209049 A1 | 8/2013 | Kowalczyk et al. | |
| 2013/0287356 A1 | 10/2013 | Solheid et al. | |
| 2013/0287357 A1 | 10/2013 | Solheid et al. | |
| 2013/0322832 A1 | 12/2013 | Wang et al. | |
| 2014/0086545 A1 | 3/2014 | Solheid et al. | |
| 2014/0133819 A1 | 5/2014 | Trebesch et al. | |
| 2014/0241691 A1 | 8/2014 | Solheid et al. | |
| 2014/0334790 A1 | 11/2014 | Zhang | |
| 2015/0309276 A1* | 10/2015 | Collart | G02B 6/4457 385/135 |
| 2016/0046460 A1 | 2/2016 | Wells et al. | |
| 2016/0223771 A1 | 8/2016 | Kowalczyk et al. | |
| 2017/0123175 A1* | 5/2017 | Van Baelen | G02B 6/3897 |
| 2017/0199344 A1 | 7/2017 | Kowalczyk et al. | |
| 2017/0235079 A1 | 8/2017 | Kowalczyk et al. | |
| 2018/0081139 A1* | 3/2018 | Geens | G02B 6/4457 |

FOREIGN PATENT DOCUMENTS

| | | |
|---|---|---|
| CN | 1133640 A | 10/1996 |
| CN | 1319194 A | 10/2001 |
| CN | 1448746 A | 10/2003 |
| CN | 201335897 | 10/2009 |
| CN | 102203653 A | 9/2011 |
| CN | 102483500 A | 5/2012 |
| DE | 27 35 106 A1 | 2/1979 |
| DE | 29 18 309 A1 | 11/1980 |
| DE | 33 08 682 A1 | 9/1984 |
| DE | 38 36 273 A1 | 4/1990 |
| DE | 44 13 136 C1 | 5/1995 |
| DE | 295 04 191 U1 | 3/1996 |
| EP | 0 146 478 A2 | 6/1985 |
| EP | 0 149 250 A2 | 7/1985 |
| EP | 0 356 942 A2 | 3/1990 |
| EP | 0 406 151 A2 | 1/1991 |
| EP | 0 464 570 A1 | 1/1992 |
| EP | 0 479 226 A1 | 4/1992 |
| EP | 0 196 102 B1 | 3/1993 |
| EP | 0 538 164 A1 | 4/1993 |
| EP | 0 606 152 A2 | 7/1994 |
| EP | 0 801 317 A2 | 10/1997 |
| EP | 0 563 995 B1 | 10/1999 |
| EP | 1 228 389 B1 | 5/2003 |
| EP | 2 093 596 A2 | 8/2009 |
| FR | 2 531 576 A1 | 2/1984 |
| FR | 2 587 127 A1 | 3/1987 |
| FR | 2 678 076 A1 | 12/1992 |
| JP | 59-74523 A | 4/1984 |
| JP | 60-169811 A | 9/1985 |
| JP | 61-55607 A | 3/1986 |
| JP | 61-90104 A | 5/1986 |
| JP | 2002-270286 A | 9/2002 |
| KR | 200337929 Y1 | 1/2004 |
| KR | K20080033420 A | 4/2008 |
| WO | 91/10927 A1 | 7/1991 |
| WO | 95/07480 A1 | 3/1995 |
| WO | 96/10203 A1 | 4/1996 |
| WO | 99/00619 A1 | 1/1999 |
| WO | 99/38042 A1 | 7/1999 |
| WO | 03/005095 A2 | 1/2003 |
| WO | 2008/048935 A2 | 4/2008 |
| WO | 2010/083369 A1 | 7/2010 |
| WO | 2013/177413 A1 | 11/2013 |
| WO | 2014/118227 A1 | 8/2014 |
| WO | 2015/161863 A1 | 10/2015 |

OTHER PUBLICATIONS

Extended European Search Report for European Patent Application No. 19761101.5 dated Oct. 11, 2021, 9 pages.
"ITU Fiber Handbook" with English translation, 14 pages, Mar. 1992.
"Precision Mechanical" with English translation, 5 pages.
Northern Telecom Bulletin #91-004, Issue #2, May 1991.
AT&T Product Bulletin 2987D-DLH-7/89, "High Density Interconnect System (HDIC)," Issue 2 (Copyright 1989).
Preface to the book "Structure, Installation, Connection and Protection of Communication Optical Fiber Cable," in Chinese with English Translation, 14 pages (Mar. 1992).
Complaint relating to Civil Action No. 5:11-cv-02509-JS, *ADC Telecommunications, Inc* v. *Opterna Am, Inc*. filed Apr. 11, 2011 (14 pages).
Complaint relating to Civil Action No. 1:11cv-735 (GBL-IDD), *ADC Telecommunications, Inc* v. *Opterna Am, Inc*. filed Jul. 12, 2011 (5 pages).
Plaintiff's Notice of Dismissal relating to Civil Action No. 5:11-cv-02509-JS, *ADC Telecommunications, Inc* v. *Opterna Am, Inc*. filed Jul. 12, 2011 (1 page).
Stipulation and Order of Dismissal relating to Civil Action No. 1:11-cv-735-GBL-IDD, *ADC Telecommunications, Inc* v. *Opterna Am, Inc*. filed Feb. 21, 2012 (2 pages).

* cited by examiner

PACKAGING ASSEMBLY FOR TELECOMMUNICATIONS EQUIPMENT

CROSS-REFERENCE TO RELATED APPLICATIONS

This application is a National Stage Application of PCT/US2019/020077, filed on Feb. 28, 2019, which claims the benefit of U.S. Patent Application Ser. No. 62/636,556, filed on Feb. 28, 2018, and claims the benefit of U.S. Patent Application Ser. No. 62/663,778, filed on Apr. 27, 2018, the disclosures of which are incorporated herein by reference in their entireties. To the extent appropriate, a claim of priority is made to each of the above disclosed applications.

TECHNICAL FIELD

The present disclosure relates to fiber optic telecommunications devices. More specifically, the present disclosure relates to packaging arrangements for storage, shipping, and rapid deployment of fiber optic devices terminated to cabling.

BACKGROUND

In the telecommunications industry, the demand for added capacity is growing rapidly. This demand is being met in part by the increasing use and density of fiber optic transmission equipment. Even though fiber optic equipment permits higher levels of transmission in the same or smaller footprint than traditional copper transmission equipment, the demand requires even higher levels of fiber density. This has led to the development of high-density fiber handling equipment.

As a result, there is a need for fiber optic shipping and deployment packaging arrangements that can effectively accommodate a large number of fiber optic equipment terminated to fiber optic cabling for use in high density environments. There is a need for fiber optic storage, transport, and deployment packaging assemblies for dense equipment that are compact, non-cumbersome, and cost-effective.

SUMMARY

An aspect of the present disclosure relates to a transport and/or deployment packaging arrangement/assembly for fiber optic equipment. The arrangement is used for packaging a large number of fiber optic equipment in a compact configuration that also facilitates deployment.

According to one embodiment, the disclosure relates to a packaging assembly for telecommunications modules comprising a plurality of telecommunications modules provided in a stacked arrangement in a container, wherein each module includes a cable extending outwardly from the module, and a radius limiter including a spool defining a curved wall, the radius limiter positioned adjacent the telecommunications modules, wherein the spool of the radius limiter defines a longitudinal axis that is generally parallel to a module-insertion direction, wherein all of the module cables are guided around the spool of the radius limiter with minimum bend radius protection in a direction generally perpendicular to the module insertion direction.

According to another embodiment, the disclosure relates to a packaging assembly for telecommunications modules comprising a plurality of telecommunications modules provided in a stacked arrangement in a first container, a plurality of telecommunications modules provided in a stacked arrangement in an adjacent second container, and a removable radius limiter mounted between the first and second containers for guiding all of the fiber optic cabling extending from the telecommunications modules with minimum bend radius protection.

A further aspect of the present disclosure relates to a method of packaging a plurality of telecommunications modules, each terminated to an end of a cable broken out from bulk cabling, the method comprising stacking the plurality of telecommunications modules in a container with cable ends of the modules all facing outwardly in the same direction, mounting a radius limiter to the container, and routing all of the cables around the radius limiter and out of the container.

A further aspect of the present disclosure relates to a radius limiter configured to be slidably mounted to a sidewall of a container with a friction fit, the radius limiter configured for use in packaging fiber optic equipment terminated to cabling, the radius limiter defining a spool having a curved surface and cable management fingers extending away from the curved surface for retaining cables around the spool. According to a further aspect of the radius limiter, the radius limiter defines a planar support wall with at least one mounting clip defining a retaining surface extending parallel to the support wall, wherein the clip has a U-shaped configuration in cooperation with the support wall that defines a pocket for receiving a sidewall of a container holding the fiber optic equipment.

According to another aspect, the disclosure relates to a packaging assembly for telecommunications equipment, the assembly comprising a cable storage spool defining a plurality of wheels for allowing the spool to move, wherein the cable storage spool defines a central opening extending upwardly from a bottom of the spool toward a top of the spool and a plate defining a post extending upwardly from the plate, wherein the post is configured for insertion into the central opening of the cable storage spool.

According to another aspect, the disclosure is directed to a cable storage spool comprising an upper flange, a lower flange, a cable winding portion positioned between the upper and lower flanges, and a plurality of wheels provided on the lower flange for allowing the cable storage spool to move.

According to yet a further aspect, the disclosure is directed to a method of cable deployment, the method comprising rotating a cable storage spool on its wheels for unwinding cabling from the spool. The cable storage spool may be rotated around a post that has been inserted through an opening defined at a bottom of the spool. The spool may be linearly moved to a predetermined location on its wheels prior to rotating the spool to unwind the cabling.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DETAILED DESCRIPTION

Figure 1:
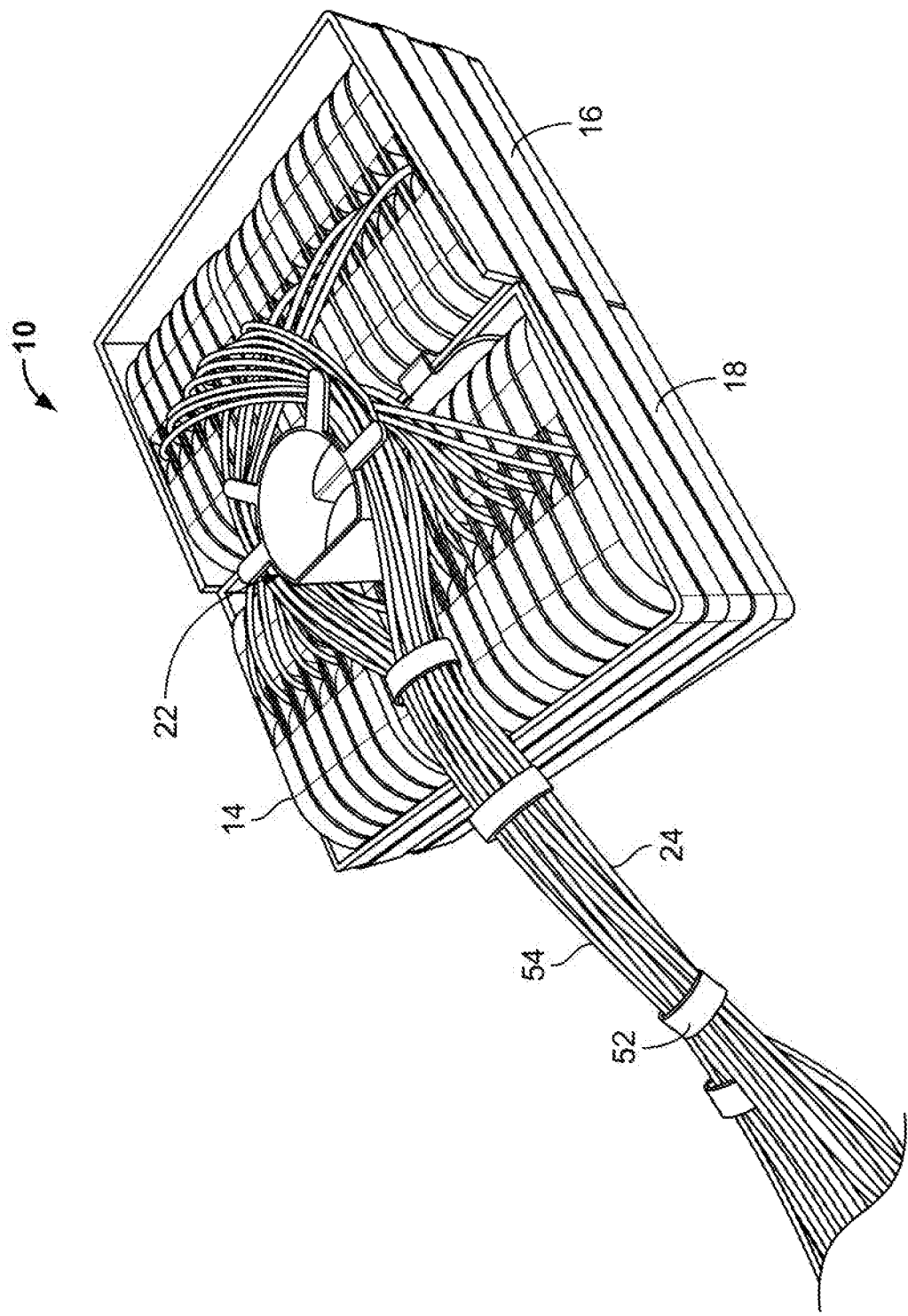
FIG. 1 is a side perspective view of a packaging assembly having features that are examples of inventive aspects in accordance with the present disclosure.
Figure 2:
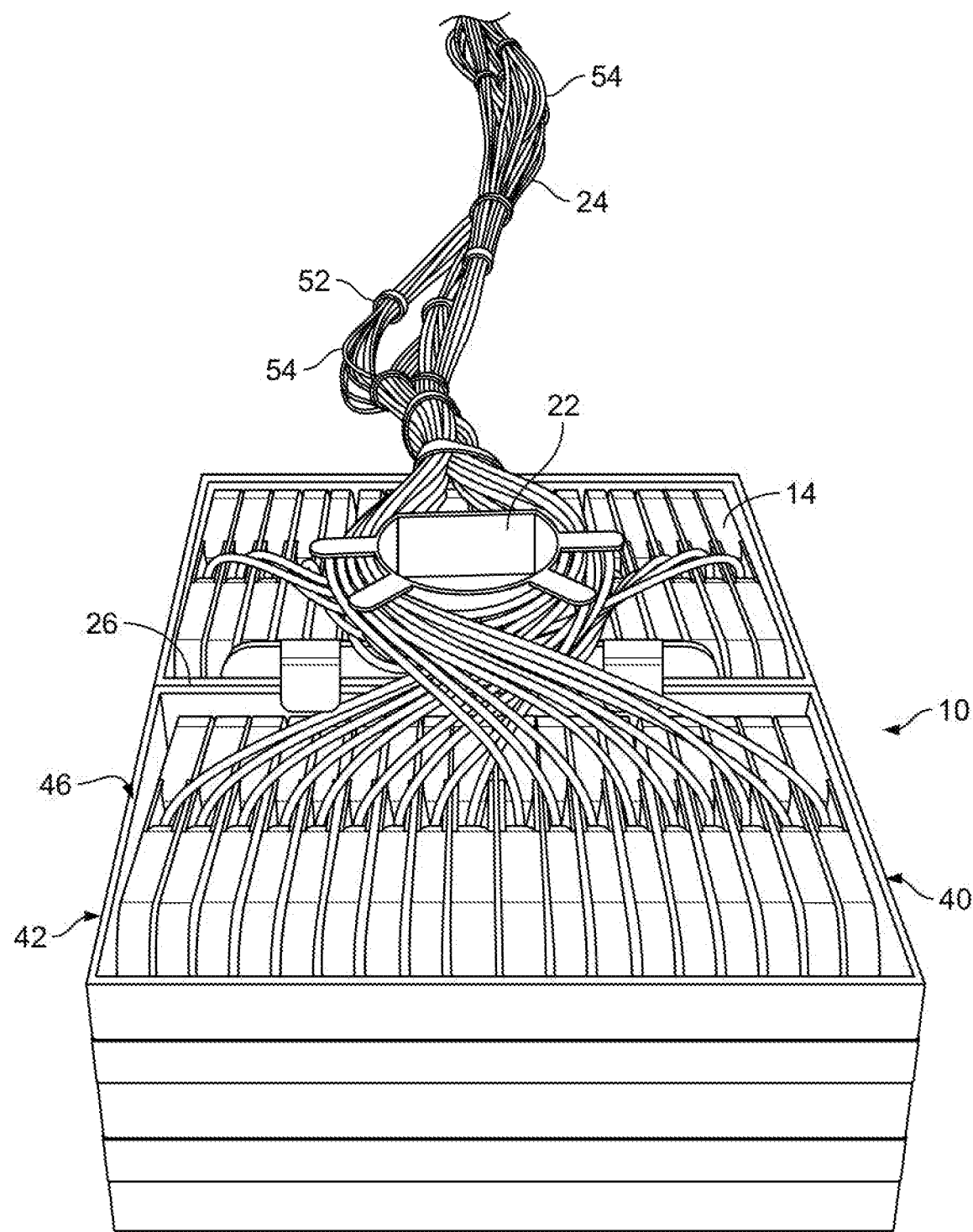
FIG. 2 is a front perspective view of the packaging assembly of FIG. 1.
Figure 3:
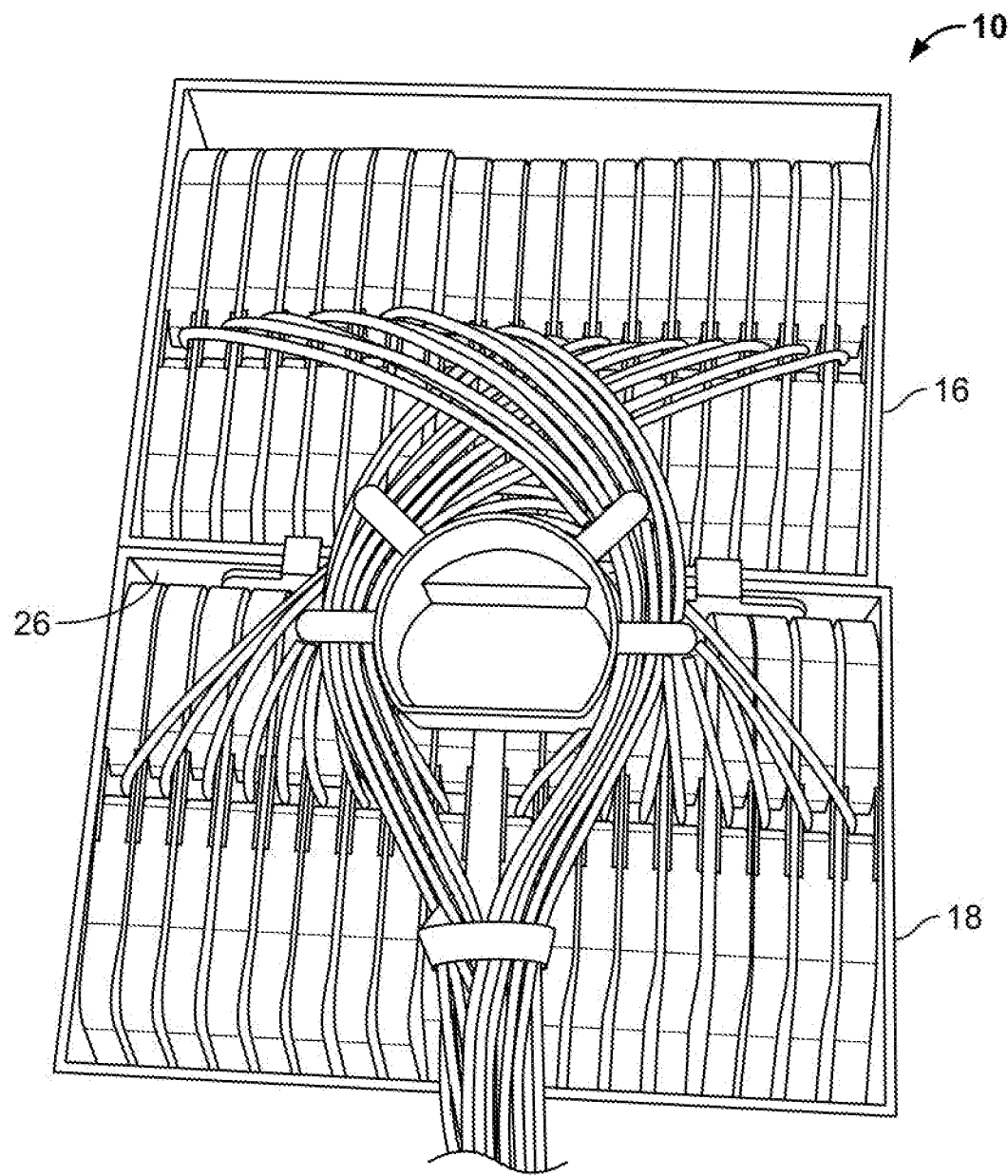
FIG. 3 is a top perspective view of the packaging assembly of FIG. 1.
Figure 4:
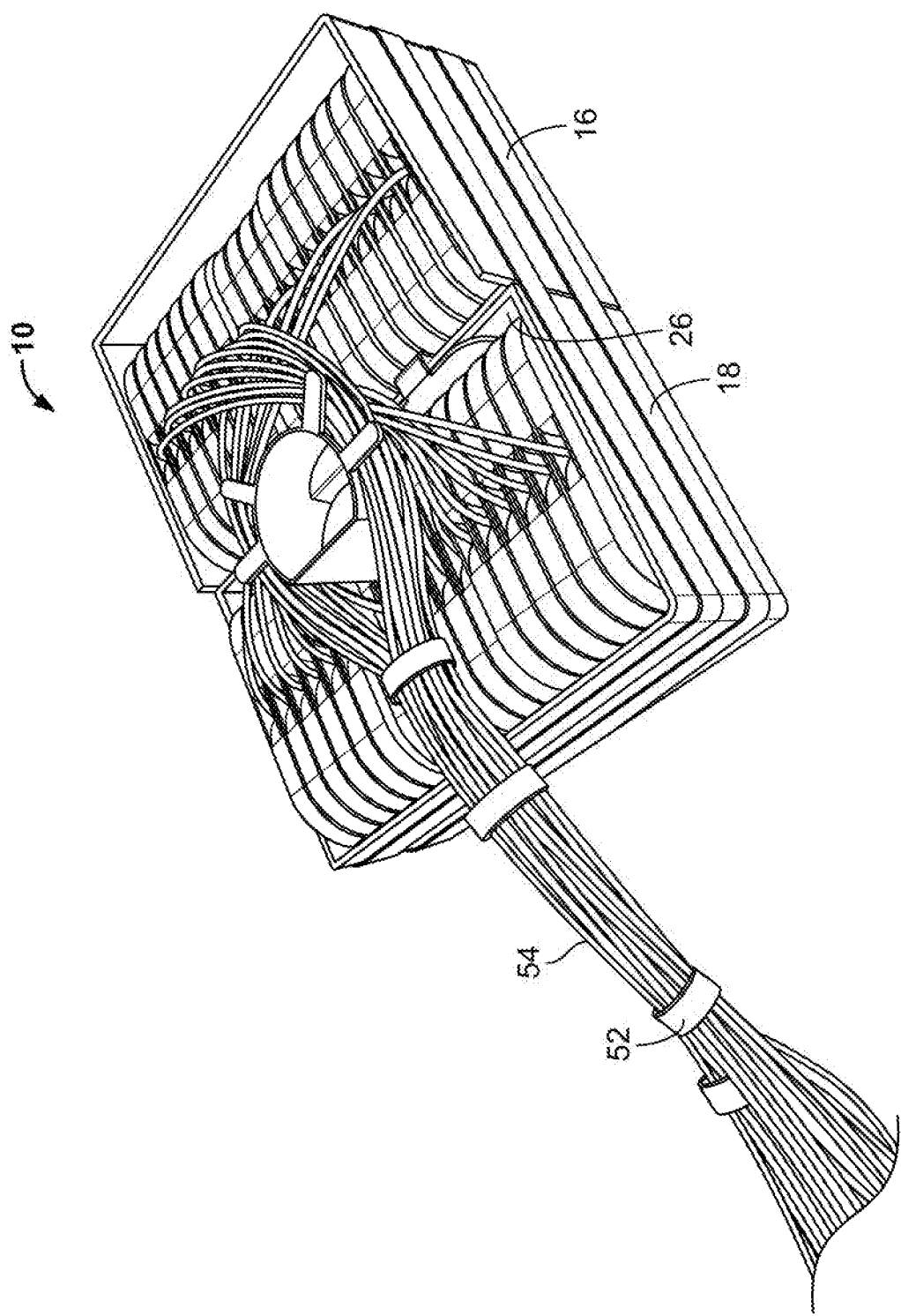
FIG. 4 is another side perspective view of the packaging assembly of FIG. 1.
Figure 5:
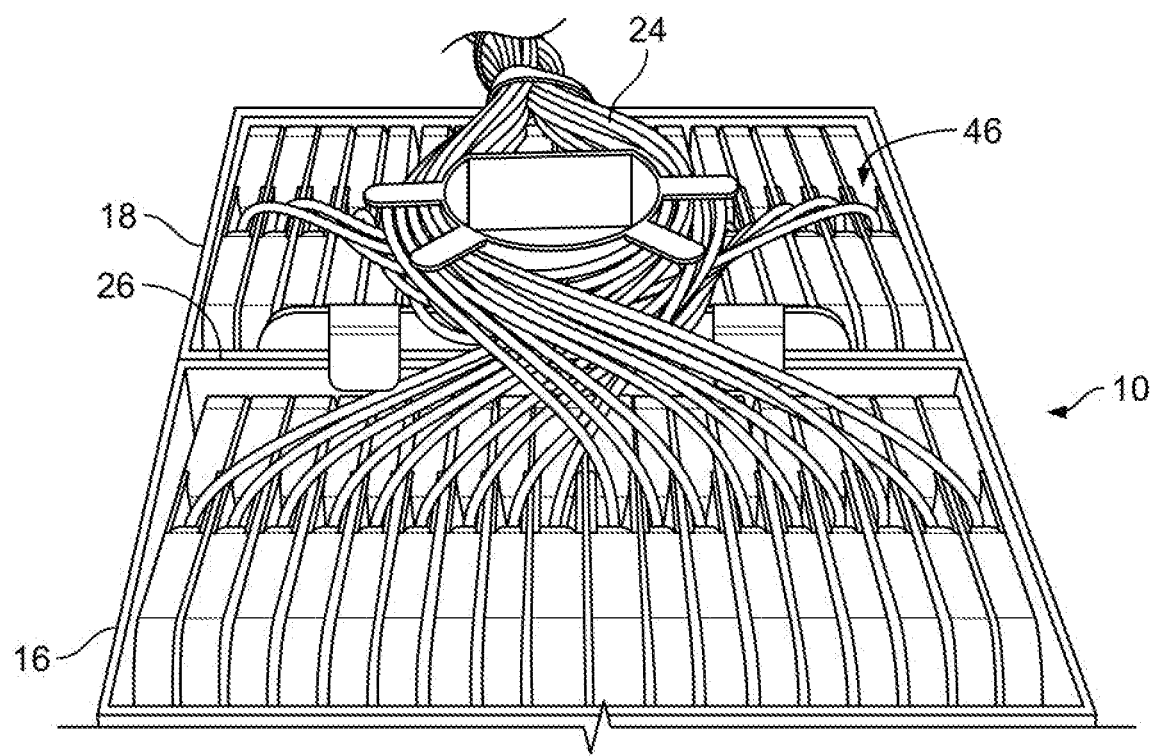
FIG. 5 illustrates a close-up of the modules and the cable routing around the radius limiter used with the packaging assembly of FIG. 1.
Figure 6:
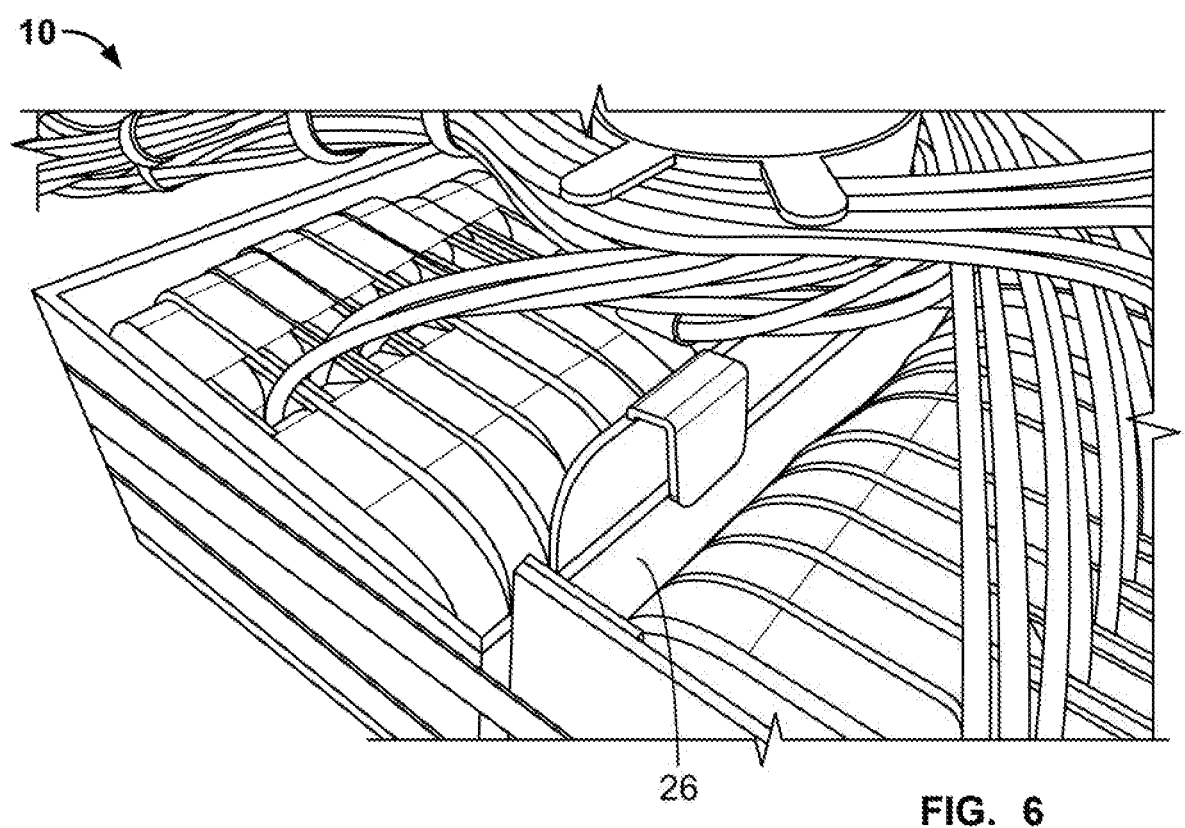
FIG. 6 is another close up view illustrating the cross-over configuration of the cables when being routed around the radius limiter of the packaging assembly of FIG. 1.

Reference will now be made in detail to the exemplary aspects of the present disclosure that are illustrated in the accompanying drawings. Wherever possible, the same reference numbers will be used throughout the drawings to refer to the same or like structure.

Referring now to FIGS. 1-6, a transport and deployment packaging arrangement or assembly 10 for fiber optic telecommunications equipment is illustrated, the packaging assembly 10 having features that are examples of inventive aspects in accordance with the principles of the present disclosure.

The packaging assembly 10 generally includes a container 12 for holding a plurality of telecommunications modules 14 in a stacked arrangement as shown. According to the depicted embodiment, the container 12 may include a first (front) container 16 placed adjacent a second (rear) container 18, each configured to hold a plurality of the modules 14. In other embodiments, the container 12 may simply include a divider for keeping the two sets of modules 14 separate.

According to one example embodiment, the packaging assembly 10 may be configured to hold eighteen modules 14 in each container 16, 18, wherein each module 14 may provide twenty-four connection locations in the form of fiber optic adapters at the front end thereof, opposite from a cable entry end 46. One example module 760 similar to the modules 14 of the packaging assembly 10 is illustrated in further detail in FIGS. 15-22, as will be discussed below.

With two containers 16, 18 placed in an adjacent relationship, the packaging arrangement 10 may include a total of thirty-six modules 14, each terminating twenty-four fibers, for a total of eight hundred sixty-four fibers in a given packaging arrangement 10.

According to an example embodiment, each of the containers 16, 18 may have approximate dimensions of 9.75 inches×6.5 inches×4.5 inches.

In the depicted embodiment, the containers 16, 18 are illustrated as corrugated cardboard boxes. In other embodiments, the container(s) 16, 18 may be thermoformed polymeric structures such as clamshell trays. When using thermoformed polymeric containers, a divider may simply be integrally thermoformed to provide two distinct chambers.

Figure 7:
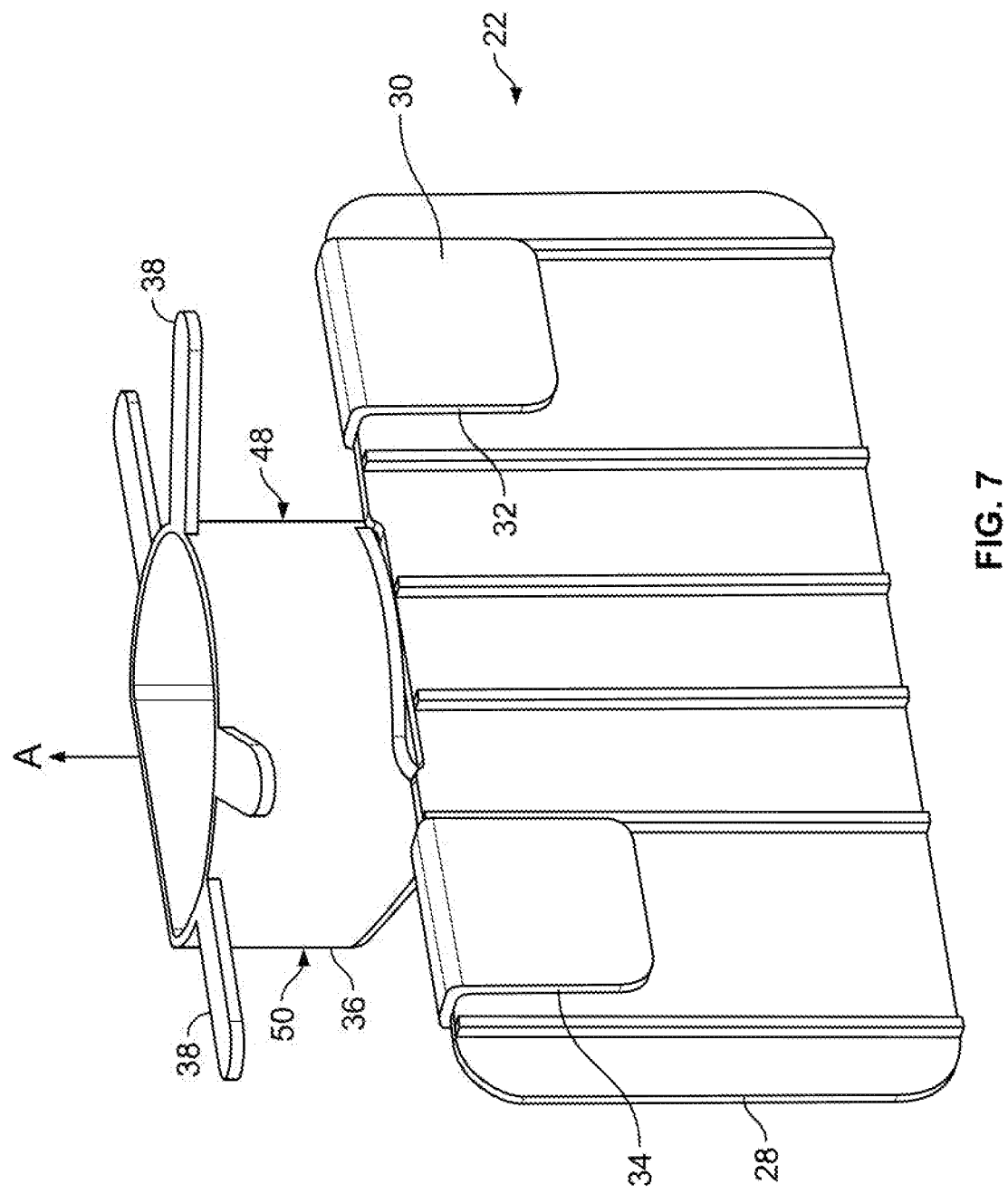
FIG. 7 illustrates in isolation the radius limiter configured for use with the packaging assembly of FIG. 1.

As shown, a radius limiter structure 22, illustrated in isolation in FIG. 7, is mounted between the first and second containers 16, 18 for guiding all of the fiber optic cabling 24 extending from the telecommunications modules 14 with minimum bend radius protection. In the depicted embodiment, the radius limiter 22 is a removable structure and is configured such that it can be mounted with a friction fit to a sidewall 26 defined by either of the first or second containers 16, 18 or by a divider defined between the two sets of modules 14.

It should be noted that in versions of the packaging assembly 10 that utilize thermoformed polymeric containers, the radius limiter 22 may be formed as an integral part of the thermoformed structure.

In the depicted embodiment of FIGS. 1-14, as noted above, the radius limiter 22 is configured to be slidably mounted to a sidewall 26 with a friction fit. The radius limiter defines 22 a planar support wall 28 with at least one mounting clip 30 defining a retaining surface 32 extending parallel to the support wall 28. In the depicted embodiment, the radius limiter 22 includes two clips 30. Each clip 30 generally has a U-shaped configuration in cooperation with the support wall 28 that defines a pocket 34 for receiving the sidewall 26 of a container 16, 18 as shown in the close-up views of FIGS. 5-6.

Extending from the support wall 28, the radius limiter 22 defines a spool 36 having a curved surface. The spool 36 defines an axis A that is generally parallel to the sidewalls 26 of the container 12 when the radius limiter 22 has been mounted to the container 12. In this manner, the radius limiter 22 can be used to guide cables 24 generally along a plane that is perpendicular to the insertion/removal direction of the modules 14 into and from the containers 16, 18, providing a compact design. Cable management fingers 38 extend away from the curved surface for retaining cables 24 around the spool 36 defined by the radius limiter 22.

As shown, when the telecommunications modules 14 are mounted within each of the first and second containers 16, 18 in a stacked arrangement extending from a first side 40 of the container to a second side 42, the cables 24 extending from the modules 14 are guided around the curved surface of the spool 36. When the modules 14 are mounted, they are placed within openings 44 of the container 12 such that the cable termination ends 46 are facing upwardly out of the openings 44.

Referring to FIGS. 1-6, in the depicted embodiment, for the front container 16, cabling 24 of half the telecommunications modules 14 mounted within the first container 16 crosses over the cabling 24 of the other half of the telecommunications modules 14 when being led around the radius limiter 22. As such, half the cables 24 are guided around a first side 48 of the radius limiter 22 while the other half of the cables 24 are routed around an opposite second side 50 of the radius limiter 22.

Still referring to FIGS. 1-6, for the rear container 18, a similar path is followed. Cabling 24 of half the telecommunications modules 14 mounted within the rear container 18 crosses over the cabling 24 of the other half of the telecommunications modules 14 when being led around the radius limiter 22. As such, half the cables 24 are guided around a first side 48 of the radius limiter 22 while other half of the cables 24 are routed around the opposite second side 50 of the radius limiter 22. It should be noted that the relative positioning of the radius limiter 22 with respect to the front and rear containers 16, 18 and the routing used for each of the containers 16, 18 allows a tight bundle of cabling 24 to exit the packaging assembly 10.

As shown, the spool 36 defined by the radius limiter 22 is placed closer to the rear container 18 than the front container 16. According to the depicted example, for the front container 16, since a further length of cabling 24 is routed toward the spool 36, the cabling 24 of half the modules 14 are simply directed rearwardly and crossed over the cabling 24 of the other half of the modules 14 within the front container 16 before being led around opposite sides 48, 50 of the spool 36. This routing may be referred to as a quarter turn for the cables 24.

For the rear container 18, since the spool 36 is positioned closer to the modules 14, when the cabling 24 of half the modules 14 are crossed over the cabling 24 of the other half of the modules 14 within the rear container 18, the cables 24 are generally initially led forwardly and then take a "half-turn" around the spool 36 of the radius limiter 22 before being led rearwardly out of the packaging assembly 10. The described example routing configuration accommodates the different lengths of cabling 24 coming from the front and rear containers 16, 18 and limits the amount of slack in the cabling 24 before being led out of the containers 16, 18.

As shown in the Figures, ties 52 defining hook and loop type fasteners (e.g., Velcro®) or other types of fastening structures may be used for forming different types of cable bundles 54. It should be noted that certain parts of the cabling 24 may be bundled as a whole to keep all of the cabling 24 together (e.g., when being led out of the containers). Other portions of the cabling 24 may be bundled according to the module sets that are going to be deployed. For example, the cabling 24 from half of the modules 14 placed in a container (i.e., nine modules 14 in the depicted embodiment) may be bundled together if those modules 14 are going to be deployed together and placed within a given telecommunications rack system.

Figure 8:
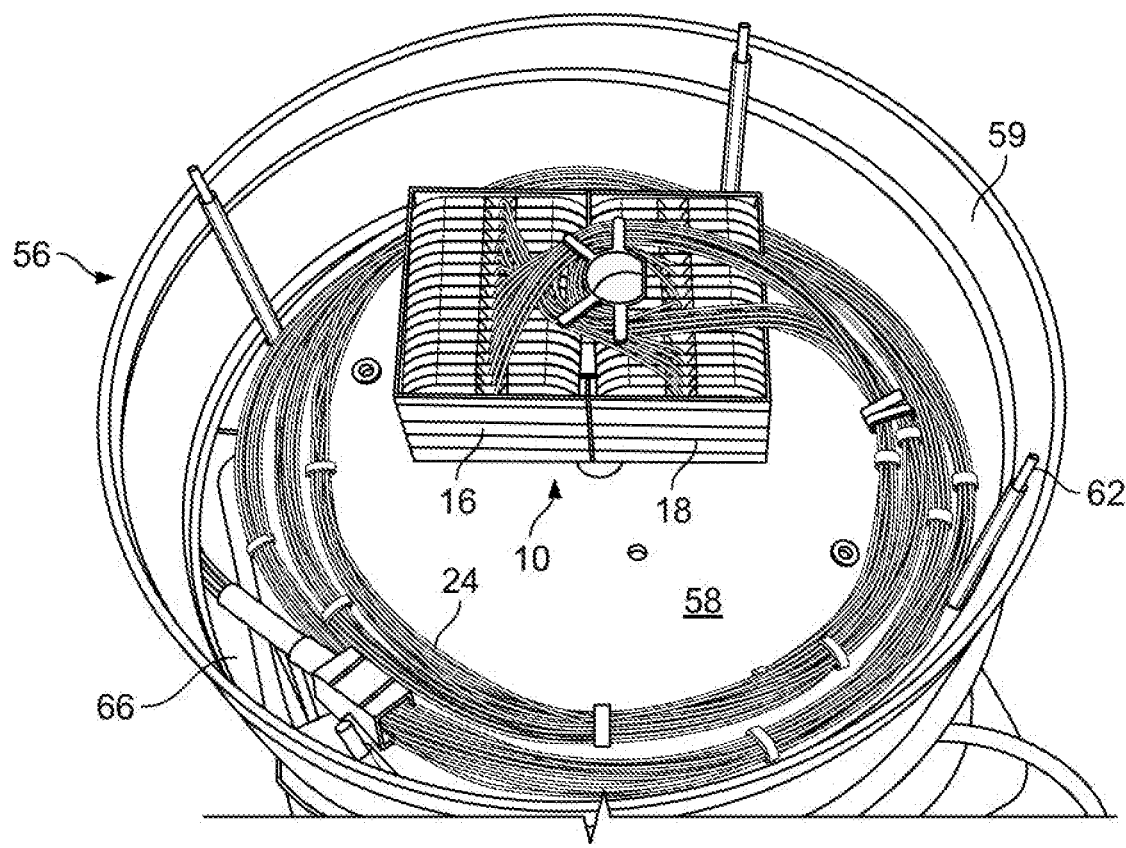
FIG. 8 illustrates the packaging assembly of FIG. 1 placed in a further closure that includes an external cable spool region.
Figure 9:
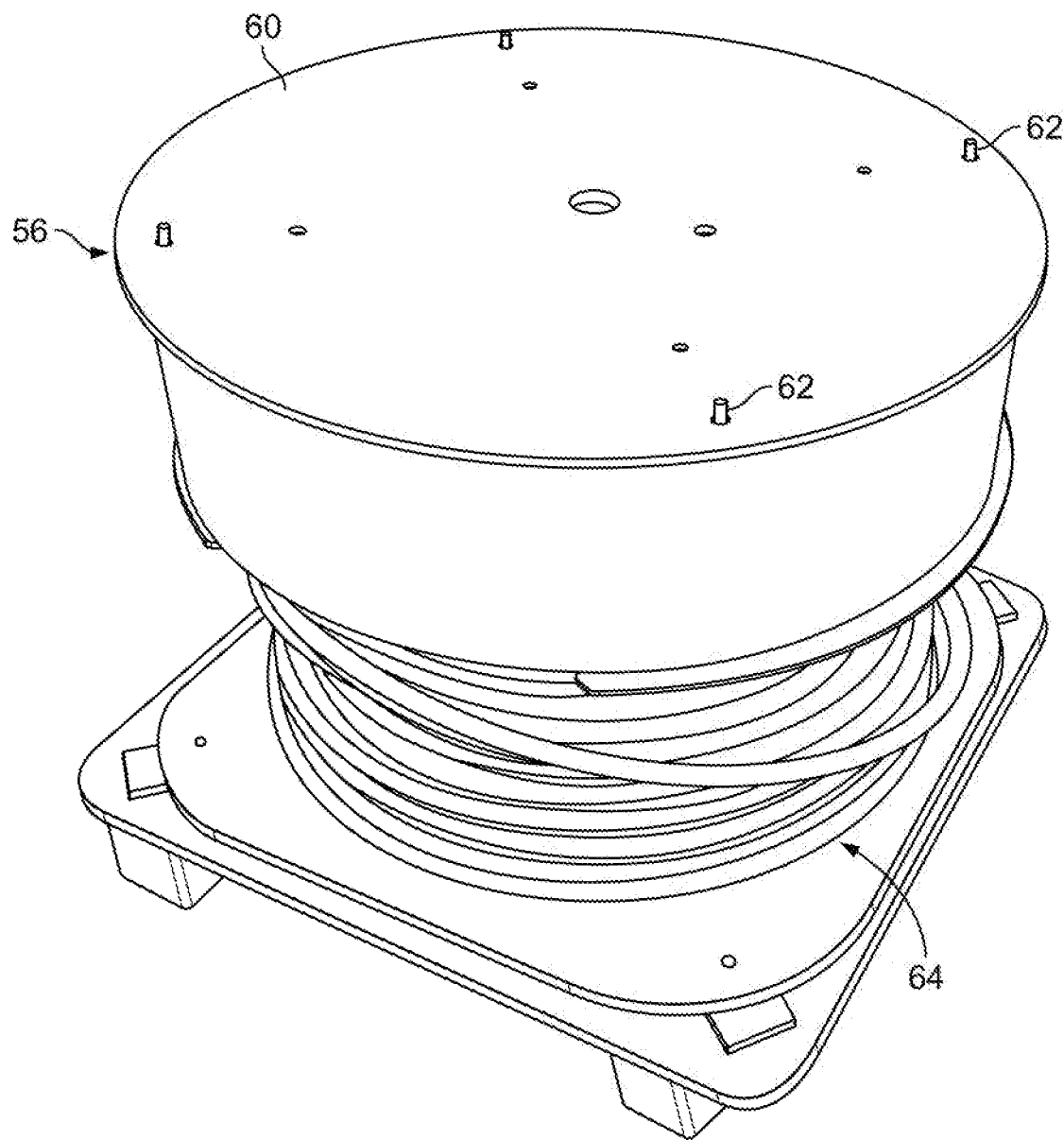
FIG. 9 illustrates the closure of FIG. 8 that includes the external cable spool region with a cover used to cover the packaging assembly of FIG. 1.

Now referring to FIGS. 8-9, to accommodate long segments of fiber optic cabling 24 during transport and deployment, the first and second containers 16, 18 of the packaging assembly 10 may be placed within a further closure 56. According to one embodiment, the closure 56 may define a cylindrical configuration for spooling cabling 24 within an interior 58 of the closure 56, generally 24 around the containers 16, 18. The interior 58 of the cylindrical closure 56 may be defined by a cylindrical sidewall portion 59 that is closed off by a removable cover 60 that is fastened with mechanical fasteners 62.

The closure 56 may include an external spool portion 64 positioned below the interior 58 for wrapping the cabling 24 extending from the modules 14. The cylindrical closure 56 defines an opening 66, as shown in FIG. 8, for extending cabling 24 from the interior region 58 for winding around the exterior spool region 64.

Figure 10:
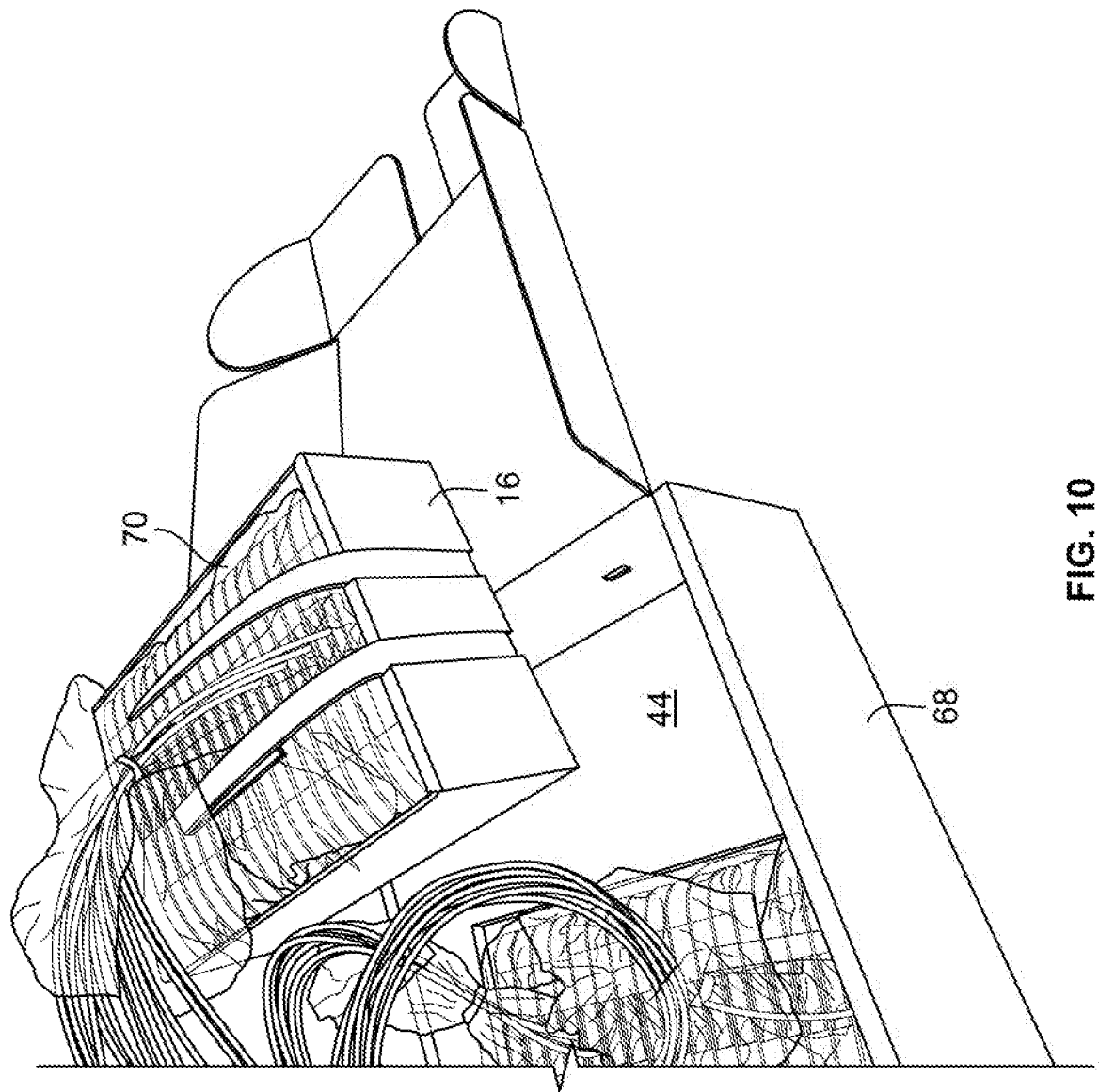
FIG. 10 illustrates the packaging assembly of FIG. 1 alternatively being placed in plastic bags and in an outer housing before being placed in the closure of FIGS. 8-9.
Figure 11:
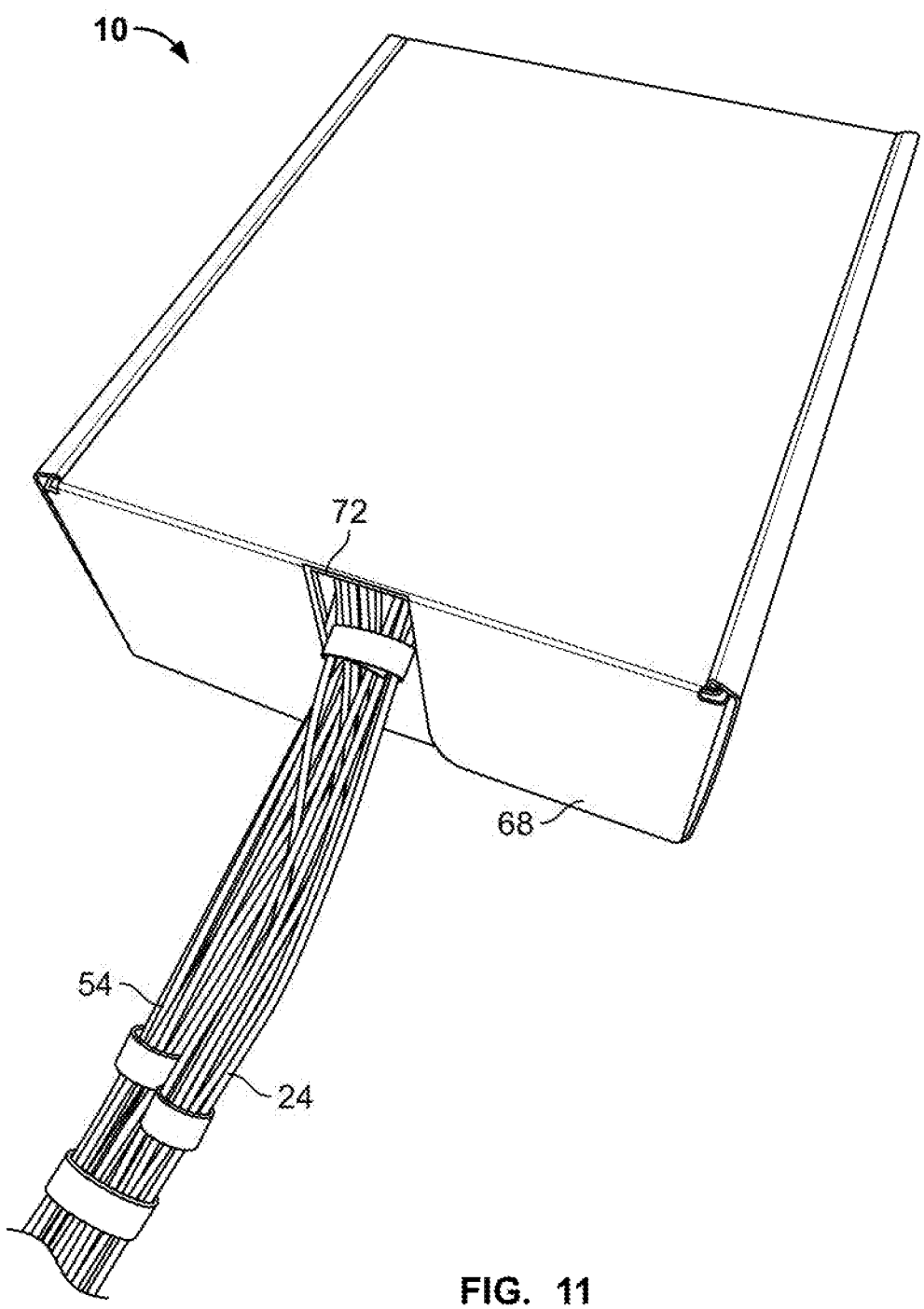
FIG. 11 is a rear perspective view of the outer housing of FIG. 10 illustrating an opening thereof for guiding cabling out of the housing.

Referring now to FIGS. 10-14, instead of placing the two containers 16, 18 directly within the closure 56, the containers 16, 18 may alternatively be placed within an outer housing 68 after the containers 16, 18 are filled with modules 14. As shown in FIG. 10, the modules 14 may be placed in plastic bags 70 (sets of nine modules 14 per bag 70 in the depicted embodiment) before being placed in the front and rear containers 16, 18. The module sets 14 are separated and placed within plastic bags 70 in accordance with their respective cable routing around the radius limiter 22 as discussed above.

The bags 70 are generally used to limit dust entering the modules 14 if the containers 16, 18 are formed from materials such as cardboard. Such bags 70 might not be needed if the containers 16, 18 are of thermoformed polymeric construction.

Figure 12:
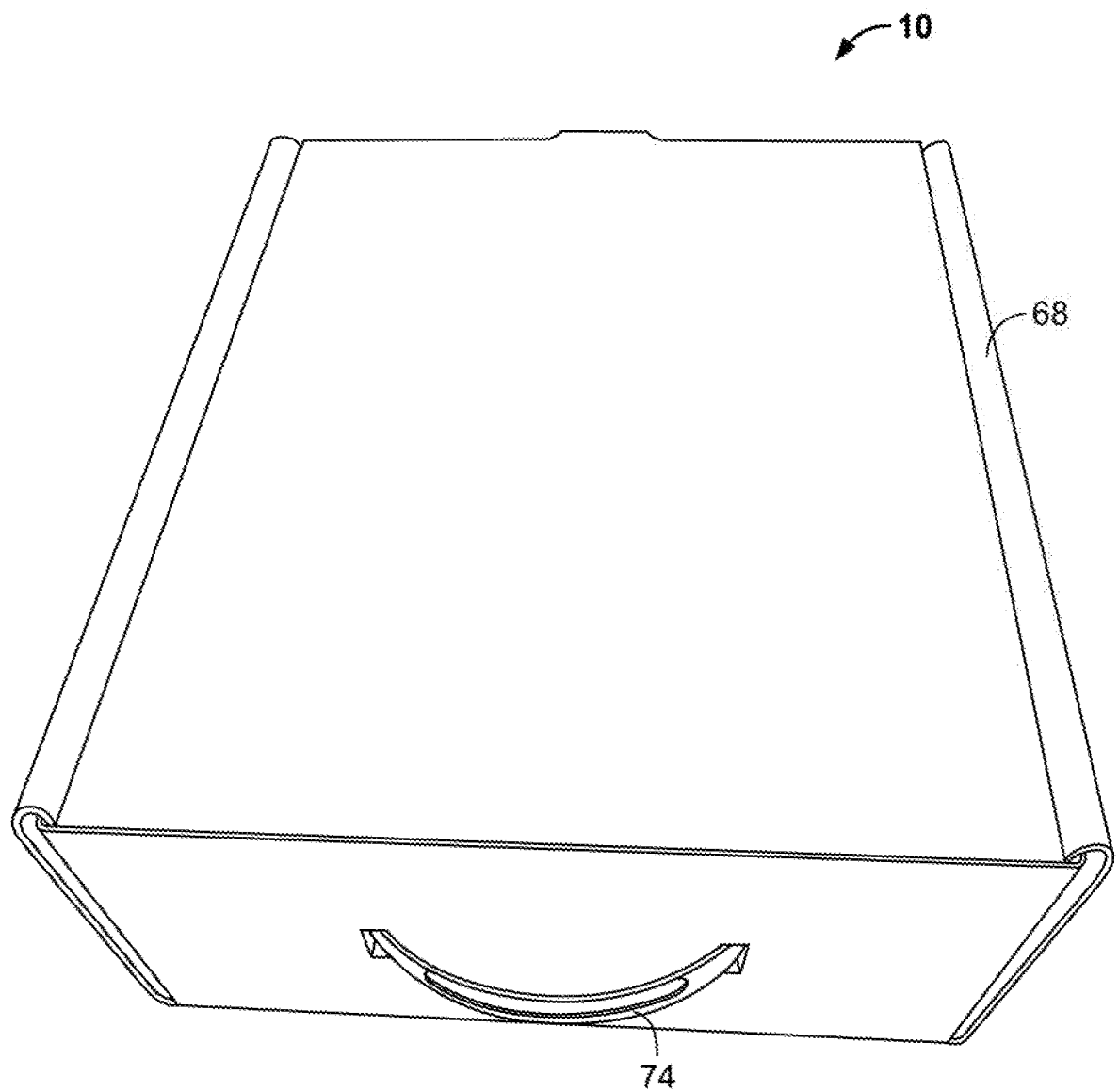
FIG. 12 is a front perspective view of the outer housing of FIGS. 10-11 illustrating a handle of the outer housing.

Once the containers 16, 18 are placed within the outer housing 68 and the cabling 24 routed around the radius limiter 22, the cabling 24 may be led out of the outer housing 68 through an opening 72 of the outer housing 68. As shown in FIG. 12, the outer housing 68 might include a handle 74 at the opposite end from the opening 72 for carrying the packaging assembly 10.

According to an example embodiment, the other housing 68 may have approximate dimensions of 13 inches×10.5 inches×6 inches.

Figure 13:
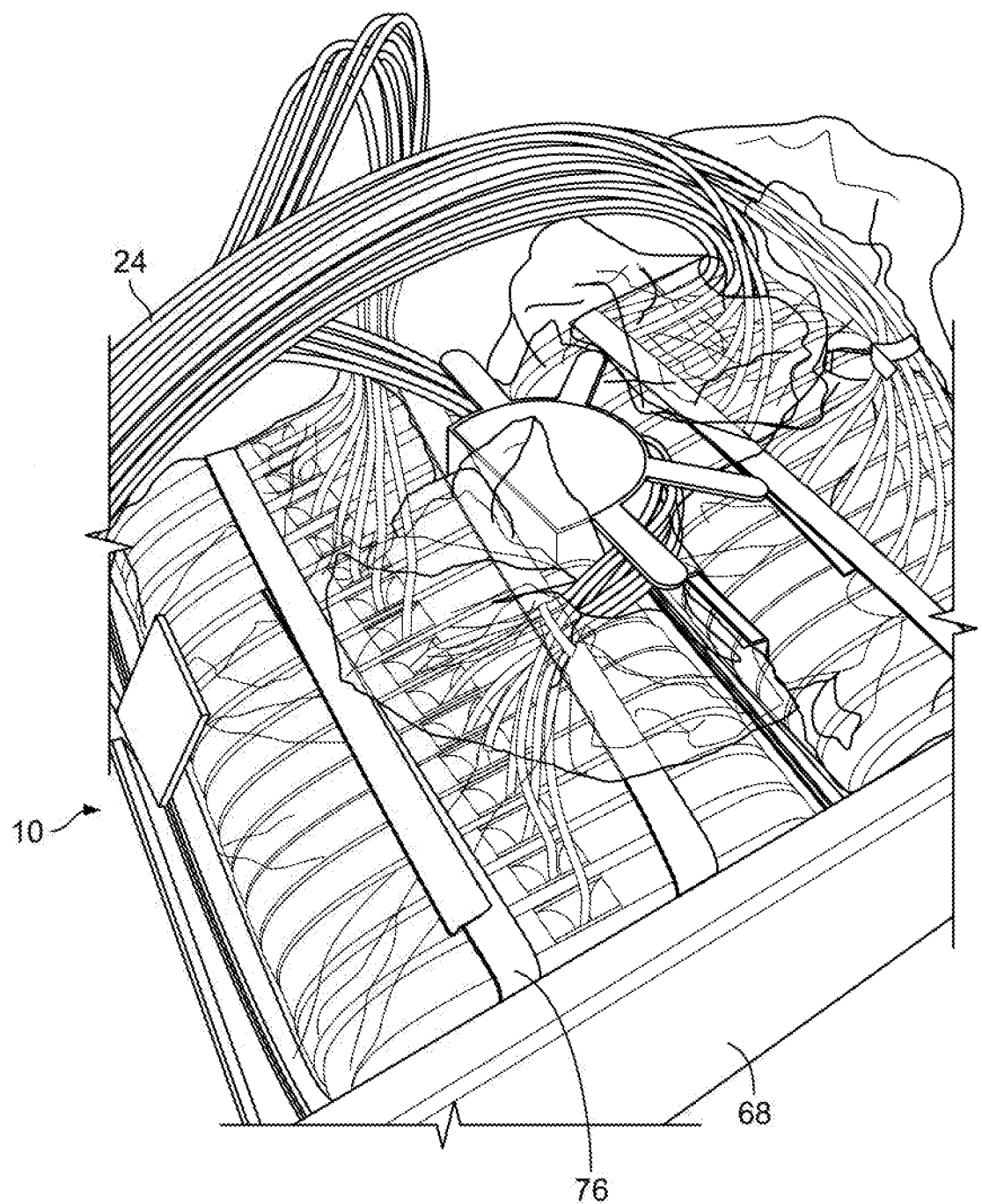
FIG. 13 illustrates the routing of the cabling of the modules around the radius limiter of the packaging assembly of FIG. 1, wherein cabling of half of the rear modules have been routed around the radius limiter.
Figure 14:
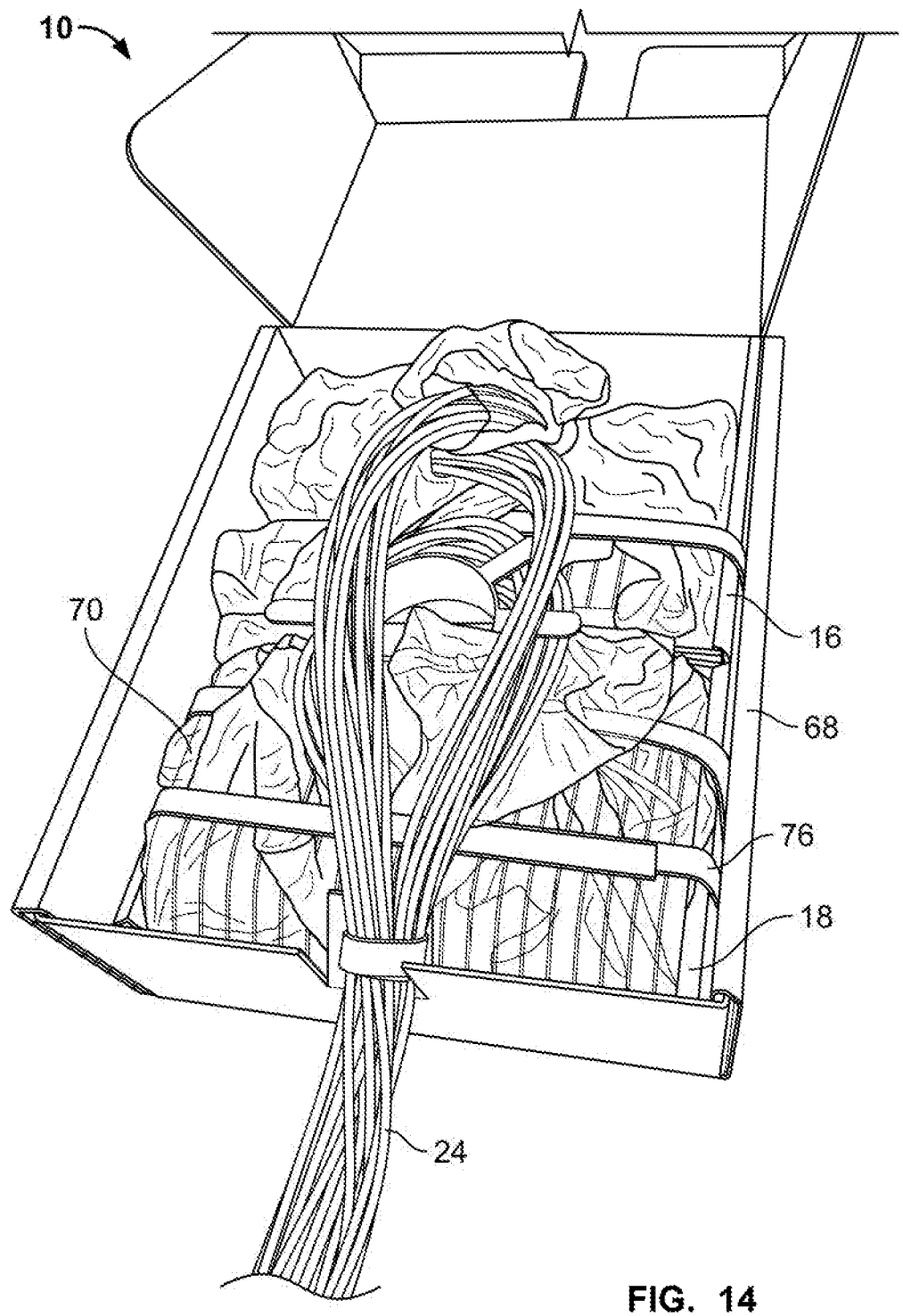
FIG. 14 illustrates further routing of the cabling of the modules around the radius limiter of the packaging assembly of FIG. 1, wherein cabling of all of the rear modules have been routed around the radius limiter before the cabling of the front modules are being guided toward the radius limiter.
Figure 15:
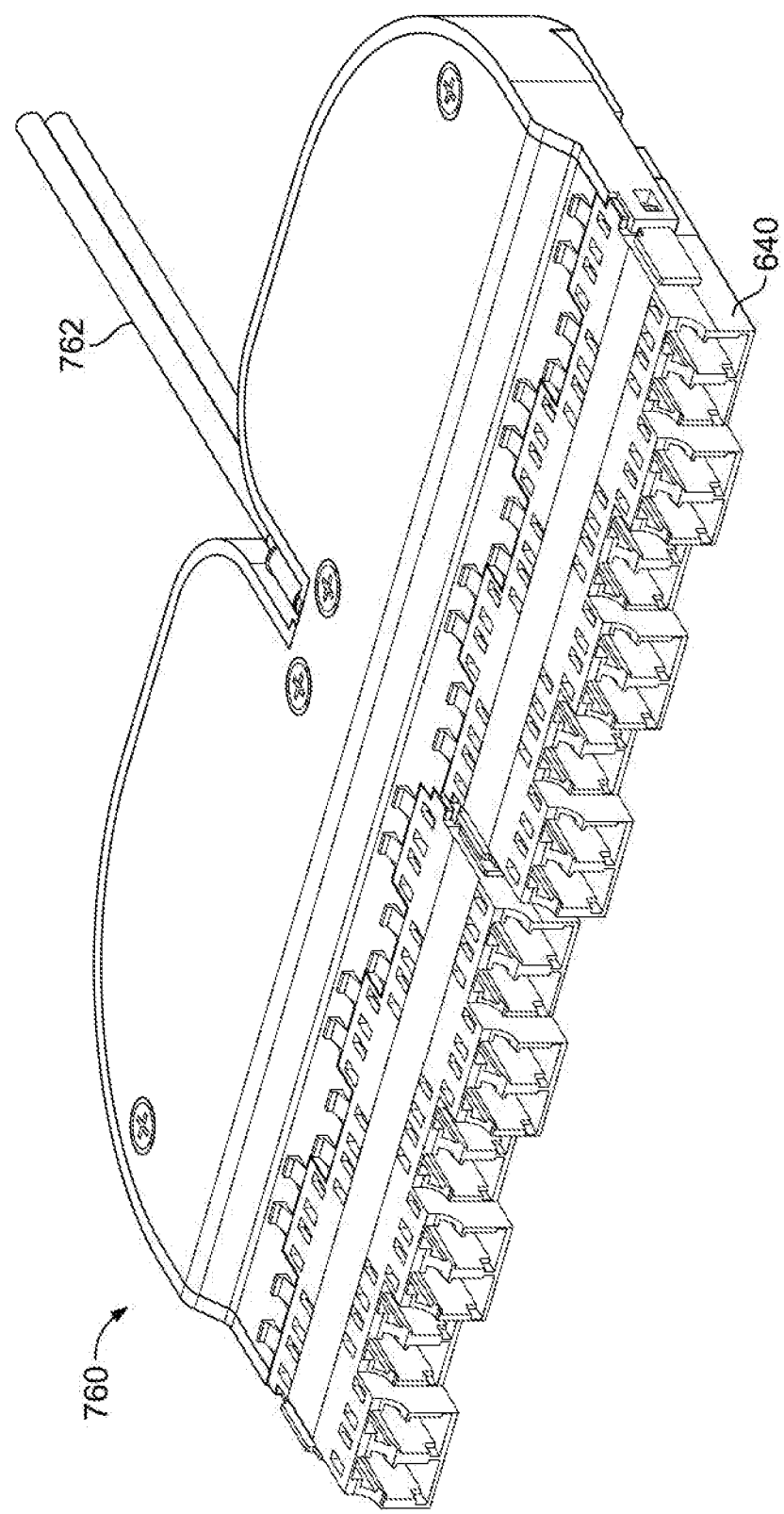
FIG. 15 is a top front perspective view of an example telecommunications module having features similar to those used in the packaging assembly of FIG. 1.
Figure 16:
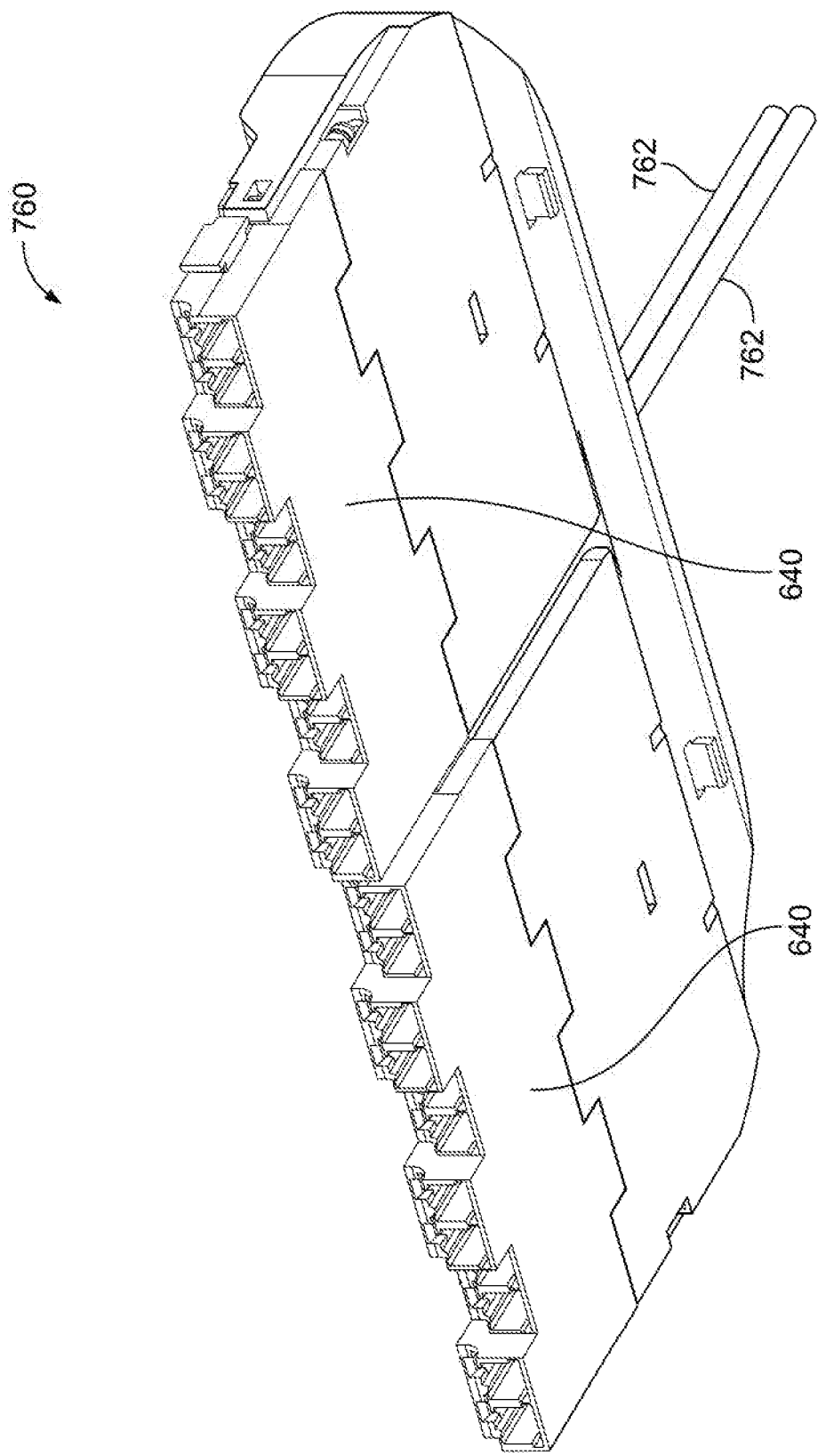
FIG. 16 is a bottom front perspective view of the telecommunications module of FIG. 15.
Figure 17:
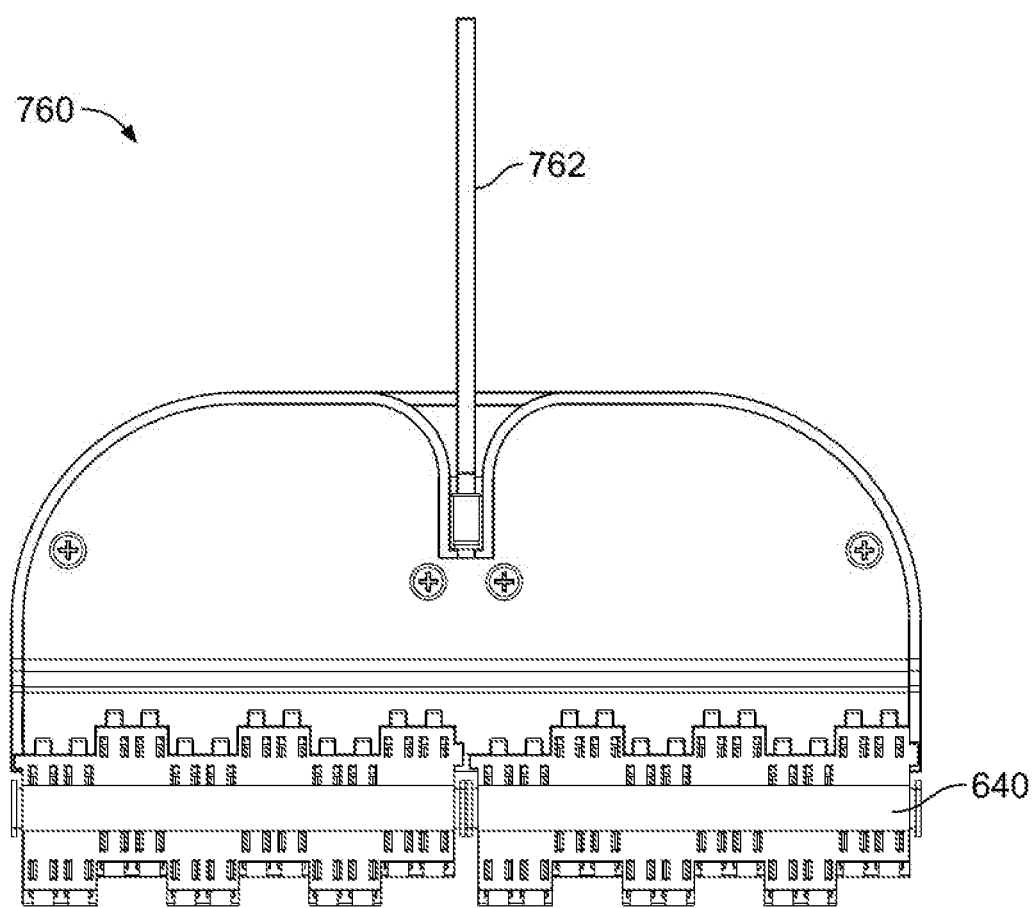
FIG. 17 is a top view of the telecommunications module of FIG. 15.
Figure 18:
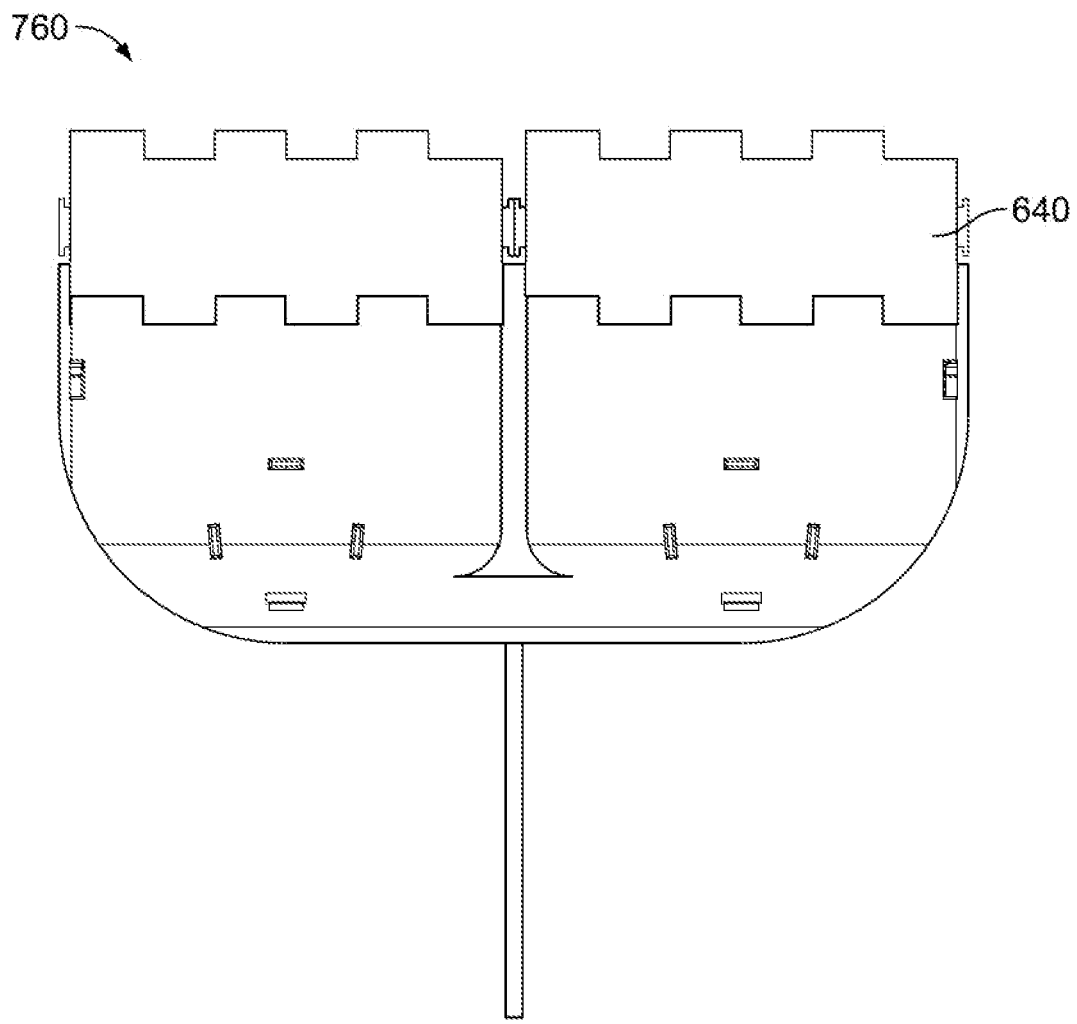
FIG. 18 is a bottom view of the telecommunications module of FIG. 15.
Figure 19:
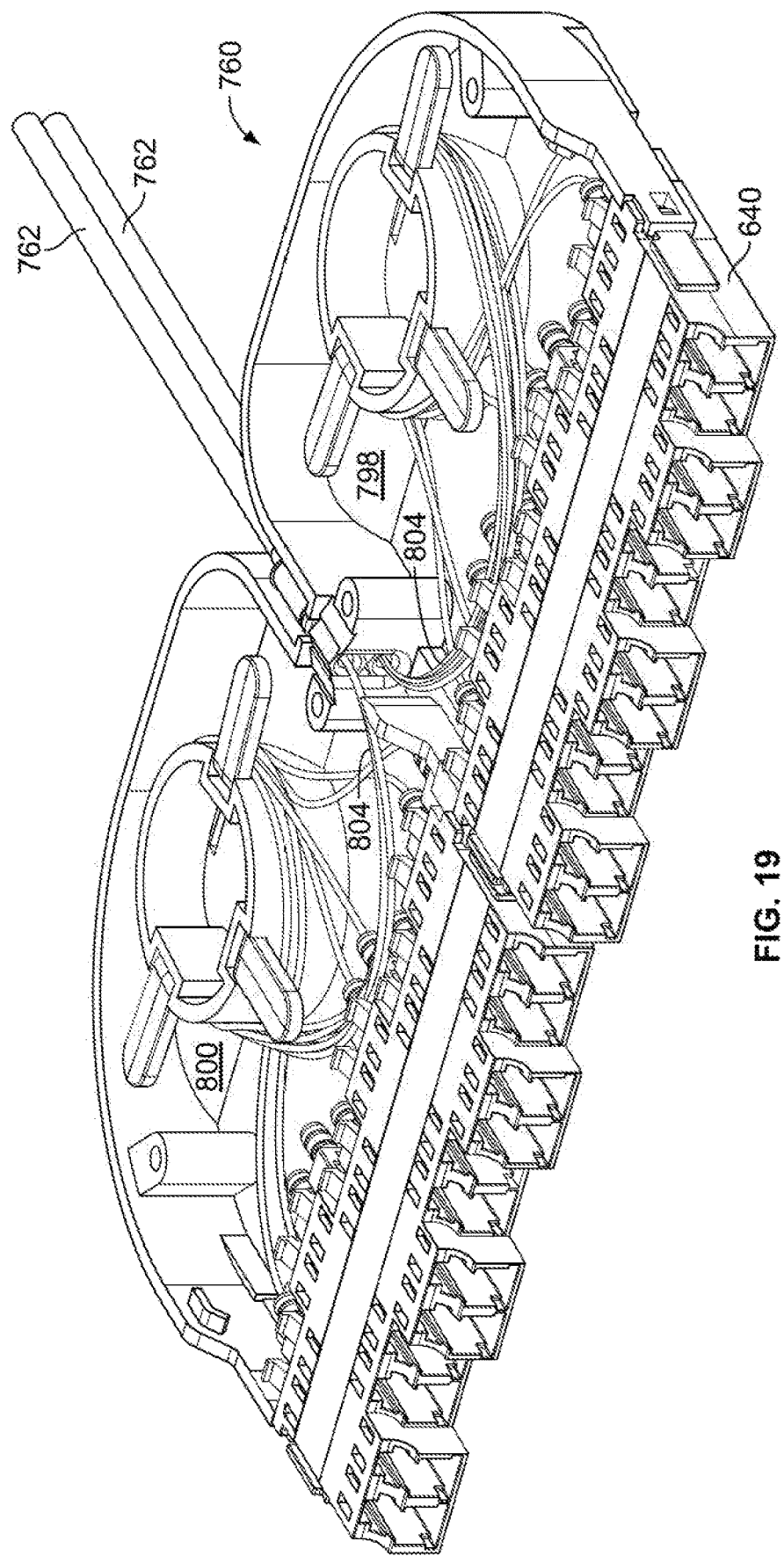
FIG. 19 shows the telecommunications module of FIG. 15 with the cover thereof removed to illustrate the internal features thereof.
Figure 20:
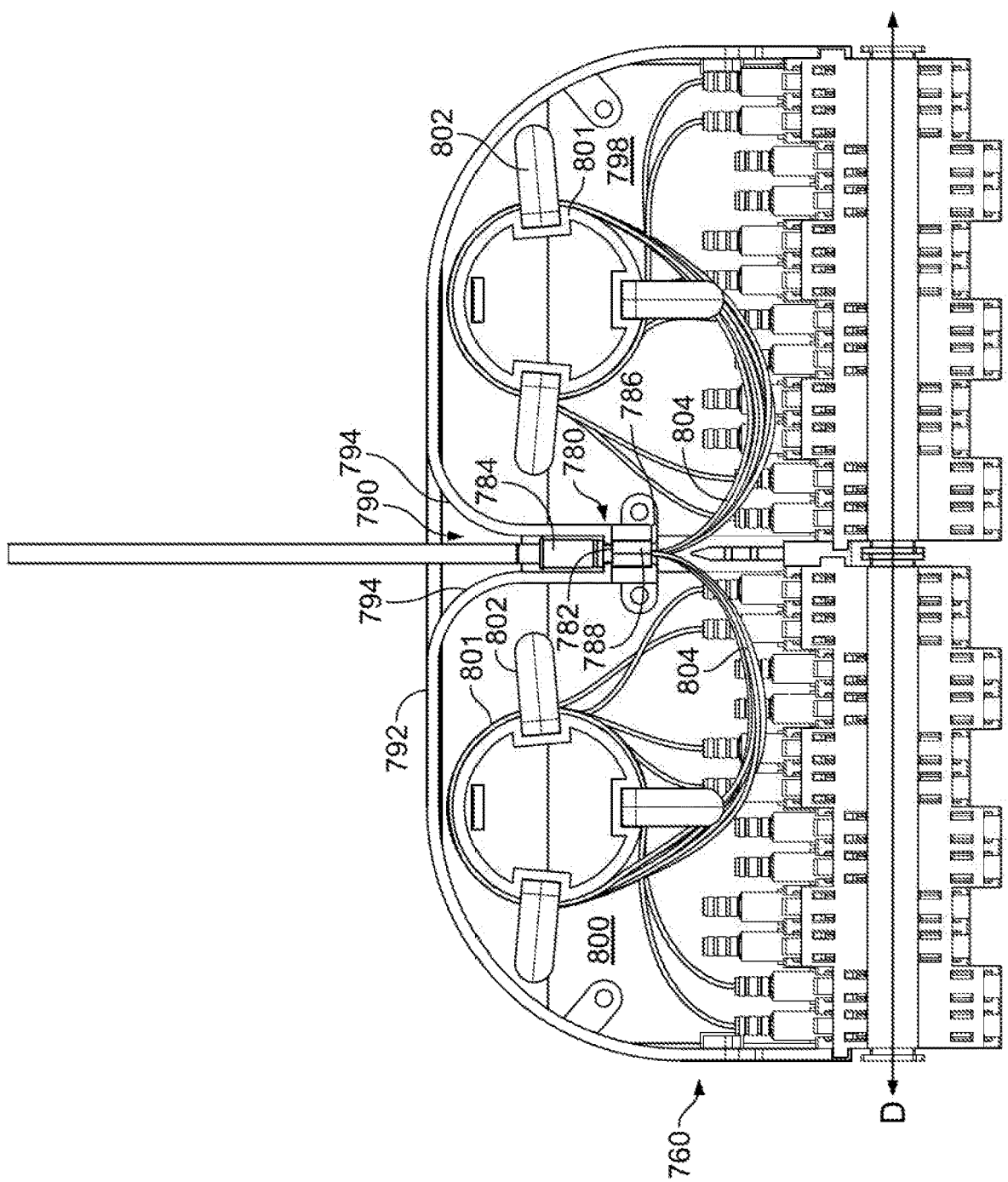
FIG. 20 is a top view of the telecommunications module of FIG. 19 with the cover removed.
Figure 21:
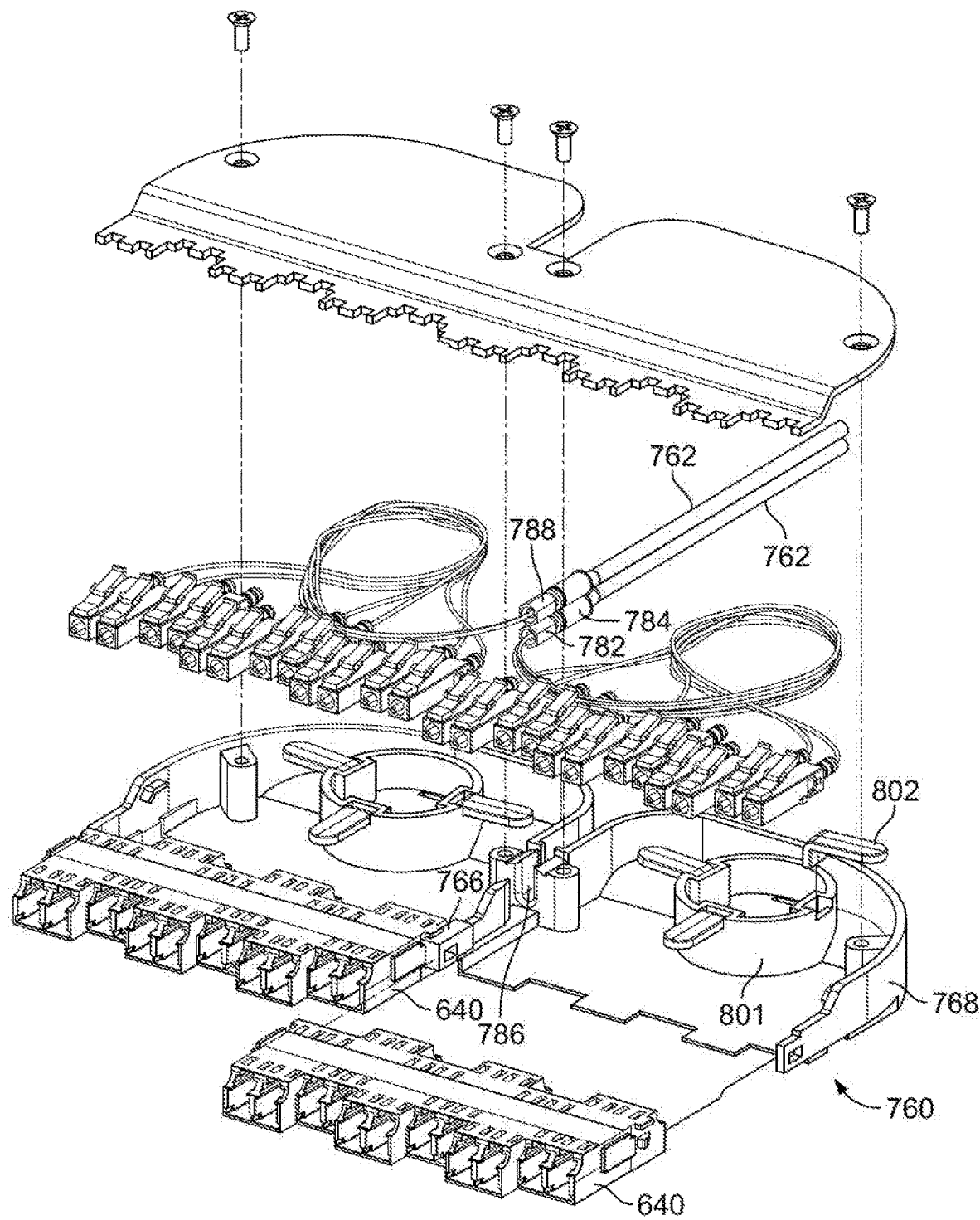
FIG. 21 shows the telecommunications module of FIG. 19 in an exploded configuration to illustrate the different components of the module.
Figure 22:
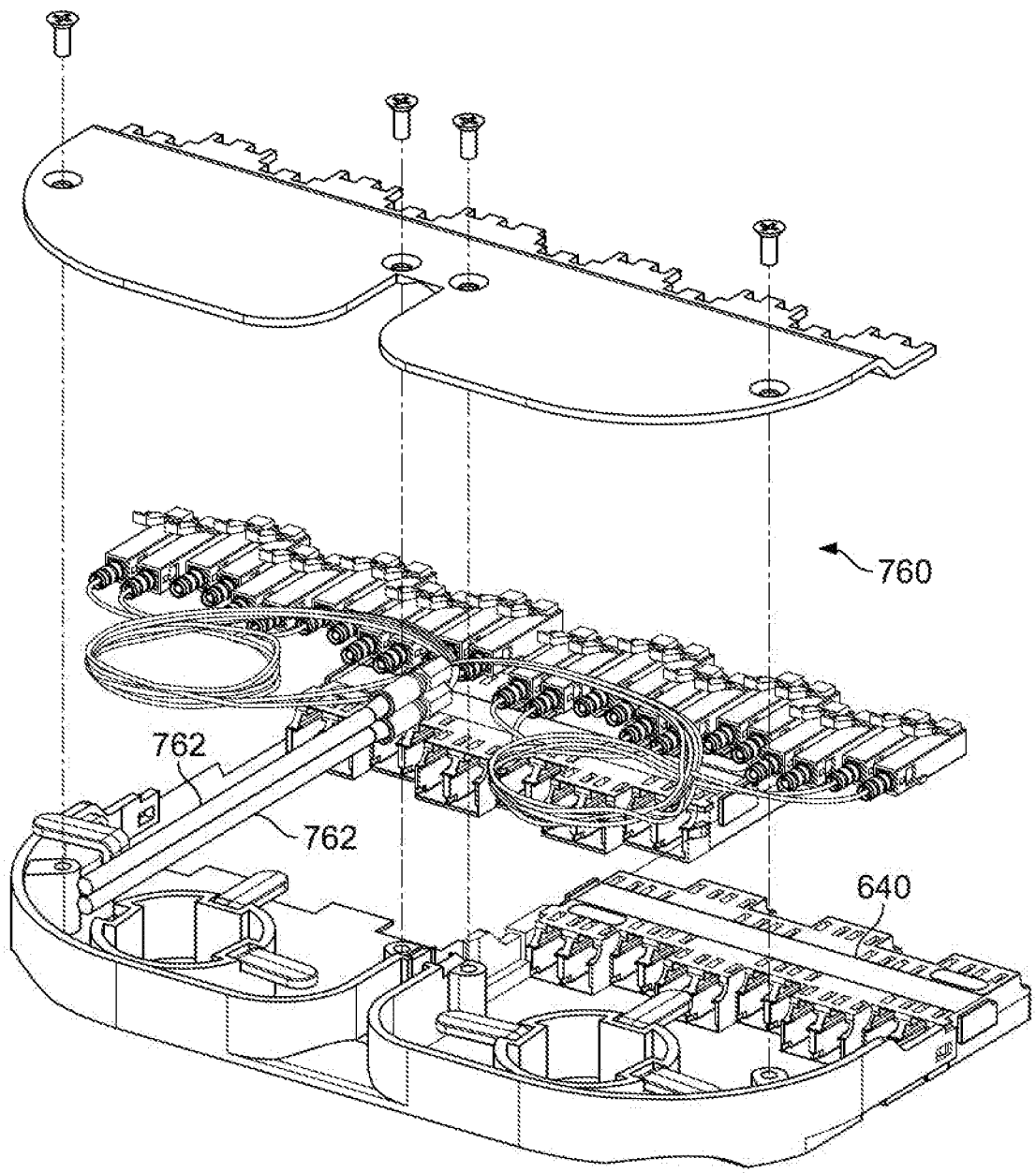
FIG. 22 is a rear top perspective of the telecommunications module of FIG. 21.

Referring to FIGS. 13 and 14, the example cable routing around the radius limiter 22 discussed above is illustrated in further detail. As discussed above and illustrated specifically in FIG. 13, for the rear container 18, since the spool 36 is positioned closer to the modules 14, when the cabling 24 of half the modules 14 are crossed over the cabling 24 of the other half of the modules 14 within the rear container 18, the cables 24 are generally initially led forwardly and then take a "half-turn" around the spool 36 of the radius limiter 22 before being led rearwardly out of the packaging assembly 10.

Referring specifically to FIG. 14, as discussed above, for the front container 16, since a further length of cabling 24 is routed toward the spool 36, the cabling 24 of half the modules 14 are simply directed rearwardly and crossed over the cabling 24 of the other half of the modules 14 within the front container 16 before being led around opposite sides 48, 50 of the spool 36. As noted above, this routing may be referred to as a "quarter turn" for the cables 24. The routing illustrated in FIGS. 1-6 and 13-14 can accommodate the different lengths of cabling 24 coming from the front and rear containers 16, 18 and limits the amount of slack in the cabling 24 before being lead out of the containers 16, 18.

It should be noted that the packaging arrangement/assembly 10 described herein is usable with a variety of telecommunications equipment having cabling 24 terminated thereto. The modules 14 depicted are simply one example that is used to illustrate the inventive aspects of the packaging arrangement 10.

A module, designated by reference numeral 760, similar to the ones depicted in the Figures of the present application is illustrated and described in full detail in U.S. Pat. No. 9,519,119, the entire disclosure of which is incorporated herein by reference.

Such a module 760 is also illustrated in isolation in FIGS. 15-22. The module 760 illustrated in FIGS. 15-22 includes many features similar to those depicted in the packaging assembly 10 of FIGS. 1-14 with a number of minor differences. For example, the module 760 of FIGS. 15-22 includes two cables 762 being terminated to the module 760 instead of a single cable as shown for the packaging assembly of FIGS. 1-14.

As illustrated in FIGS. 15-22, the cables 762 entering the module 760 are connected to a cable entry location 780 with a crimp tube 782 and a crimp ring 784 which crimps a jacket and strength member to crimp tube 782. A small pocket 786 captures the crimp tubes 782 in a stacked arrangement for retention with module body 768. Pocket 786 captures hex end 788 of crimp tube 782 to retain cables 762 with module body 768. As shown, the pocket 786 is provided in an inset portion 790 defined at the center of the right and left portions of a rear wall 792 of the module 760. The portions of the rear wall 792 surrounding the pocket 786 provide gradual curves 794 as the portions extend from the pocket 786 to portions of the rear wall 792 that are parallel to a longitudinal axis of the module.

Thus, when the cable 762 placed in the pocket 786 is bent in either direction toward the right side or the left side of the module 760, bend radius protection may be provided with the curved portions 794 of the rear wall 792. This provides a built-in bend radius protection structure that may eliminate the need for a separate boot for each of the cables 762.

Still referring to FIGS. 15-22, an interior 796 of the module body 768 may generally define two separately identifiable chambers 798, 800, each one including a radius limiter 801 (e.g., in the form of a spool) with cable retention fingers 802 extending therefrom. Optical fibers 804 that are input into the module 760 through the bottom connectorized cable 762 may be led to the right chamber 798 and the optical fibers 804 input into the module 760 through the top connectorized cable 762 may be led to the left chamber 800 before being led to adapter blocks 640 at the front of the module 760. The adapter blocks 640 define connection locations for the module 760 for connectorized cables coming from an exterior of the module 760.

In the modules 14 depicted in the packaging assembly 10 of FIGS. 1-14, half the fibers broken out from the single cable 24 may be led to a right chamber and the other half of the fibers may be lead to a left chamber similar to the module 760 shown in FIGS. 15-22.

As noted above, when the modules 14 are being placed in a stacked arrangement within the containers 16, 18 of the packaging assembly 10, the front ends of the modules 14 that define the fiber optic adapter blocks are inserted downwardly into the openings 44 of the containers 16, 18 with the cable termination ends 46 of the modules 14 facing upwardly, where the cabling 24 extending from the modules 14 can then be further managed as discussed herein.

FIGS. 23A-23J illustrate the installation steps in preparing an example packaging assembly similar to that shown in FIGS. 1-14.

Figure 23A:
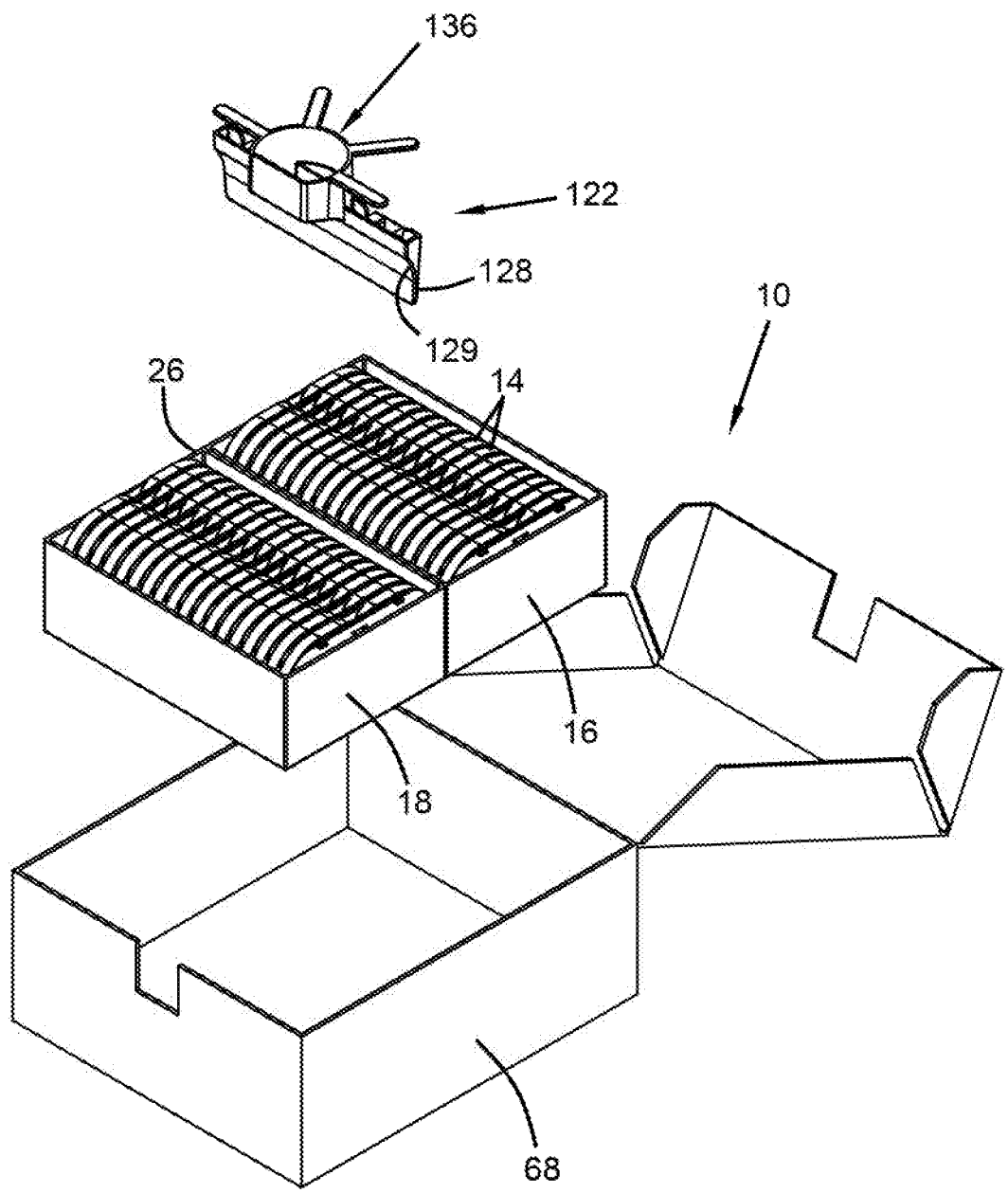
FIGS. 23A-23J illustrate the installation steps in preparing an example packaging assembly similar to that shown in FIGS. 1-14.

FIG. 23A illustrates the first and second containers 16, 18 being installed in the outer housing 68. A radius limiter 122 similar to that shown in FIGS. 1-14 is installed after the first and second containers 16, 18 are installed in the outer housing 68. As seen in FIG. 23A, the radius limiter 122 defines a support wall 128 that has a curved transition portion 129 as the support wall 128 extends from a bottom of the radius limiter structure 122 toward a spool 136. As shown in the depicted example, the support wall 128 is configured to be frictionally fit to or adjacent the sidewall 26 of the rear container 18 and the curved transition portion 129 is configured to accommodate the curved portions of the rear wall of the modules 14.

Figure 23B:
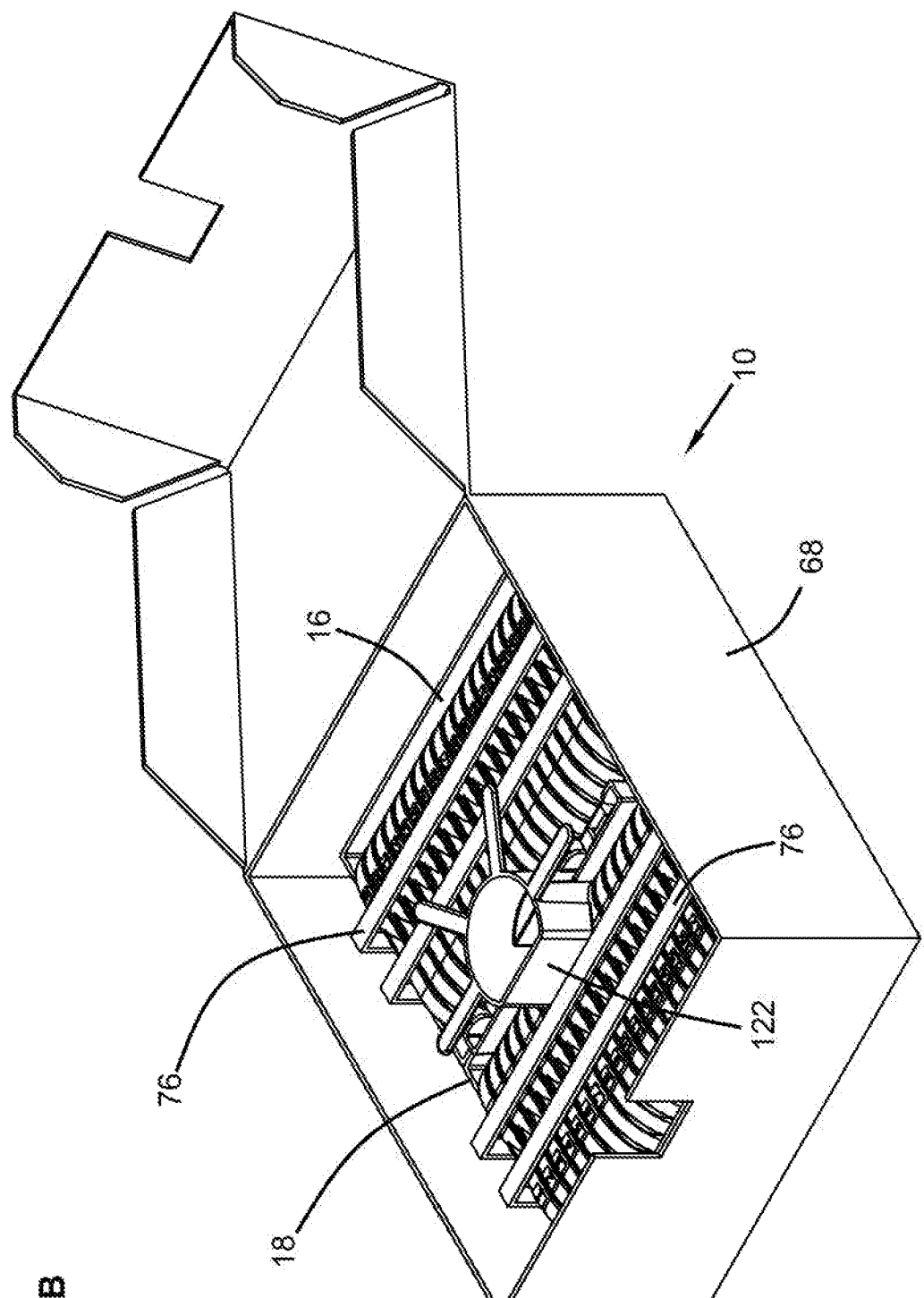

FIG. 23B illustrates the first and second containers 16, 18 and the radius limiter 122 having been installed in the outer housing 68. Straps 76 may be used to retain the modules 14 within the containers 16, 18 once the modules 14 have been inserted therein. Similar straps 76 are also shown in FIGS. 10, 13, and 14, where the straps 76 have been placed around the plastic bags 70. According to one embodiment, the straps may be held together with hook and loop type fasteners (e.g., Velcro®).

Figure 23C:
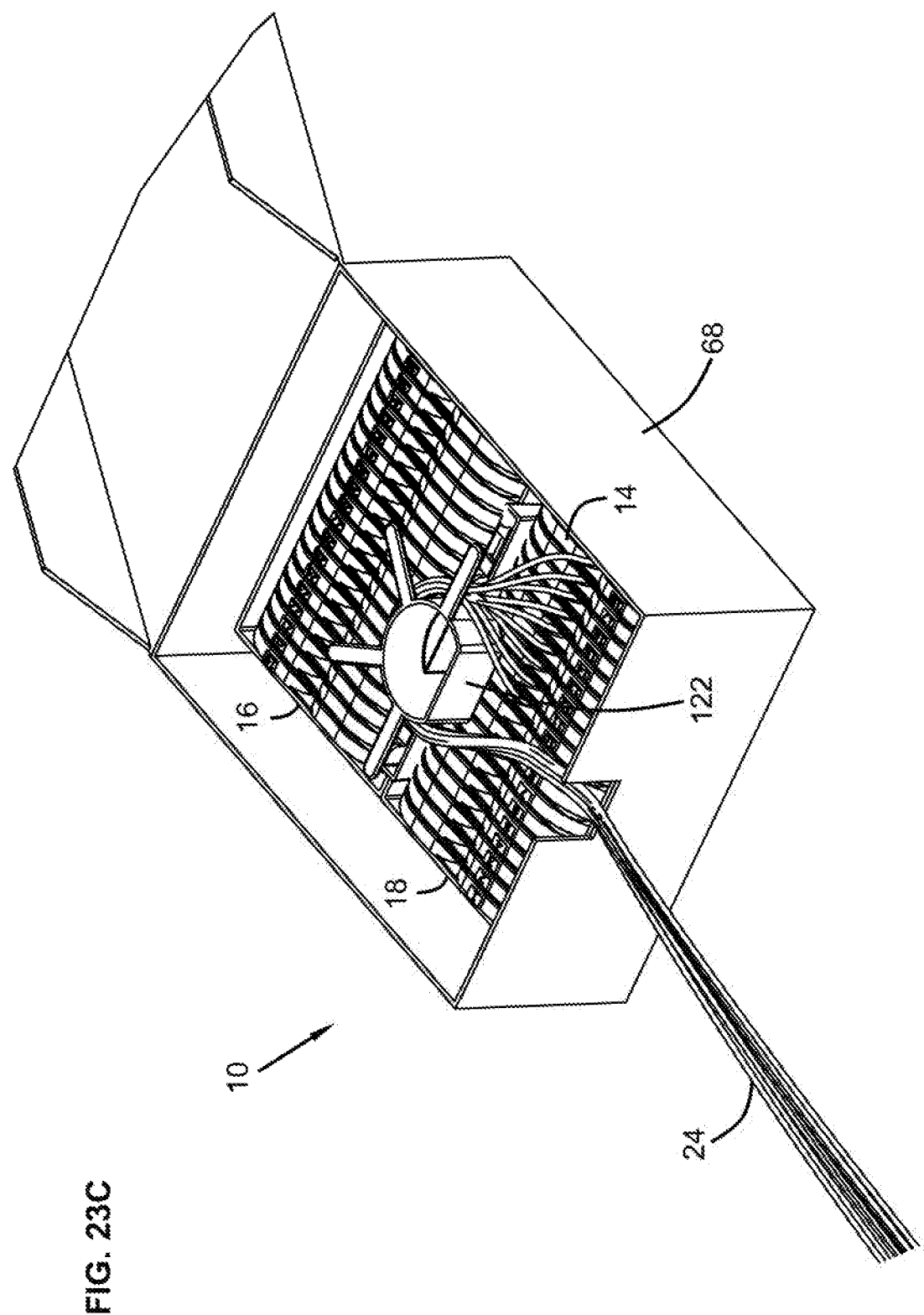
Figure 23D:
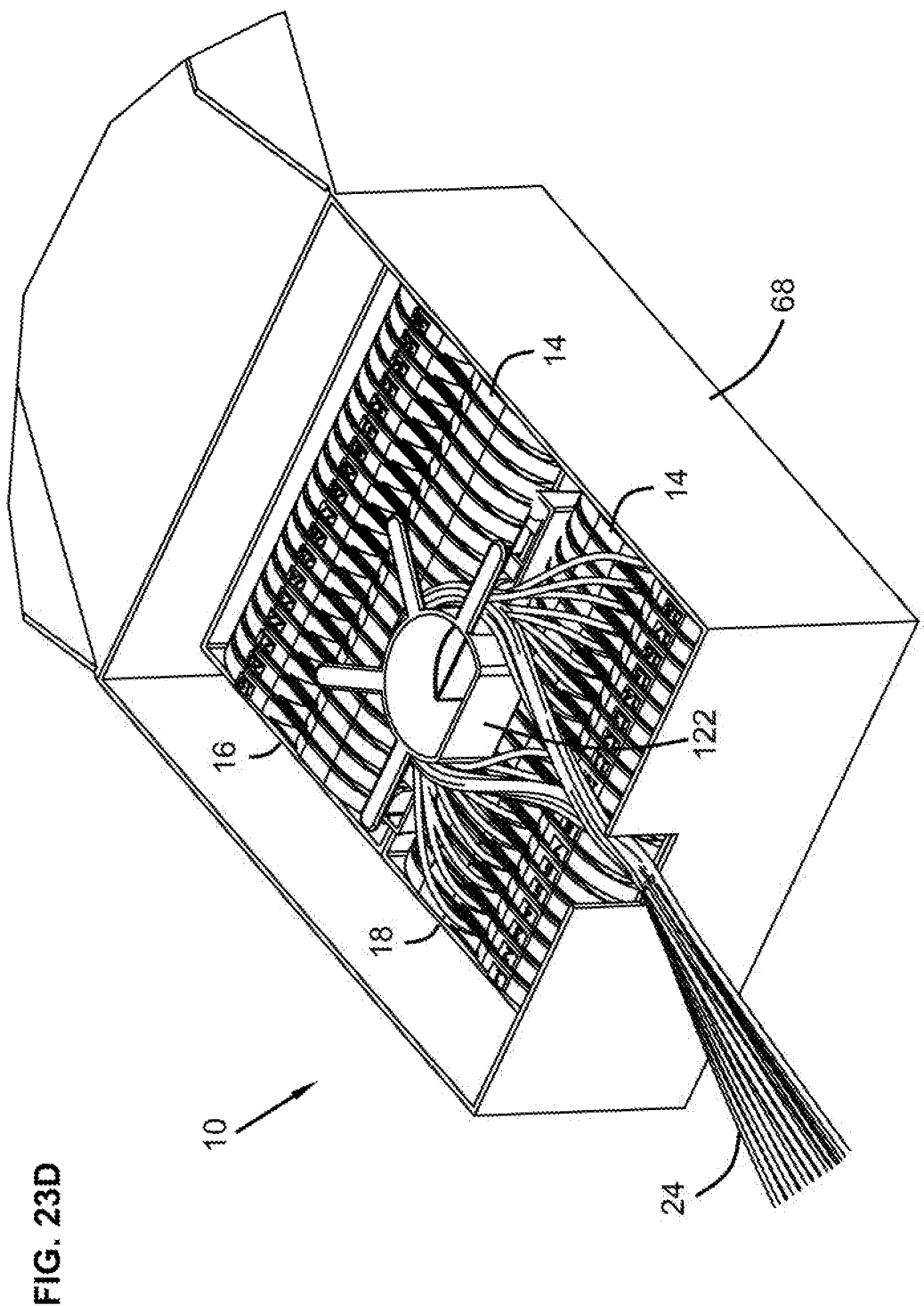

FIG. 23C illustrates cabling 24 from half of the modules 14 in the rear container 18 being routed around the radius limiter 122 with a "half turn". FIG. 23D illustrates the cabling 24 from a second half of the modules 14 in the rear container 18 crossing over the cabling 24 from the first half and being routed around the radius limiter 122 with a "half turn".

Figure 23E:
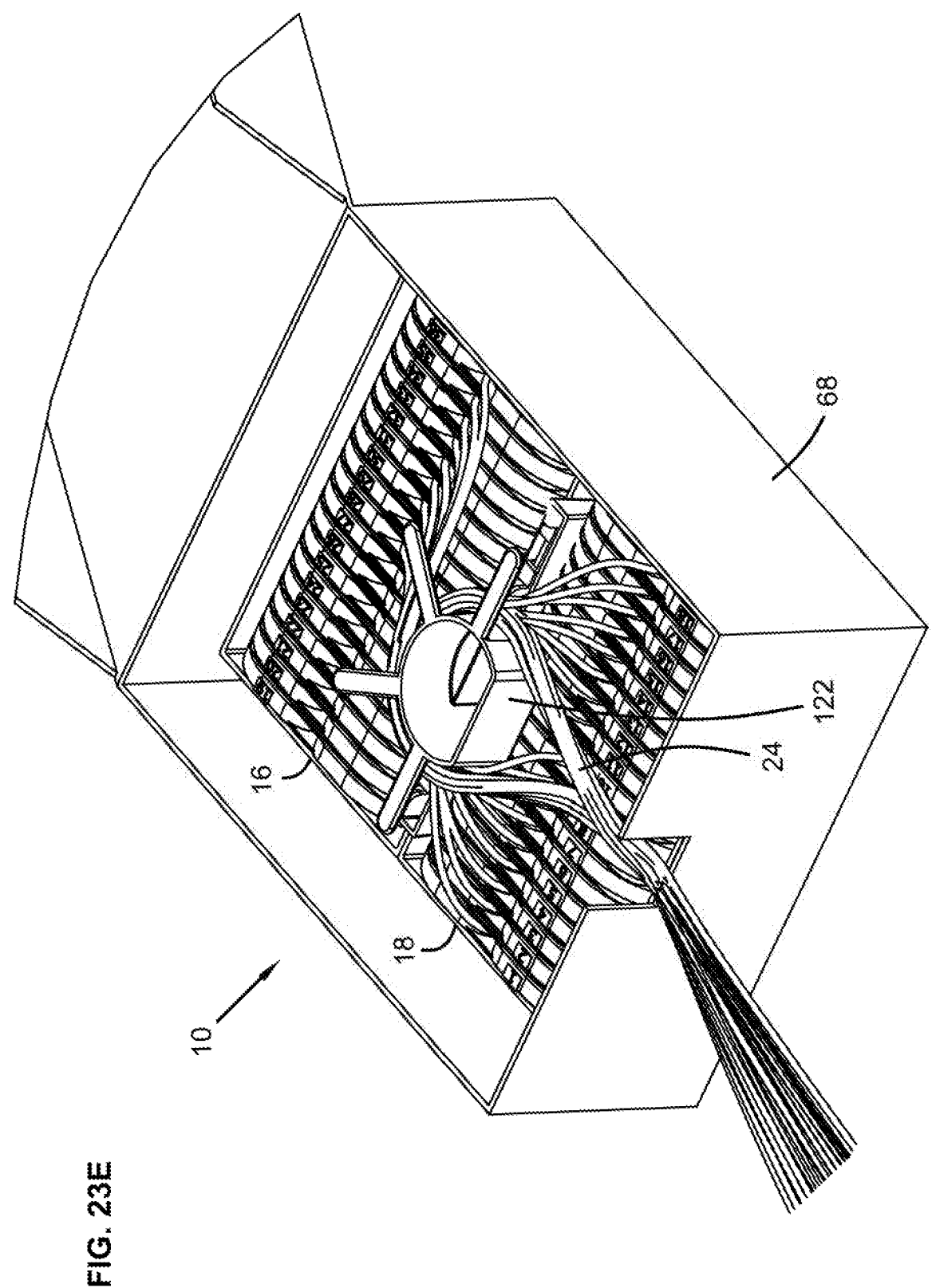
Figure 23F:
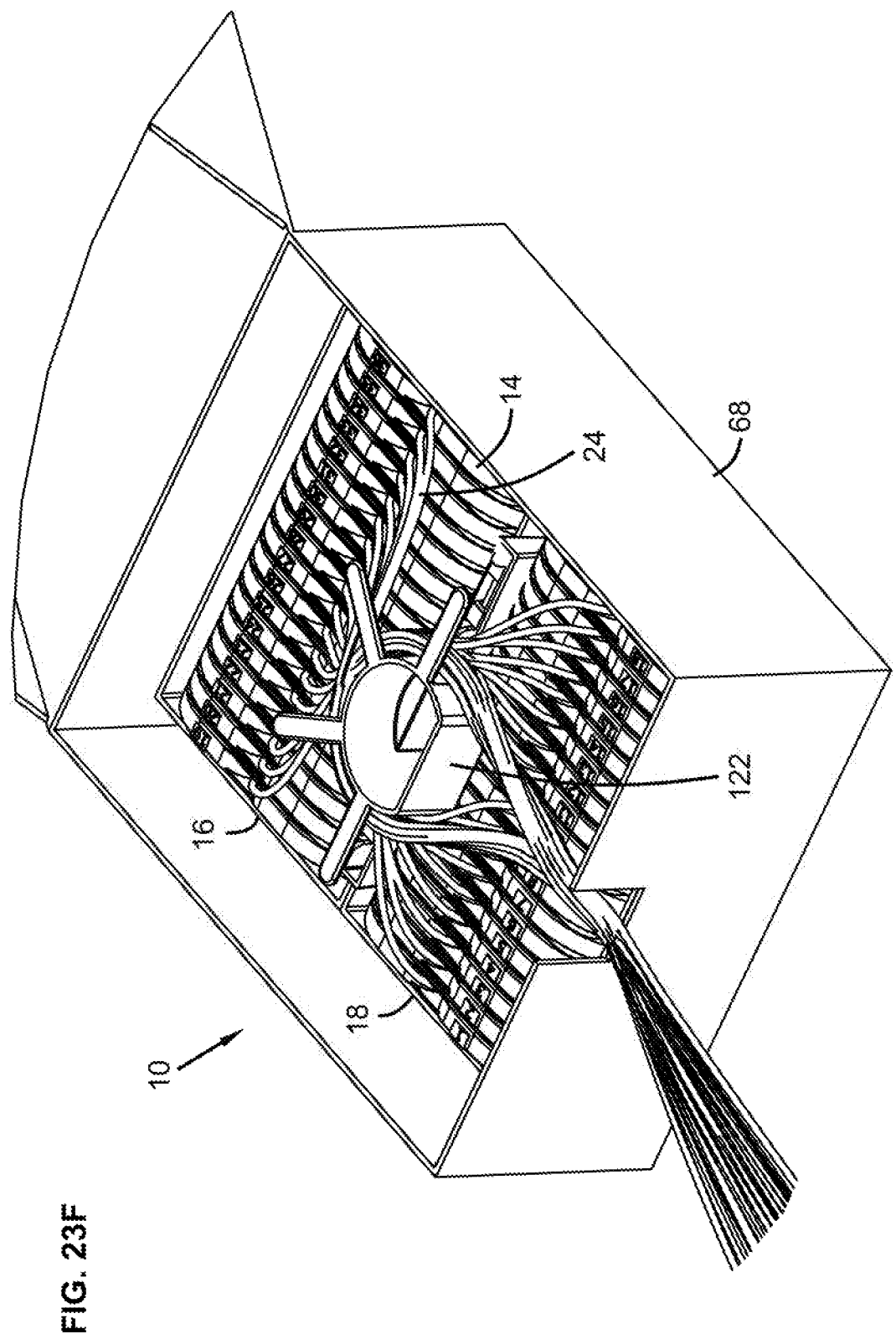

FIG. 23E illustrates cabling 24 from half of the modules 14 in the front container 16 being routed around the radius limiter 122 with a "quarter turn". FIG. 23F illustrates the cabling 24 from a second half of the modules 14 in the front container 16 crossing over the cabling 24 from the first half and being routed around the radius limiter 122 with a "quarter turn".

Figure 23G:
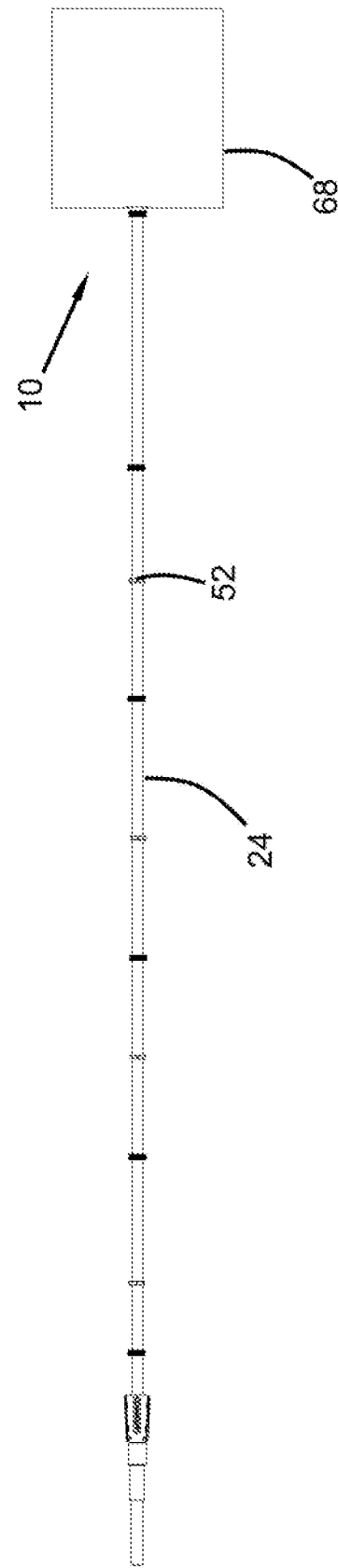

FIG. 23G illustrates the entire cable bundle 24 being lead out of the outer housing 68.

Figure 23H:
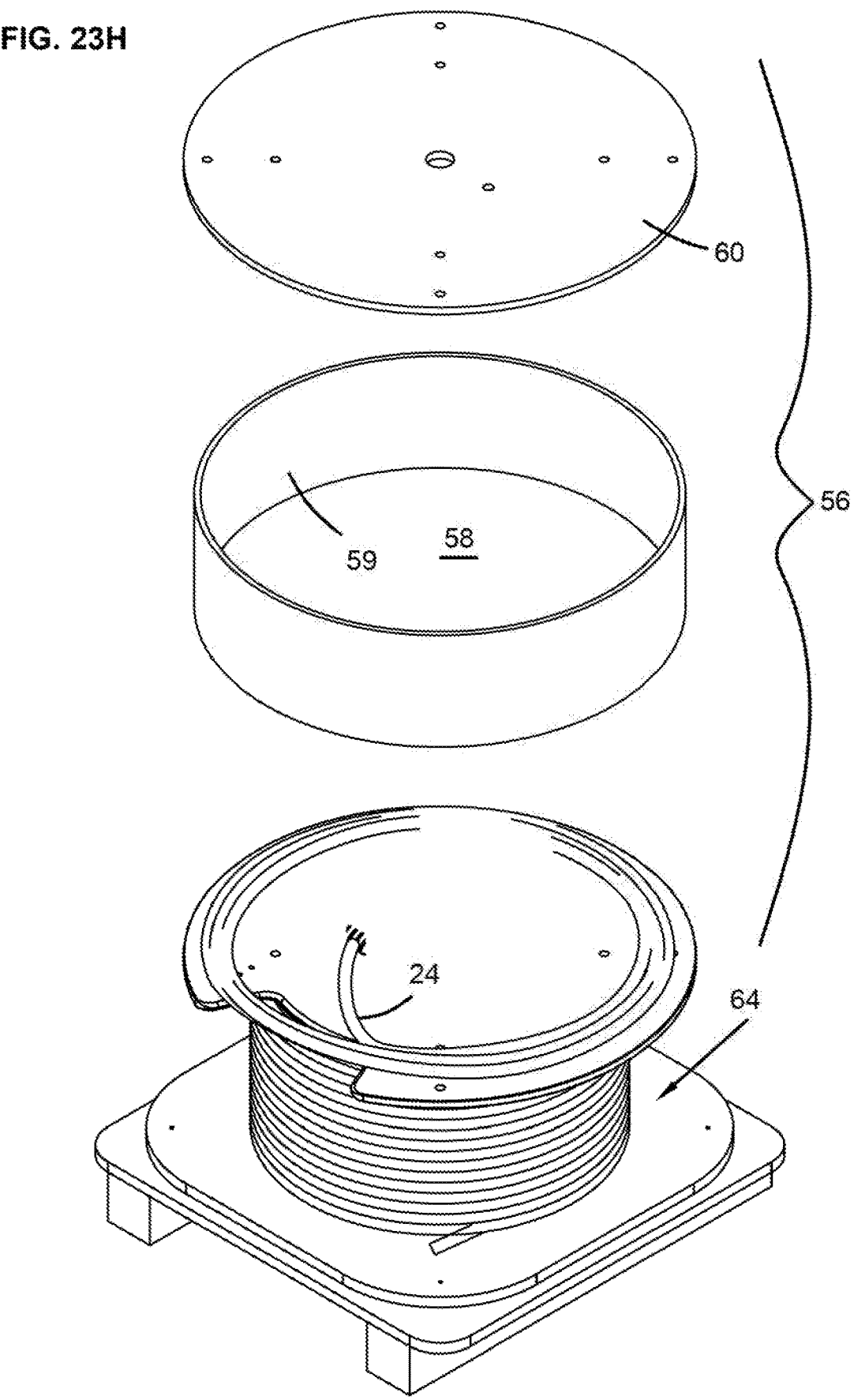

FIG. 23H illustrates the assembly of the closure 56 of FIGS. 8-9, where the cabling 24 coming from the interior 58 defined by the sidewall 59 and the cover 60 is spooled around the exterior spool region 64.

Figure 23I:
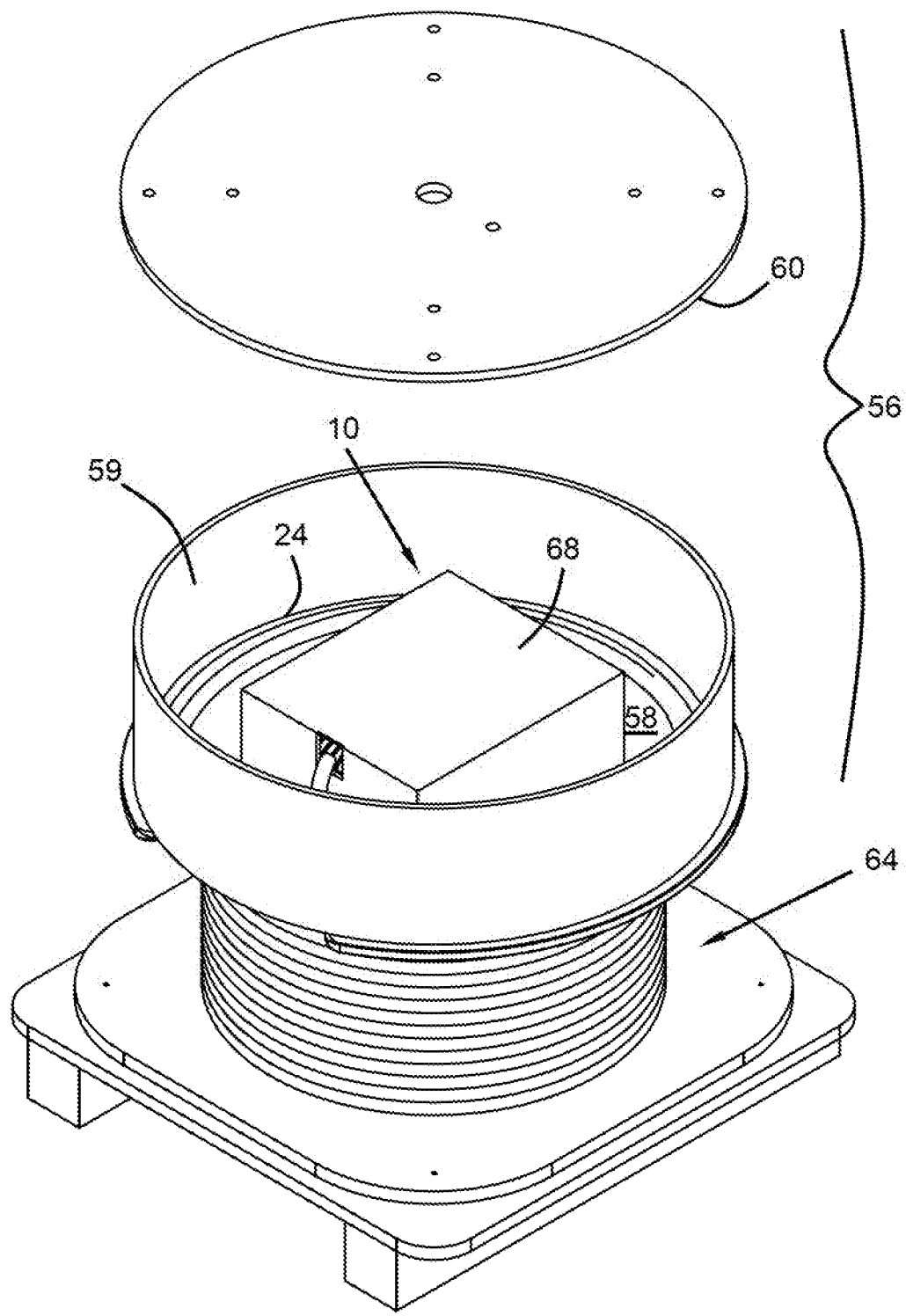
Figure 23J:
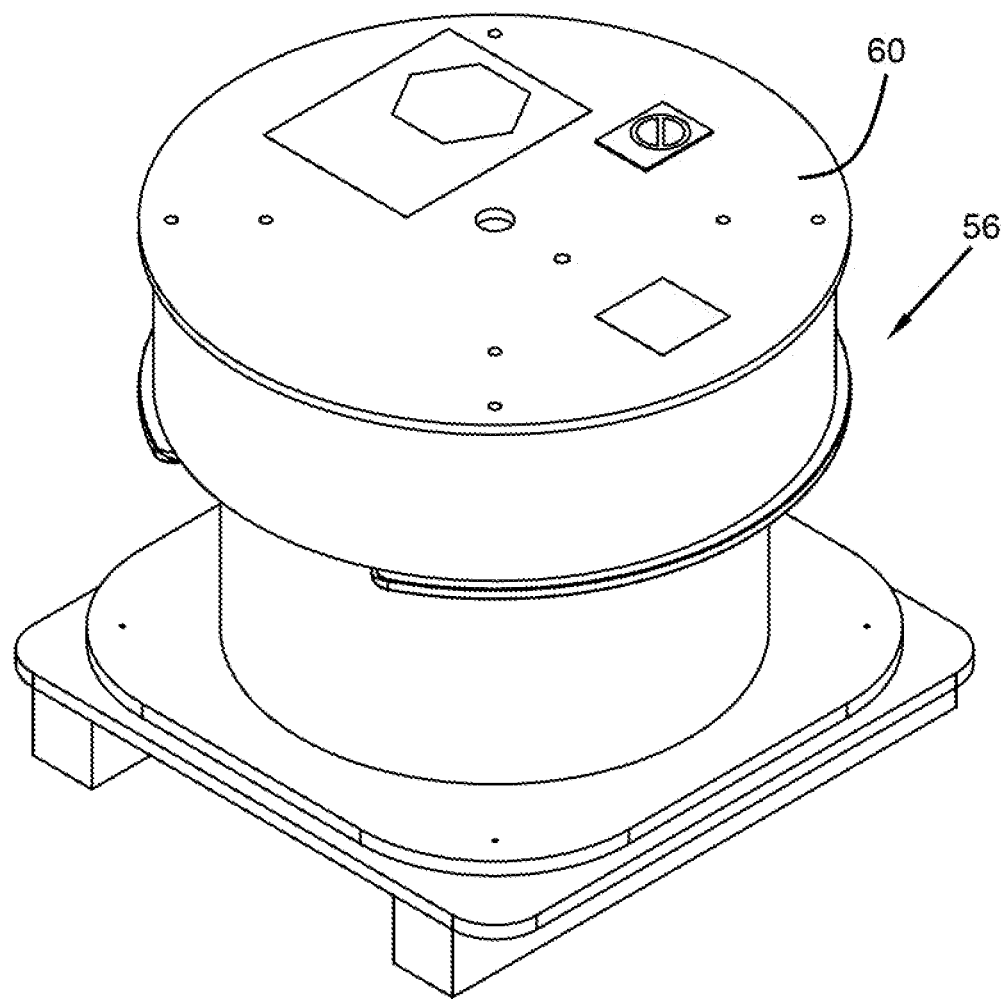
Figure 24:
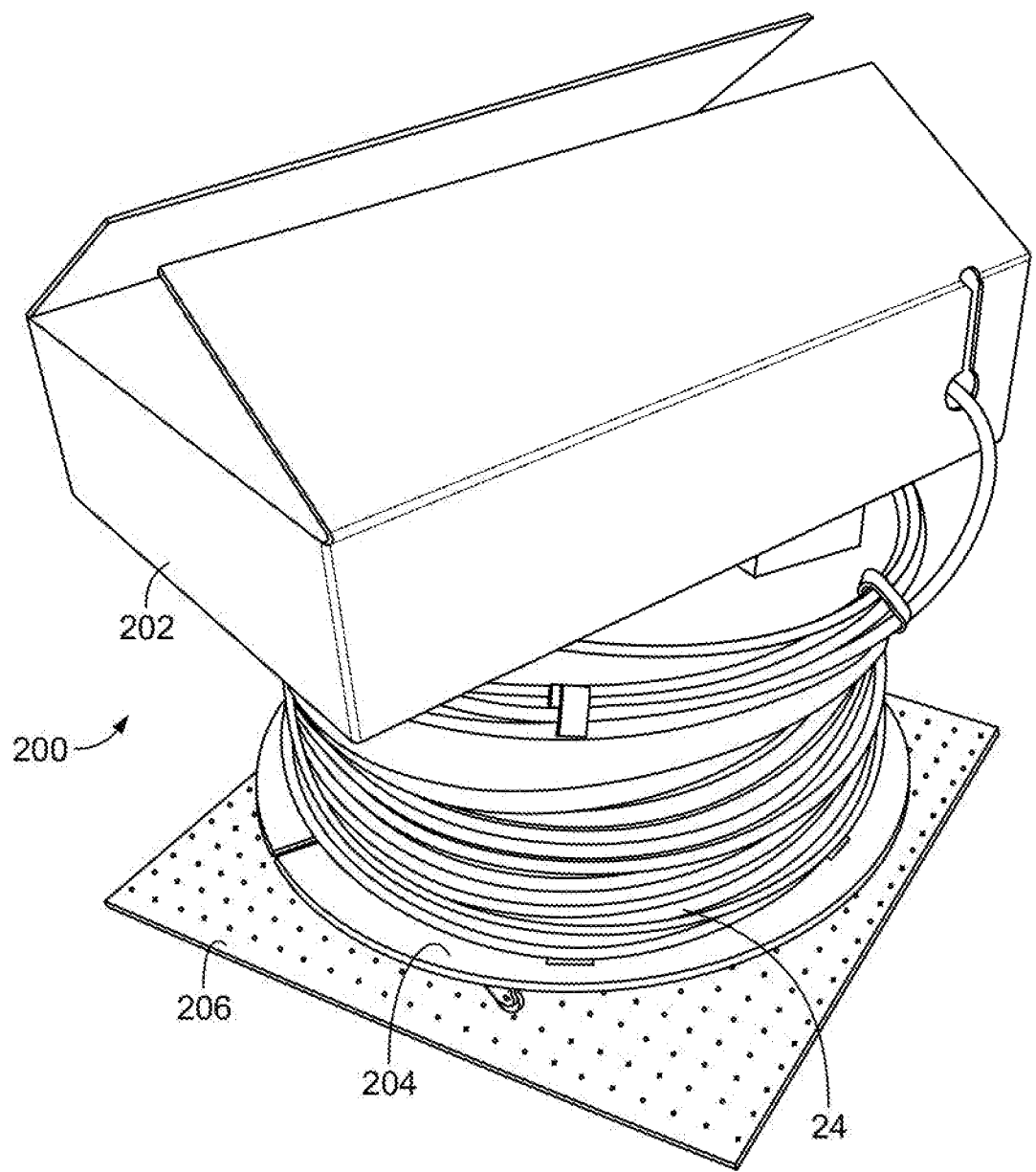
FIG. 24 illustrates another packaging assembly having features that are examples of inventive aspects in accordance with the present disclosure.
Figure 25:
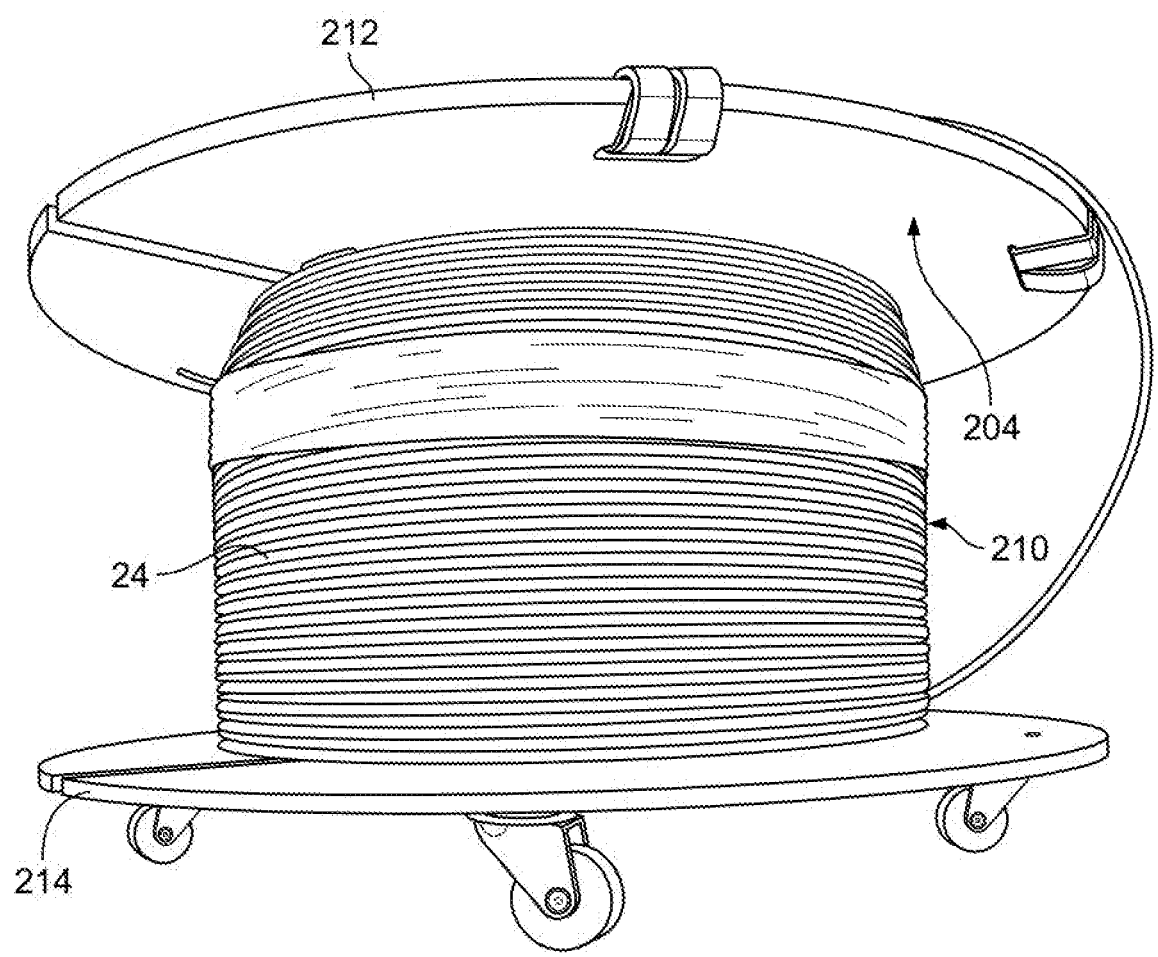
FIG. 25 illustrates the cable spool structure of the packaging assembly of FIG. 24 with a length of cabling wound therein.
Figure 26:
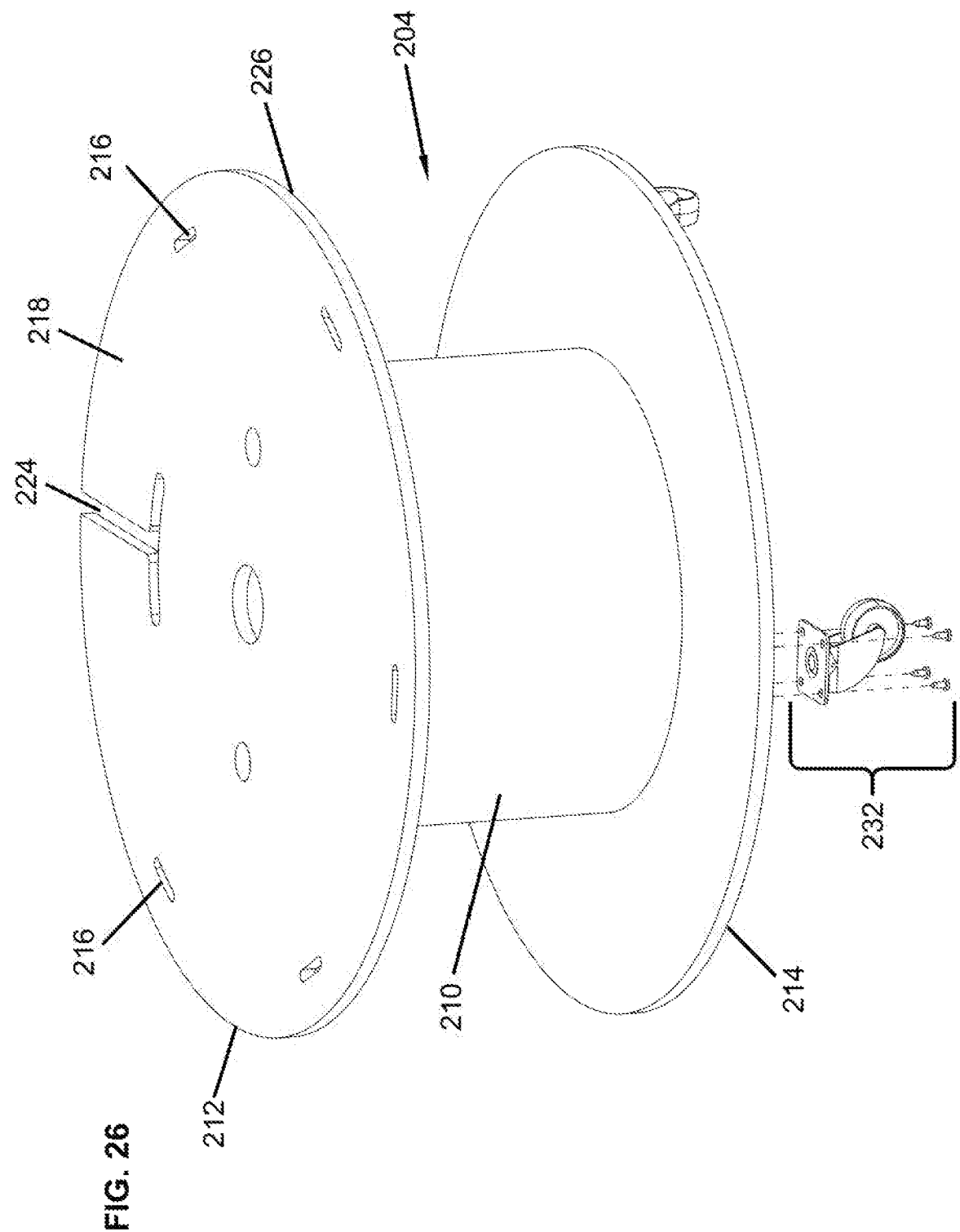
FIG. 26 is an exploded view of the cable spool structure of FIG. 25.
Figure 27:
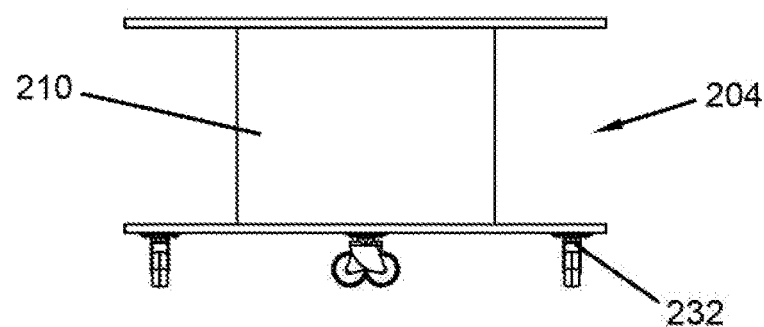
FIG. 27 is a side view of the cable spool structure of FIG. 25.
Figure 28:
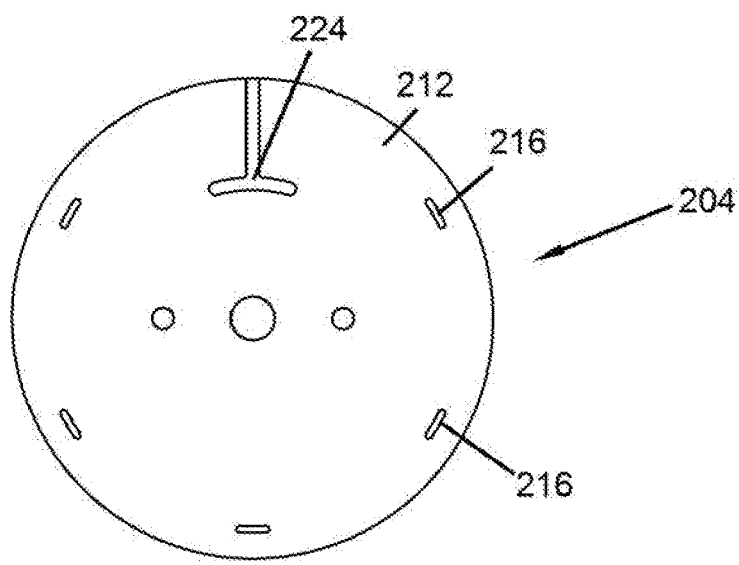
FIG. 28 is a top view of the cable spool structure of FIG. 25.
Figure 29:
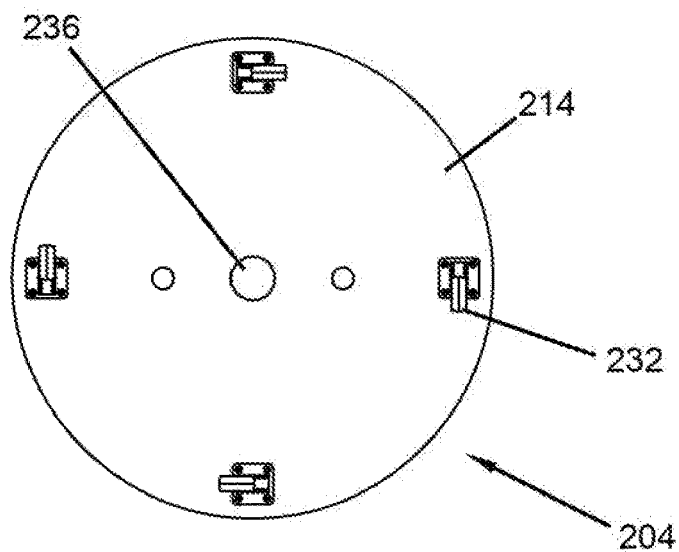
FIG. 29 is a bottom view of the cable spool structure of FIG. 25.
Figure 30:
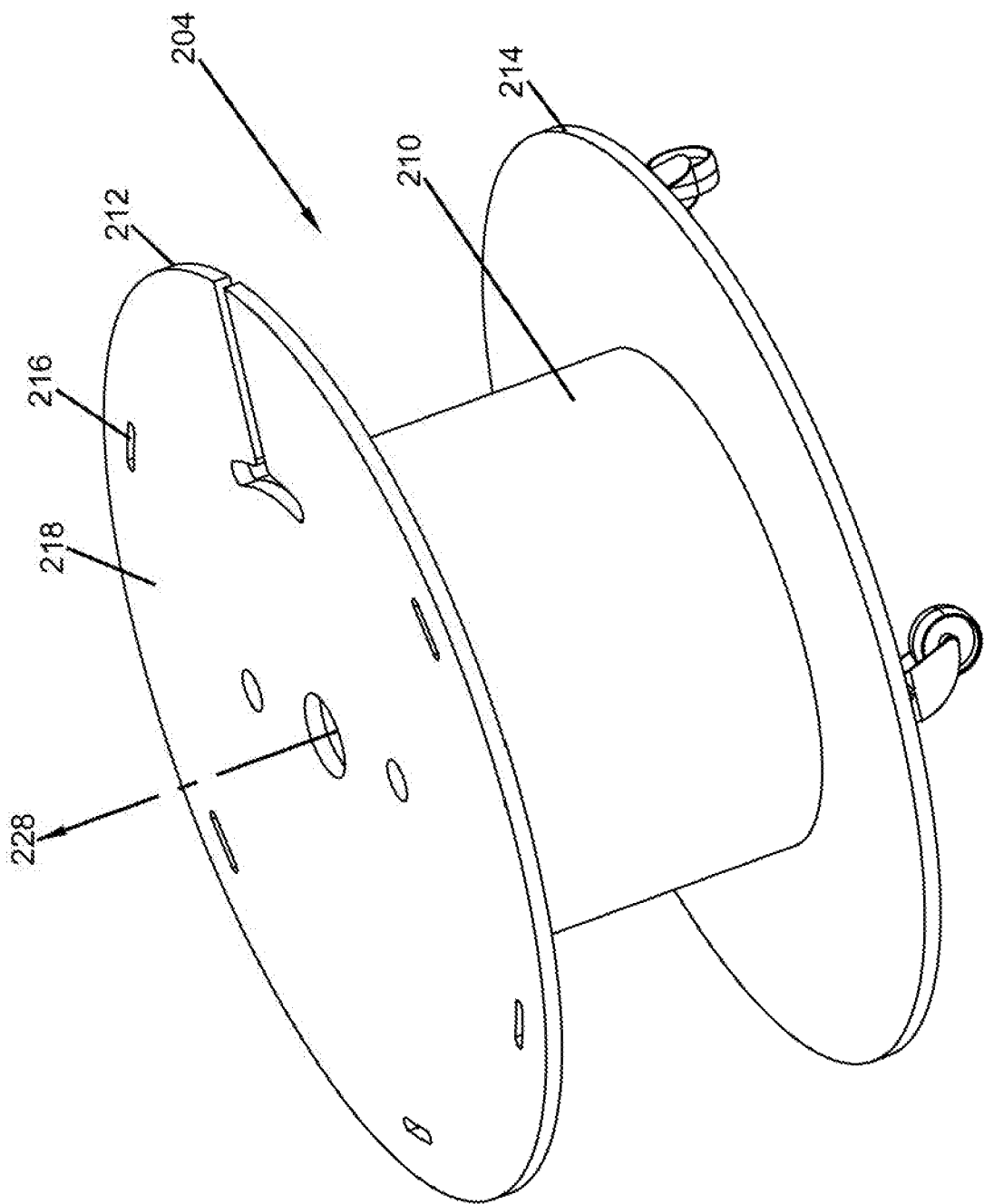
FIG. 30 is a top perspective view of the cable spool structure of FIG. 25.
Figure 31:
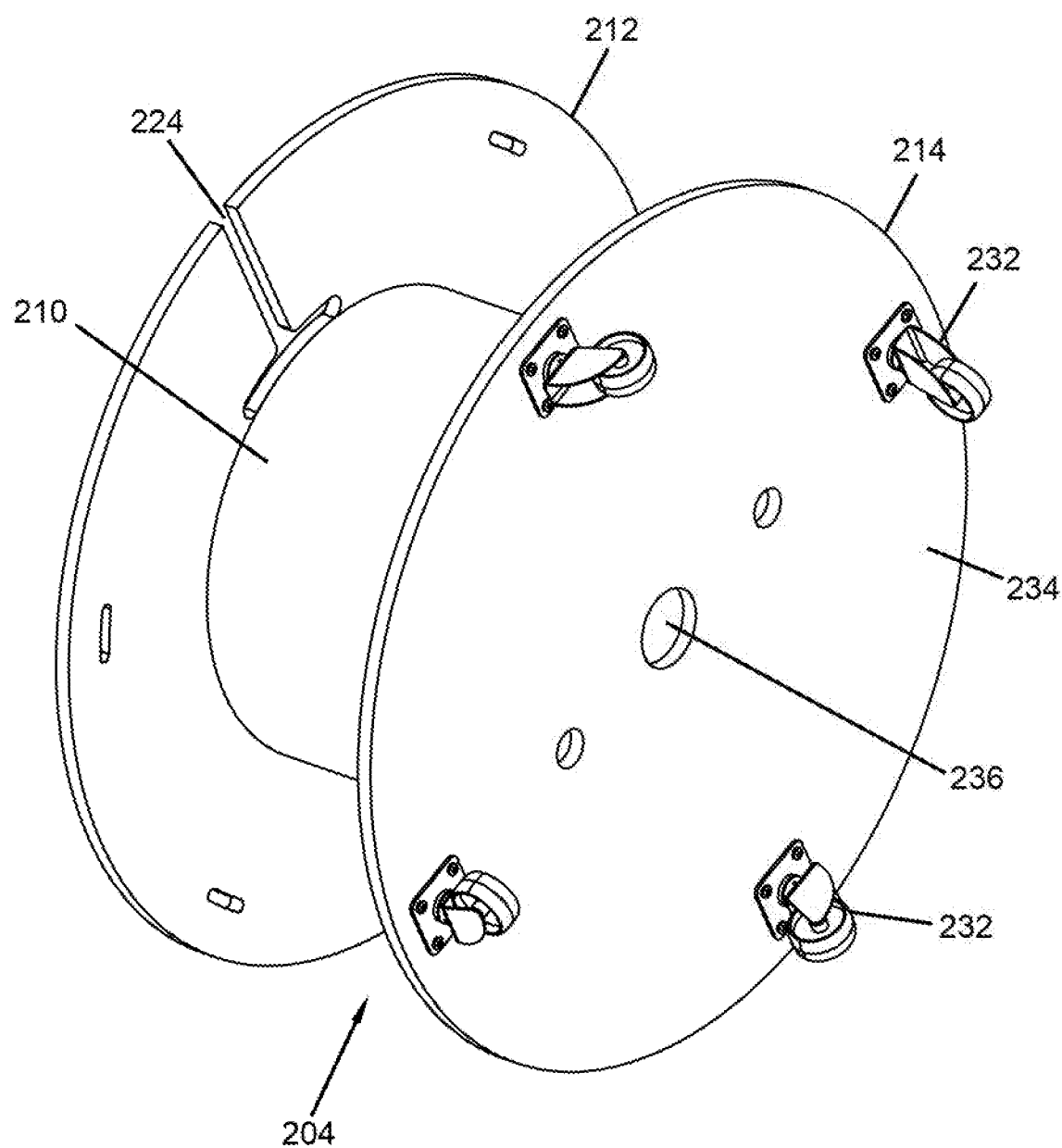
FIG. 31 is a bottom perspective view of the cable spool structure of FIG. 25.
Figure 32:
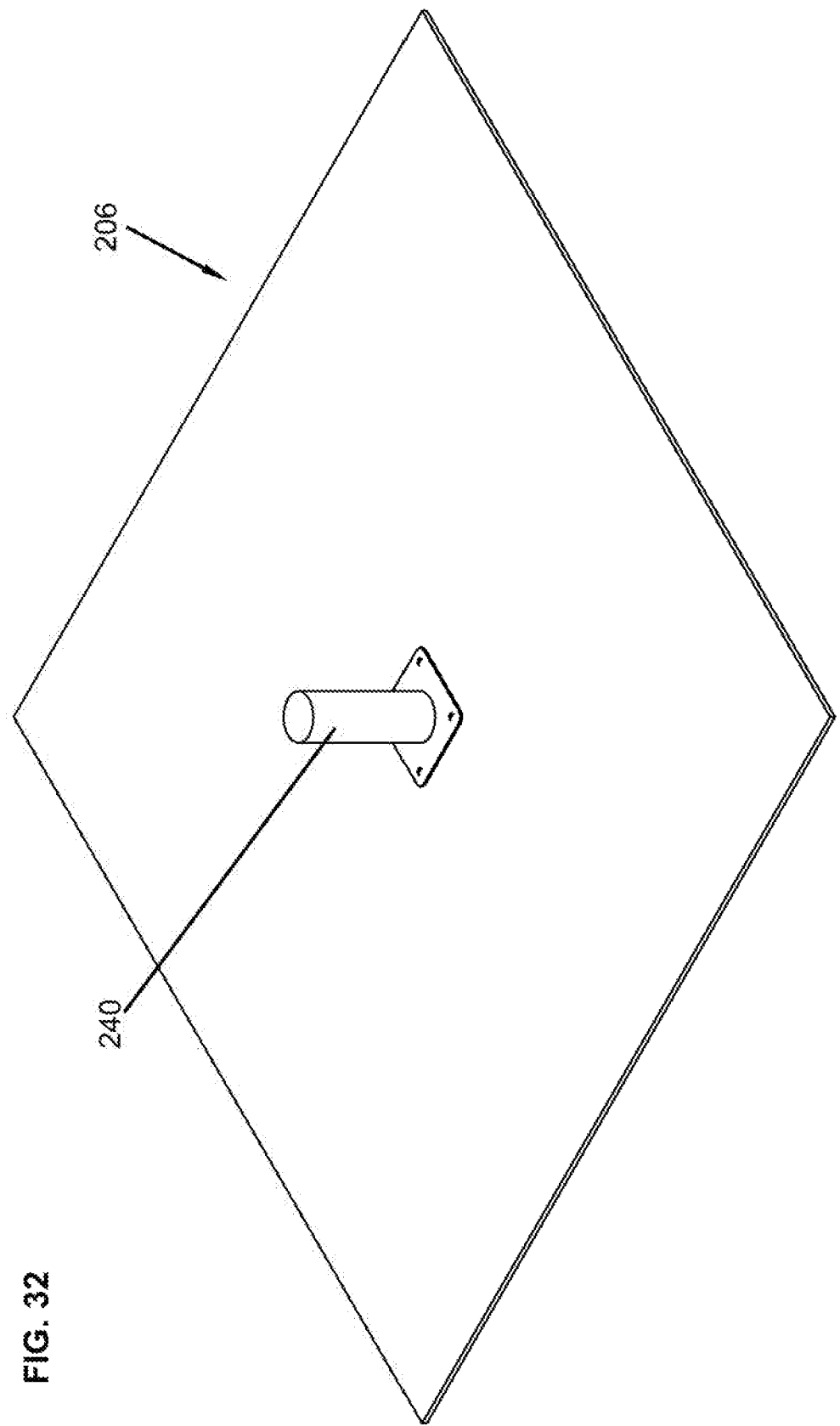
FIG. 32 is a perspective view of the base plate of the packaging assembly of FIG. 24.
Figure 33:
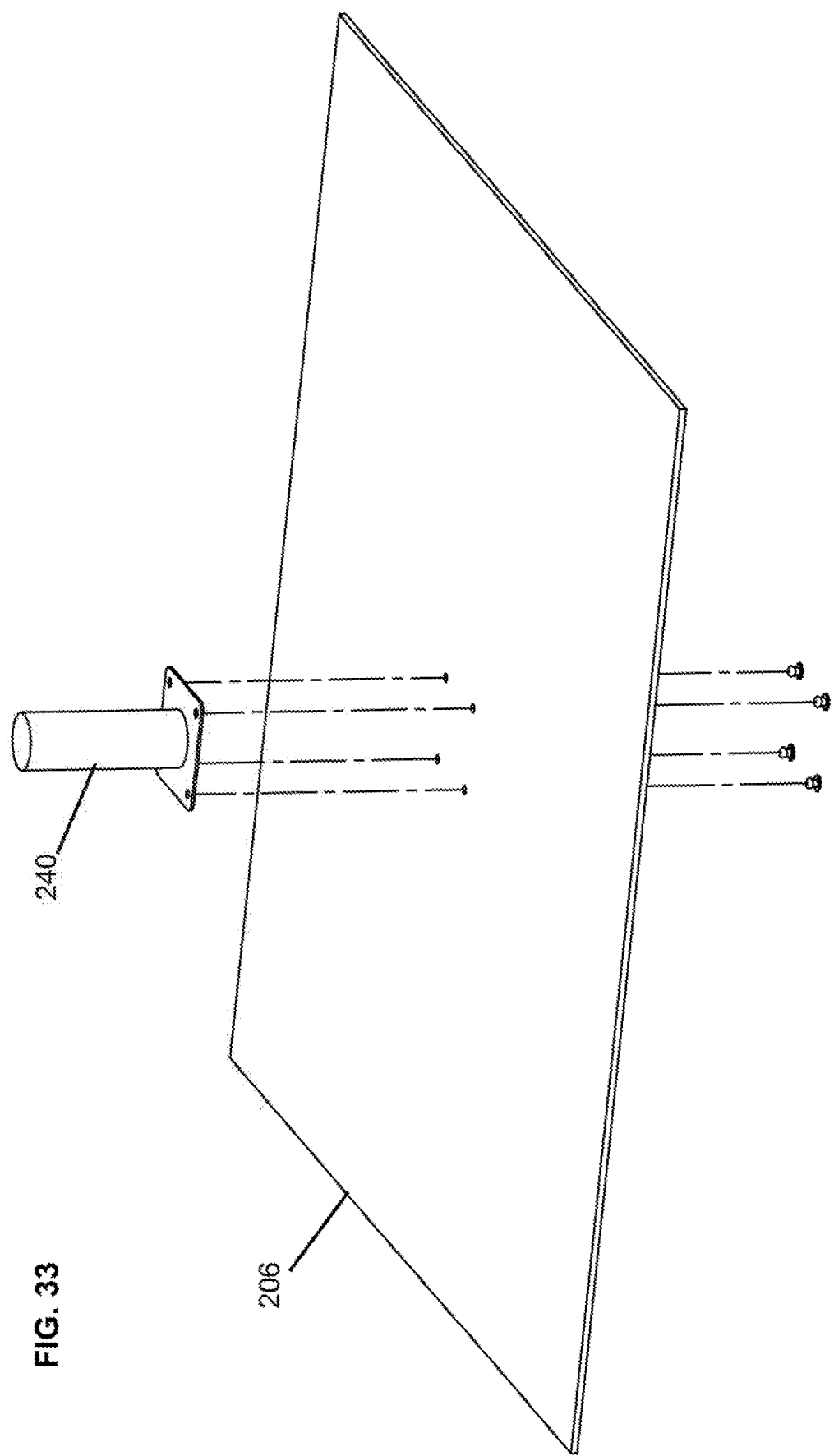
FIG. 33 illustrates the base plate of FIG. 32 in an exploded configuration.
Figure 34:
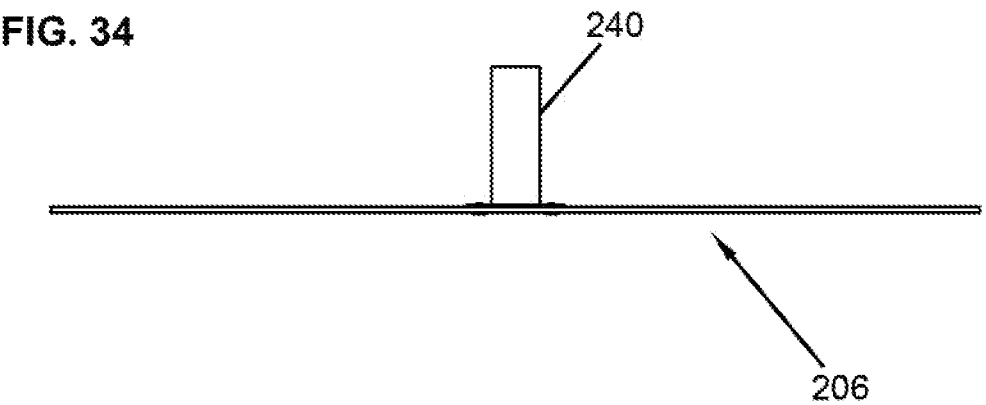
FIG. 34 is a side view of the base plate of FIG. 32.
Figure 35:
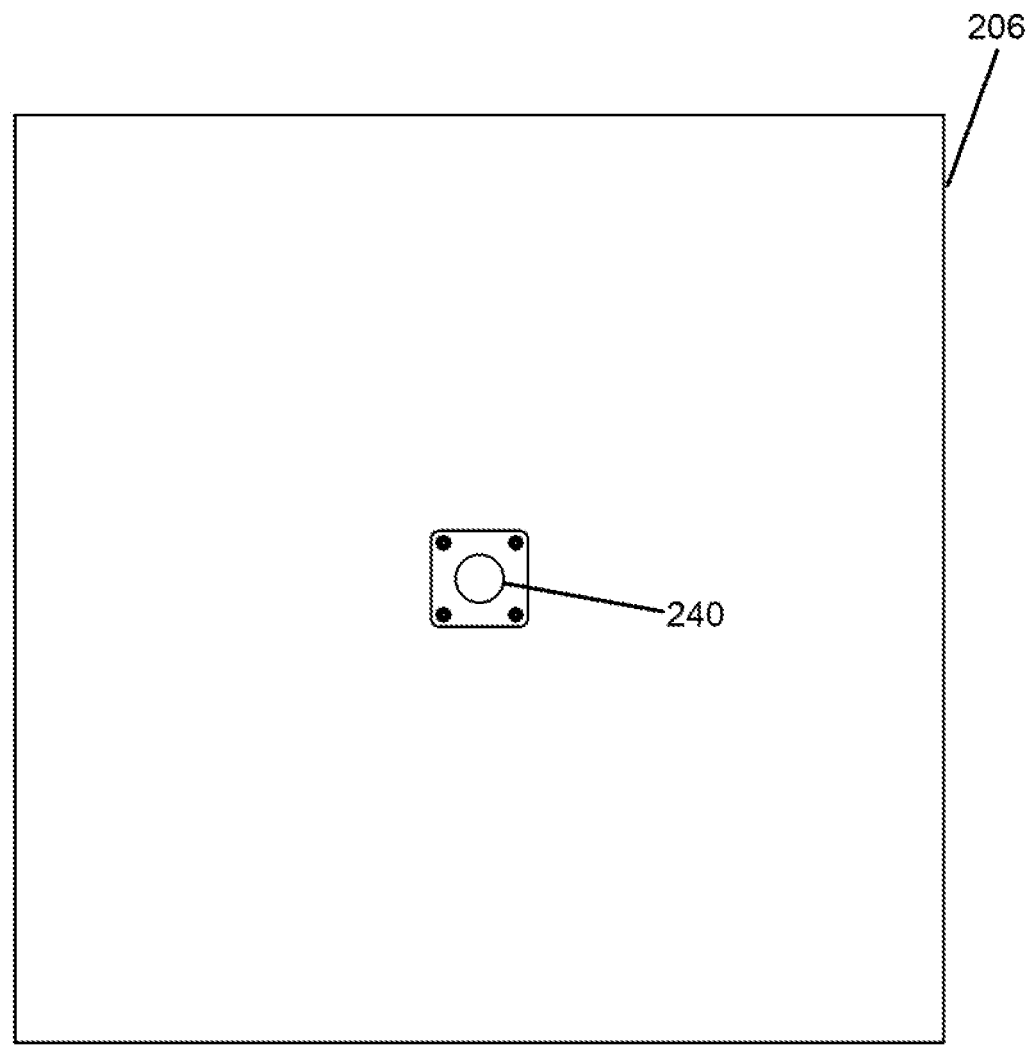
FIG. 35 is a top view of the base plate of FIG. 32.

FIG. 23I illustrates the outer housing 68 (with the first and second containers 16, 18 therein) being placed within the interior 58 of the closure 56. It should be noted that this step is slightly different than that shown in FIGS. 8 and 9 where the first and second containers 16, 18 were directly placed within the interior 58 of the closure 56 without the use of an outer housing 68. Both options are possible. And, FIG. 23J illustrates the cover 60 of the closure 56 being fastened to the closure 56 to retain the packaging assembly 10 within the closure.

It should be noted that the installation steps illustrated in FIGS. 23A-23J are simply representative of one example of preparing the packaging assembly 10 of FIGS. 1-14. The order of the steps, as well as the steps themselves, may vary depending on the packaging needs.

Now referring to FIGS. 24-43, another version of a packaging assembly 200 for accommodating long segments of fiber optic cabling 24 extending from telecommunications equipment 202 is illustrated, where the packaging assembly 200 is configured to facilitate transport and deployment of the equipment 202 and the associated cabling 24.

In the depicted embodiment, the packaging assembly 200 includes a cable spool structure 204 and a base plate 206. As will be discussed in further detail, both the cable spool structure 204 and the base plate 206 may be placed within an outer box 208 during transport of the assembly 200.

Illustrated in isolation in FIGS. 25-31, the cable spool 204 defines a cable winding portion 210 separated by an upper flange 212 and a lower flange 214. In the depicted example, the cable winding portion 210 is generally cylindrical and is configured for accommodating a majority of the excess cabling 24 extending from the telecommunications equipment 202 to be supported by the packaging assembly 200.

Figure 43:
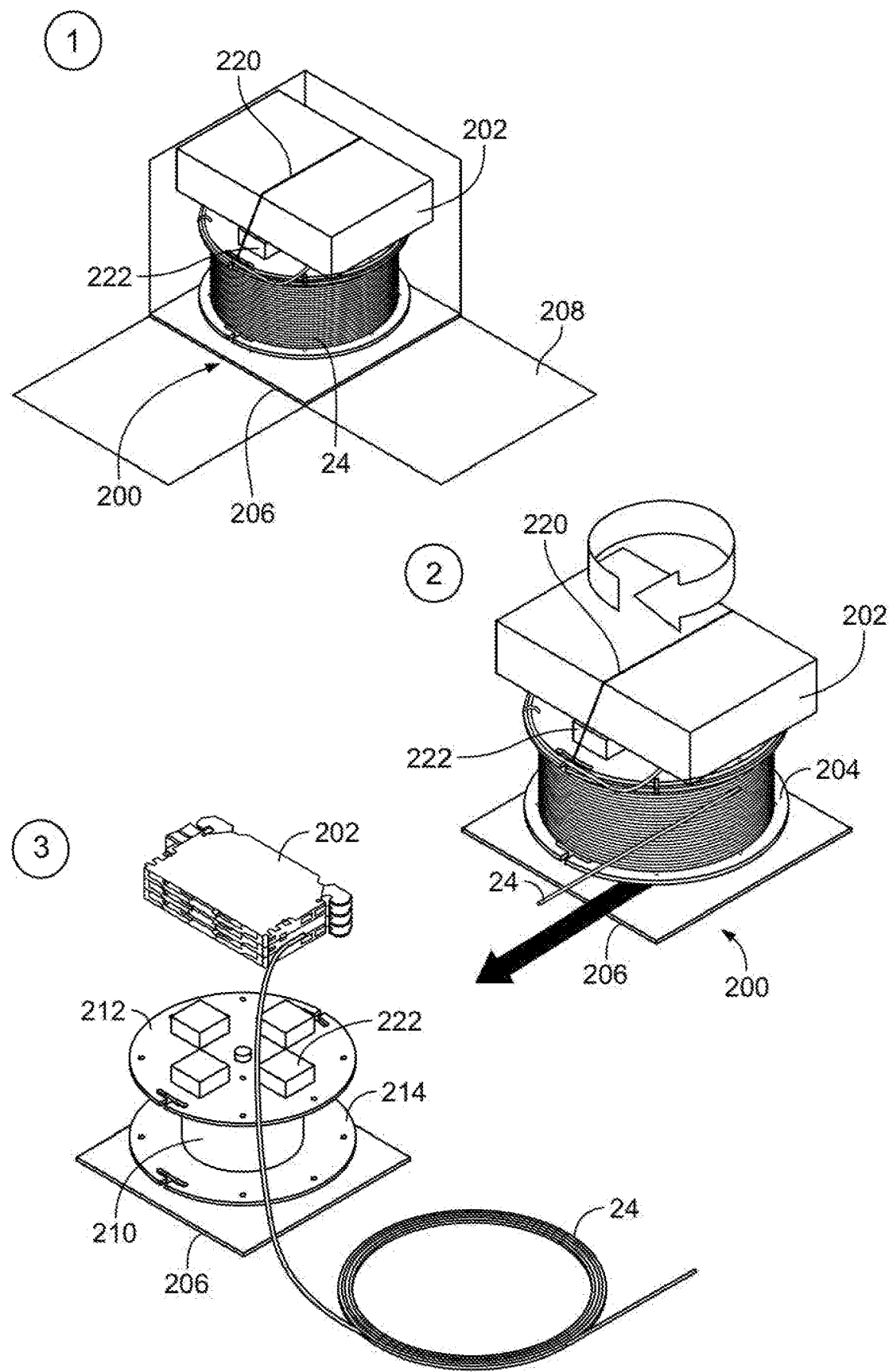
FIG. 43 illustrates the installation instructions that might be provided to a customer to be used for installing a piece of telecommunications equipment with the packaging assembly of FIGS. 24-42.

The upper flange 212 of the cable spool 204 is used for supporting the piece of telecommunications equipment 202. An example of such equipment 202 is shown in FIG. 43. The example illustrated in FIG. 43 is generally a frame or chassis system where long segments of cabling 24 extending therefrom would need to be spliced to incoming plant cabling. Further details relating to a frame system such as the equipment 202 shown in FIG. 43 that can be supported by the packaging assembly 200 of the present disclosure is described in WO2014118227A1, the entire disclosure of which is incorporated herein by reference.

The frame system illustrated in FIG. 43 is simply one example of a piece of telecommunications equipment 202 that can be used with the packaging assembly 200 and is simply used to describe the inventive features thereof. The packaging assembly 200 of FIGS. 24-43 can be used with virtually any telecommunications equipment 202 where long segments of cabling 24 extending from the equipment 202 needs to be accommodated during transport and deployment.

For example, the packaging assembly 200 may be used to support an outer housing similar to the outer housing 68 discussed above that might house module-holding containers such as the first and second containers 16, 18. Other equipment is certainly possible.

Figure 36:
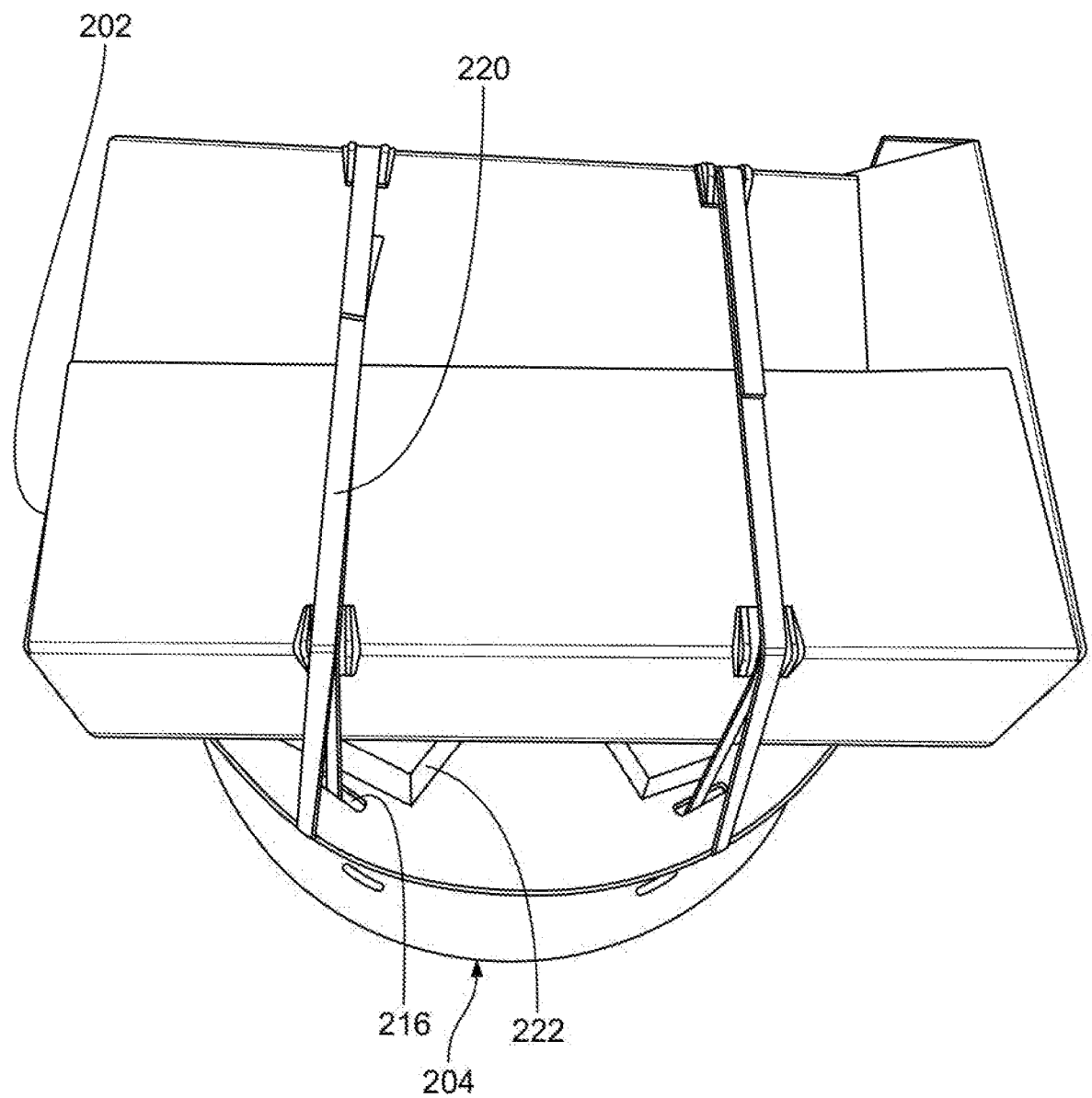
FIG. 36 illustrates a piece of telecommunications equipment strapped on the cable spool structure of FIG. 25.

Referring back to FIGS. 25-31, the upper flange 212 defines a plurality of slots 216 adjacent the outer perimeter thereof. The slots 216 may be used for strapping down the equipment 202 to be supported on a top surface 218 of the upper flange 212. Straps 220 may be used as seen in FIG. 36.

Figure 39:
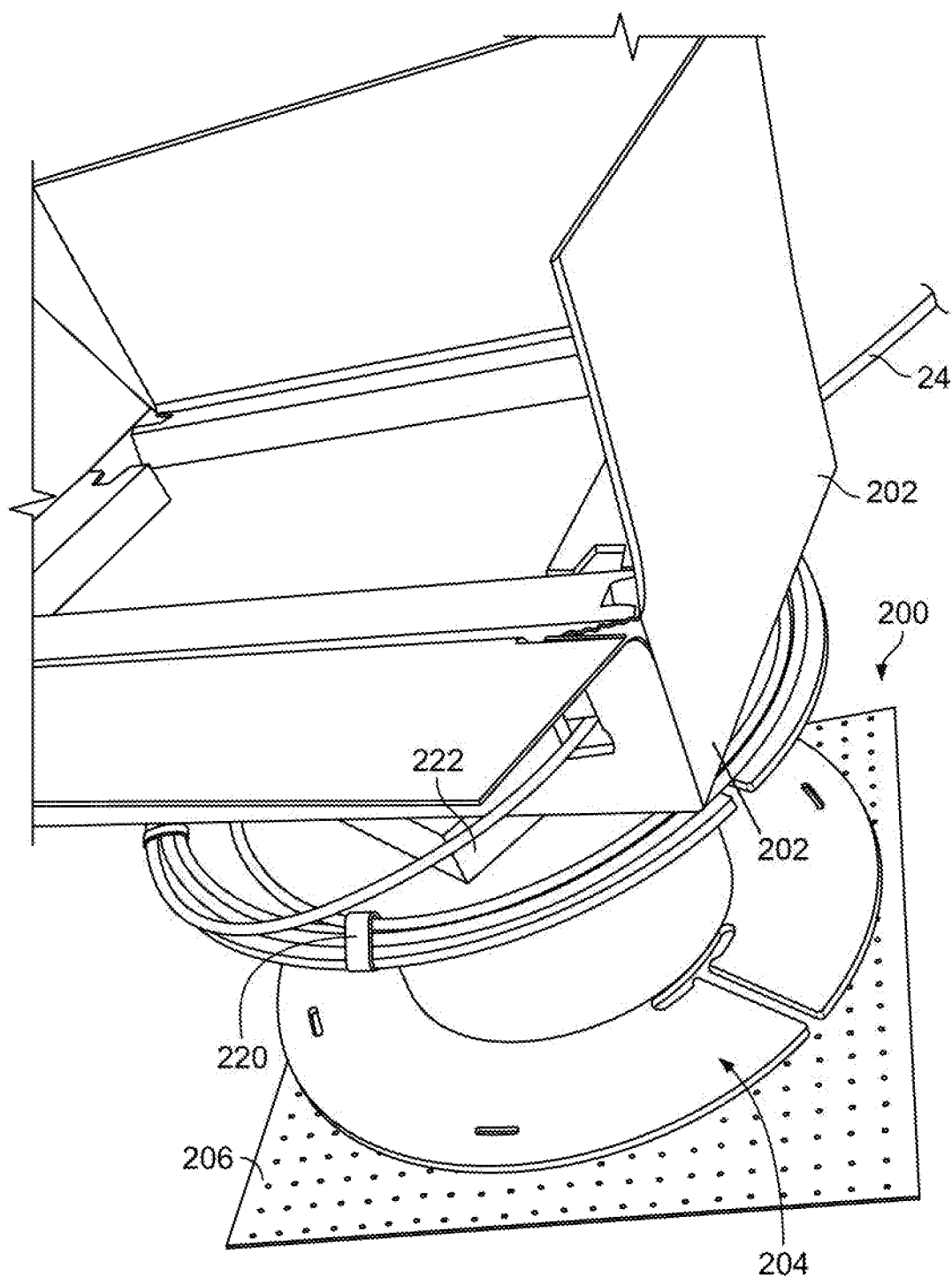
FIG. 39 illustrates the packaging assembly of FIG. 37 with some of the cabling having been unwound from the cable spool structure.
Figure 40:
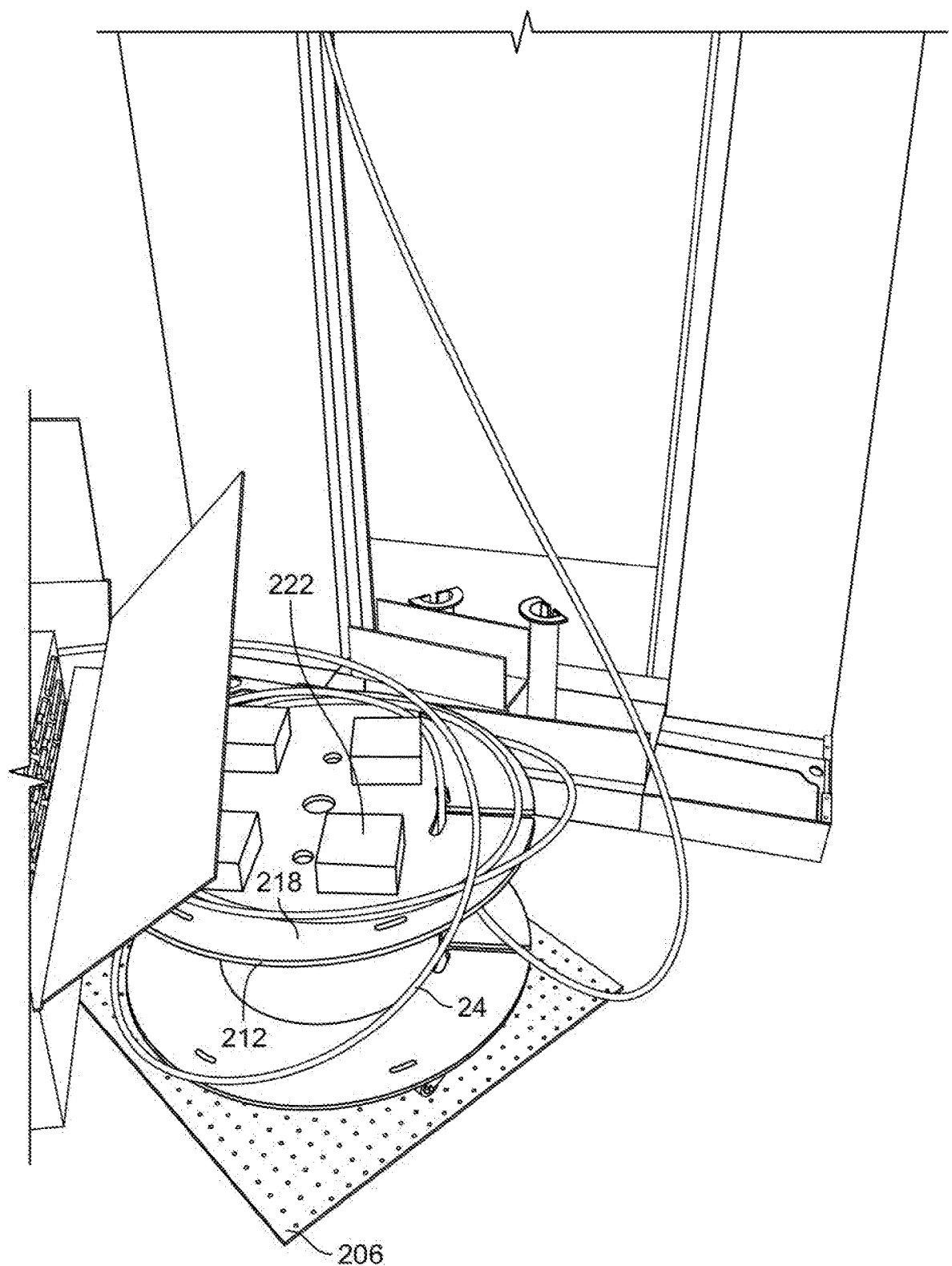
FIG. 40 illustrates the packaging assembly of FIG. 37 with the telecommunications equipment having been removed from the packaging assembly and most of the cabling having been removed from the cable spool structure.
Figure 41:
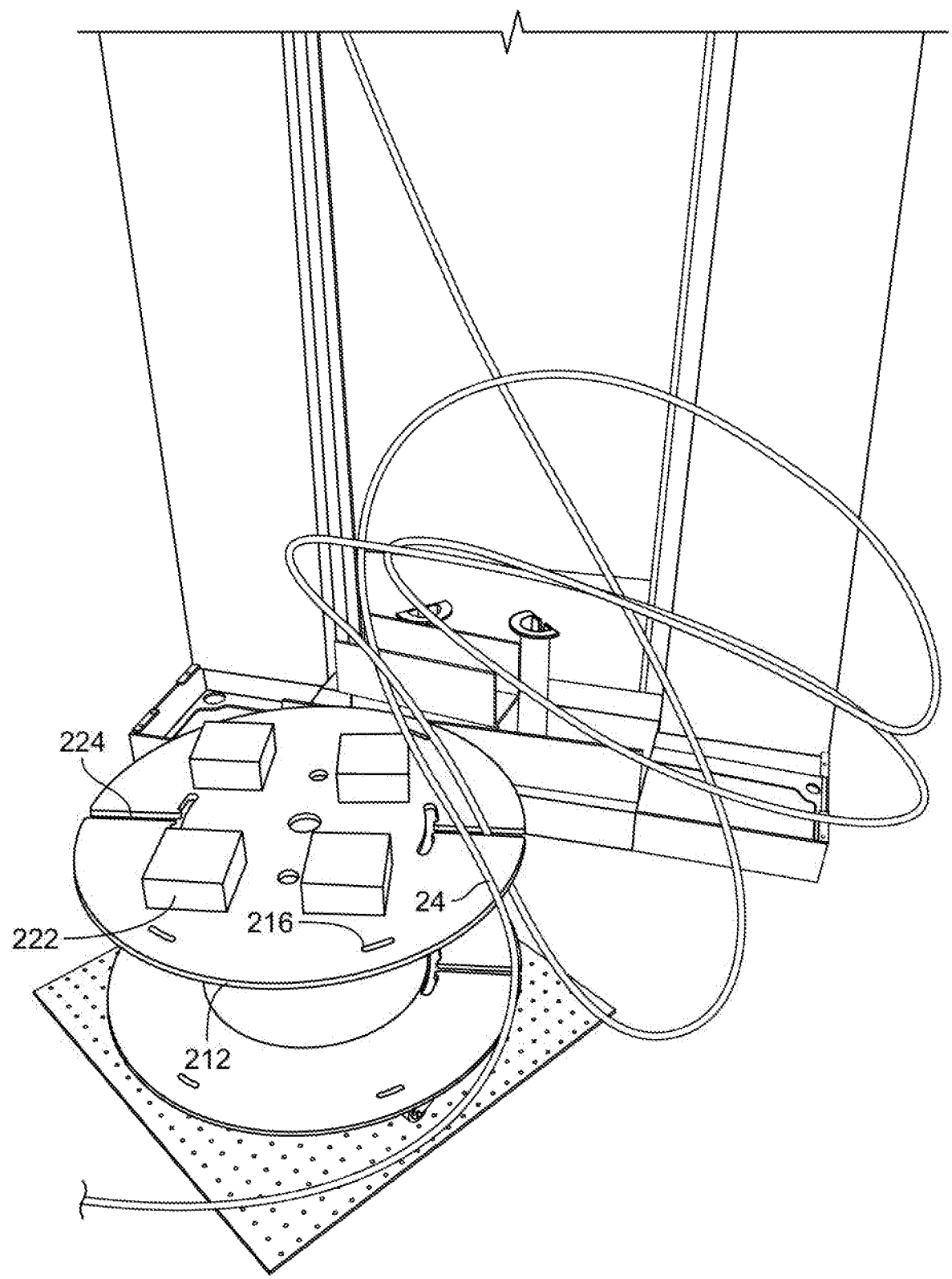
FIG. 41 illustrates the final stages of the deployment of the cabling from the packaging assembly of FIG. 37.
Figure 42:
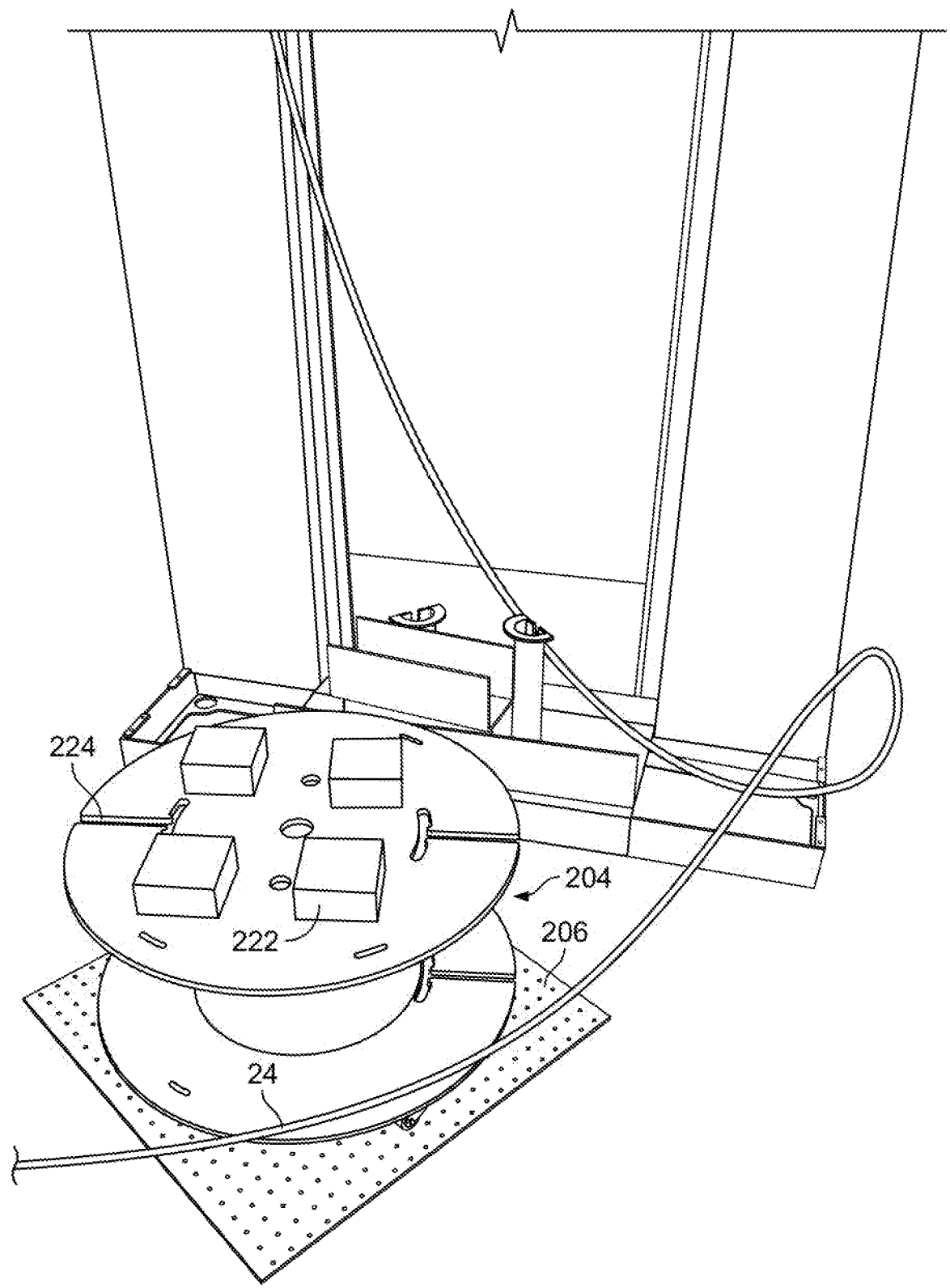
FIG. 42 illustrates the telecommunications equipment having been completely removed from the packaging assembly of FIG. 37.

As shown in FIGS. 40-42, structures 222 such as pieces of foam or other cushioning structures may be placed between the equipment 202 and the top surface 218 of the upper flange 212. This provides a certain amount of protection to the equipment 202 during transport. The cushioning pieces 222 also provide some spacing between the equipment 202 and the top 218 of the upper flange 212. As shown in FIGS. 37-40, this spacing may be used for accommodating some of the cabling 24 extending from the equipment 202 in addition to the rest of the length of cabling 24 that is wound around the cable winding portion 210 of the cable spool 204.

Figure 37:
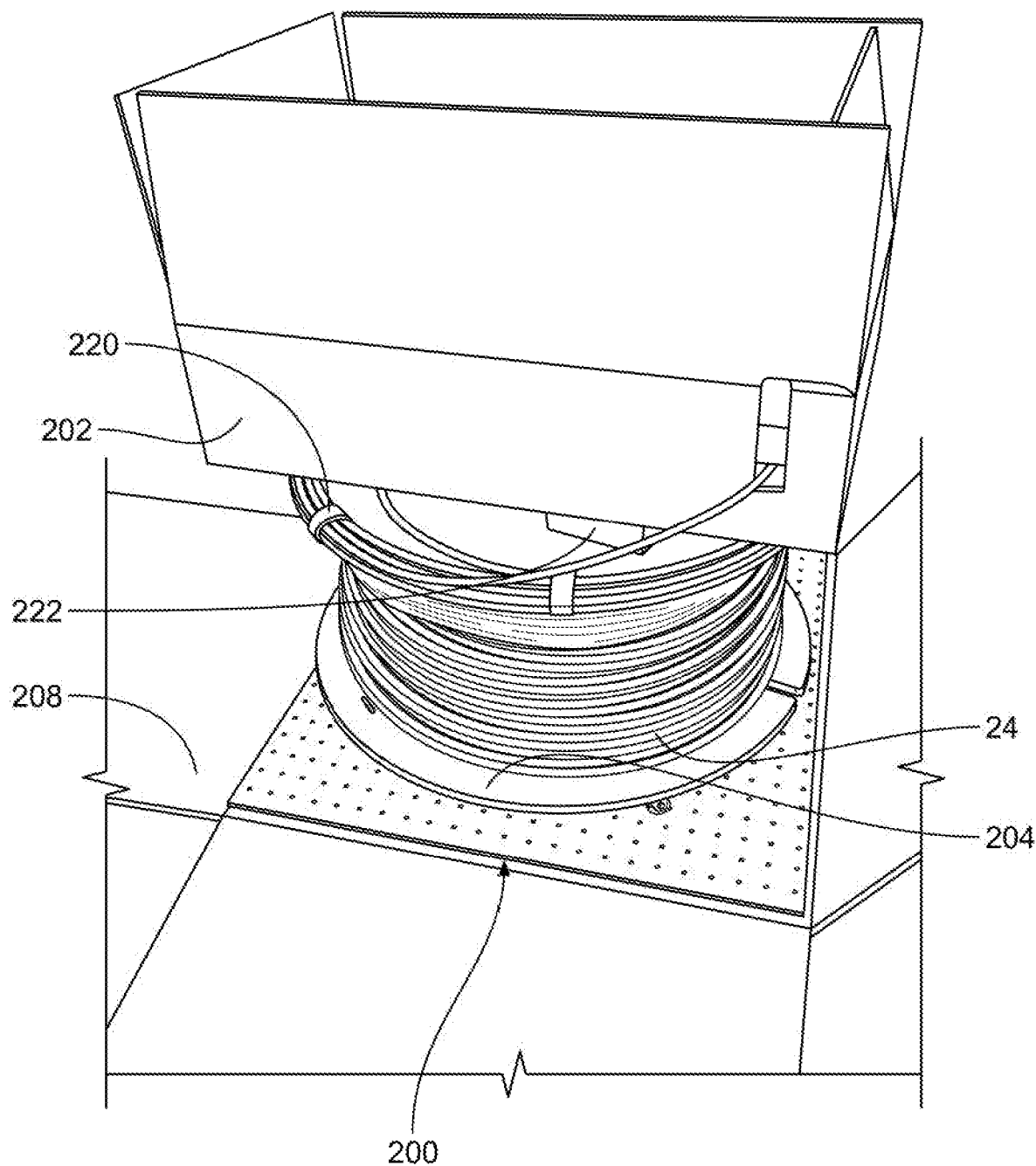
FIG. 37 illustrates the packaging assembly of FIG. 24 having been transported in an outer box and ready for deployment of the equipment.
Figure 38:
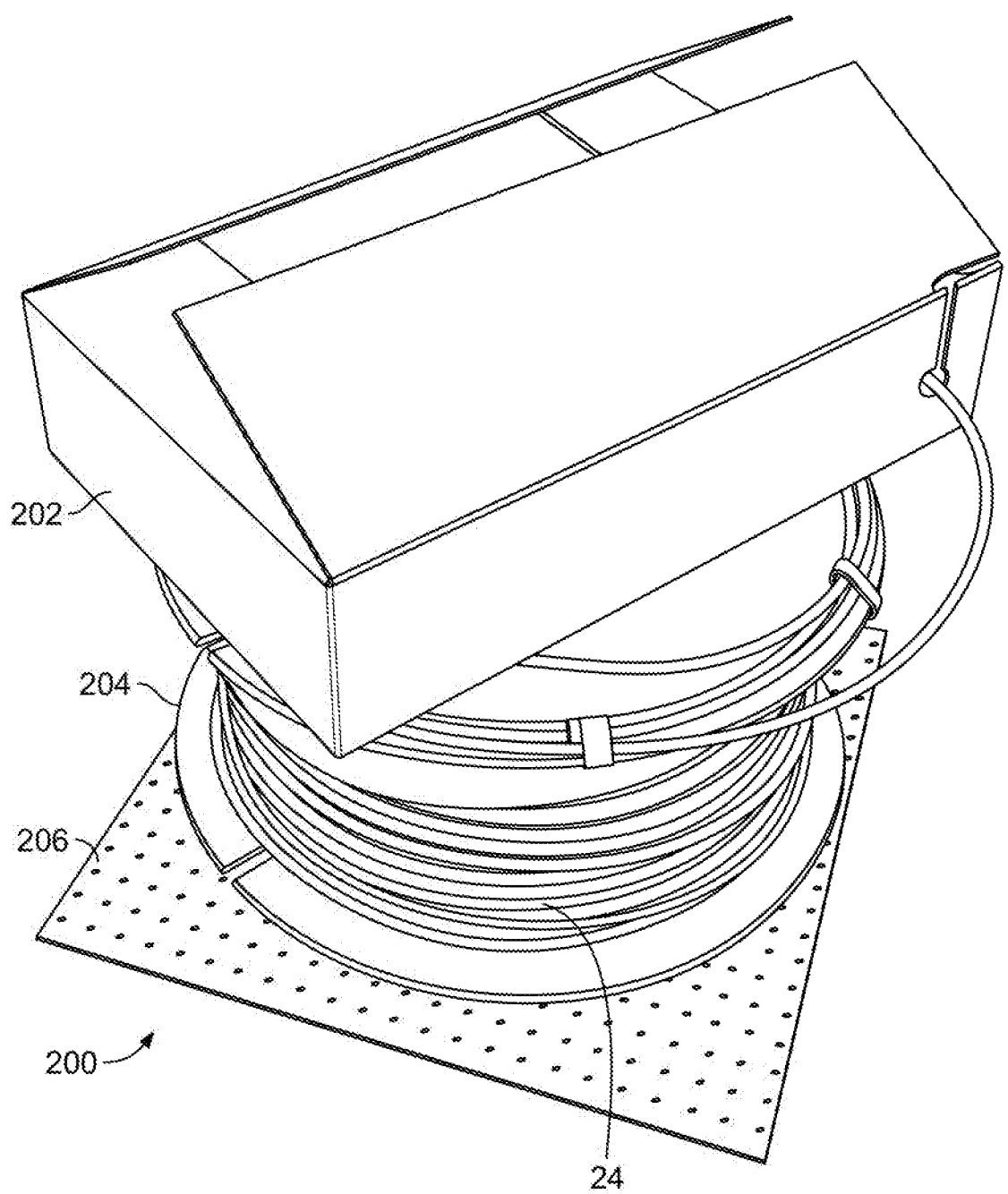
FIG. 38 illustrates the packaging assembly of FIG. 37 having been removed from the outer box.

It should be noted that the slots 216 provided around the perimeter of the upper flange 212 may be used to strap down the length of cabling 24 that is to be located at the top 218 of the upper flange 212, as shown in FIGS. 37-39.

Referring back to FIGS. 25-31, the upper flange 212 defines a T-shaped cutout 224 extending from an outer edge 226 of the upper flange 212 toward a central axis 228 defined by the spool 204. The cutout 224 is used for transitioning any cabling 24 from the top 218 of the upper flange 212 to a bottom 230 of the upper flange 212 toward the cable winding portion 210 of the spool 204.

Still referring to FIGS. 25-31, the lower flange 214 includes a plurality of wheel assemblies 232 at a bottom surface 234 thereof. The wheel assemblies 232 are provided around the perimeter thereof and are spaced apart evenly such that they are spaced apart at a similar angle with respect to the central axis 228 defined by the storage spool 204. In the depicted example, the lower flange 214 includes four equally spaced-apart wheel assemblies 232. Other numbers of wheel assemblies are contemplated depending upon the need. As will be discussed in further detail, the wheel assemblies 232 may be used to roll the cable spool 204 to a desired location in a telecommunications plant and may also be used to spin the cable spool 204 during unwinding of the cabling 24 from the cable winding portion 210. In the depicted embodiment, the wheel assemblies 232 are swivel-type assemblies for facilitating multi-directional movement of the cable spool 204, including rotation thereof.

As shown, the lower flange 214 also defines a central opening 236. The central opening 236 is used for accommodating a round post or mandrel type structure that can be used to guide rotation of the cable spool 204 during deployment of the cabling 24.

As discussed above and as illustrated in isolation in FIGS. 32-35, the base plate 206 that can be provided as part of the packaging assembly 200 may define such a post structure 240. The central post 240 extending upwardly from the base plate 206 is placed within the central opening 238 defined by the lower flange 214 during transport and during rotation of the cable spool 204.

Thus, the base plate 206, which can be placed in the same box 208 as the cable spool 204 during transport, can essentially later be used as an unwinding tool for supporting rotation of the cable spool 204 during deployment.

During the initial set-up of the packaging assembly 200 for transport, the telecommunications equipment 202 or the box carrying such equipment 202 is placed on the top 218 of the upper flange 212, as shown in FIG. 36. As discussed above, pieces of foam 222 may be provided between the equipment 202 and the upper flange 212 for cushioning and spacing. A certain amount of cabling 24 extending from the equipment 202 is then wound around the pieces of foam 222 and placed on the top 218 of the upper flange 212, being strapped down with straps 220, as shown in FIGS. 37-39. The cabling 24 from the upper flange 212 is then inserted through the cutout 224 and positioned within the cable winding region 210 of the spool 204. At that point, the cabling 24 is wound around the winding region 210, positioning the cabling 24 closest to the telecommunications equipment 202 on the inside. When the cable 24 is fully reeled, the assembly 200, with the base plate 206, is placed in a box 208 and is transported. The box 208 can be seen in FIG. 37 in an opened configuration.

An example deployment operation using the packaging assembly 200 of the present disclosure is illustrated in FIGS. 37-43. FIG. 43 specifically illustrates the installation instructions that might be provided to a customer to be used for installing a piece of telecommunications equipment 202 with the packaging assembly 200 of the present disclosure.

During deployment, once an outer box 208 housing the assembly 200 has been opened, the cable spool 204 with the equipment 202 on top 218 thereof may be lifted from the base plate 206 and wheeled to a desired location such as a predetermined telecommunications rack. Once the cable spool 204 has been lifted off the post 240 of the base plate 206, the wheels 232 facilitate movement of the cable spool 204 with the equipment 202 on top 218 to the appropriate location within a plant.

Once the equipment 202 arrives at the desired location, the straps 220 may be removed from the upper flange 212 and the equipment 202 mounted on a desired rack. Since the cabling 24 was initially wound from inside toward the outside, the extra length of cabling 24 that was previously located on top 218 of the upper flange 212 between the equipment 202 and the flange 212 is used as slack cabling during lifting of the equipment 202 and placement on a rack.

Alternatively, as shown in FIGS. 37-43, the cable 24 can be unwound from the spool 204 first before the equipment 202 is lifted off the spool structure 204.

For unwinding the cabling 24, the cable spool 204 may be placed on the base plate 206 with the post 240 entering the central opening 236. And, during unwinding, the wheels 232 facilitate rotation of the cable spool 204 relative to the base plate 206. The free end of the cabling 24 is pulled or deployed until the cabling 24 is completely unwound When the cabling 24 is fully unwound, the cabling 24 is passed through the cutout 224 toward an exterior of the cable spool 204 and completely removed from the spool 204, as shown in FIGS. 40-42. As noted above, once equipment 202 has been mounted, the free end of the cabling 24 may be spliced to cables incoming to the plant as needed.

It should be noted that customers may order the packaging assembly 200 with different lengths of cabling 24 as needed. For example, embodiments with 100 meters, 200 meters, 250 meters, or 300 meters of cabling 24 may be ordered as desired by the customers. Any unused length may be cut prior to the splicing operation.

It should also be noted that the lower flange 214 does not require the perimeter slots 216 and the T-shaped cutout 224 that is provided on the upper flange 212. However, for manufacturing efficiencies, similar flanges may be used for both the upper and lower flanges 212, 214, and the lower flange 214 may be illustrated with such construction in certain examples.

Although the packaging assembly 200 is provided with a base plate 206 that defines a mandrel or post type structure 240 that extends upwardly for supporting the cable spool 204 during rotation, in other embodiments, the cable spool 204 may be provided in isolation. And, other, free-standing mandrel type structures may be used for the rotation operation. For example, if a long mandrel type structure is going to be used, as shown, the upper flange 212 may also include a central opening similar to opening 236 of the lower flange 214 for accommodating such a structure.

Various modifications and alterations of this disclosure will become apparent to those skilled in the art without departing from the scope and spirit of this disclosure, and it should be understood that the inventive scope of this disclosure is not to be unduly limited to the illustrative embodiments set forth herein.

What is claimed is:

1. A packaging assembly for telecommunications modules comprising:
    a plurality of telecommunications modules provided in a stacked arrangement in a first container;
    a plurality of telecommunications modules provided in a stacked arrangement in an adjacent second container; and
    a removable radius limiter including a spool having a curved surface and a planar support wall with at least one mounting clip, the at least one mounting clip defining a retaining surface extending parallel to the support wall, wherein the radius limiter includes cable management fingers extending away from the curved surface, wherein the radius limiter is mounted generally between the first and second containers for guiding fiber optic cabling extending from the telecommunications modules with minimum bend radius protection such that the radius limiter is configured to be slidably mounted to a sidewall of the first or the second container with a friction fit and the planar support wall of the radius limiter is configured to end between the plurality of telecommunications modules provided in the first container and the plurality of telecommunications modules provided in the second container, wherein, in the friction fit, a sidewall of the first or the second container is, or the sidewalls of the first and second containers are, received between the retaining surface and the planar support wall, wherein the spool of the radius limiter defines a longitudinal axis that is generally parallel to a module-insertion direction and wherein the planar support wall of the radius limiter is also generally parallel to the module-insertion direction, wherein the fiber optic cabling extending from the telecommunications module is guided around the spool of the radius limiter with minimum bend radius protection in a direction generally perpendicular to the module-insertion direction.

2. A packaging assembly according to claim 1, wherein the first and second containers are placed within an outer housing.

3. A packaging assembly according to claim 2, wherein the outer housing defines an opening for leading cables guided by the radius limiter out of the outer housing.

4. A packaging assembly according to claim 1, wherein the first and second containers are placed within a closure defining a closable interior and an exterior spool region positioned below the interior for wrapping the cabling extending from the modules, wherein the closure defines an opening for extending cabling from the interior to the exterior spool region.

5. A packaging assembly according to claim 4, wherein the closure includes a removable cover.

6. A packaging assembly according to claim 1, wherein the cabling of half the modules mounted within one of the containers crosses over the cabling of the other half of the modules when being led around the radius limiter, such that half the cables are guided around a first side of the radius limiter while the other half of the cables are routed around an opposite second side of the radius limiter.

7. A method of packaging a plurality of telecommunications modules each terminated to an end of a cable broken out from bulk cabling, the method comprising:
  inserting the plurality of modules in an insertion direction into a container such that the modules are provided in a stacked arrangement in the container with the cable ends all facing outwardly in the same direction, wherein the container includes a first container holding a plurality of modules and an adjacent second container holding a plurality of modules;
  removably mounting a radius limiter between the plurality of modules within the first container and the plurality of modules within the second container; and
  routing all of the cables around a spool of the radius limiter that defines a curved surface for guiding all of the cables with bend radius protection and cable management fingers extending away from the curved surface, wherein the radius limiter further defines a planar support wall with at least one mounting clip, the at least one mounting clip defining a retaining surface extending parallel to the support wall, wherein the radius limiter is slidably mounted to a sidewall of the first or the second container with a friction fit and the planar support wall of the radius limiter ends between the plurality of modules within the first container and the plurality of modules within the second container, wherein, in the friction fit, a sidewall of the first or the second container is, or the sidewalls of the first and second containers are, received between the retaining surface and the planar support wall, wherein the spool of the radius limiter defines a longitudinal axis that is generally parallel to the module-insertion direction and wherein the planar support wall of the radius limiter is also generally parallel to the module-insertion direction.

8. A method according to claim 7, further comprising placing the first and second containers within an outer housing that defines an opening for leading cables guided by the radius limiter out of the outer housing.

9. A method according to claim 7, further comprising placing the first and second containers within a closure defining a closable interior and an exterior spool region positioned below the interior for wrapping the cabling extending from the telecommunications modules, wherein the closure defines an opening for extending cabling from the interior to the exterior spool region.

10. A method according to claim 9, further comprising closing the closure with a cover after placement of the first and second containers therein.

11. A method according to claim 7, wherein the cabling of half the telecommunications modules mounted within the container crosses over the cabling of the other half of the telecommunications modules when being led around the radius limiter, such that half the cables are guided around a first side of the radius limiter while the other half of the cables are routed around an opposite second side of the radius limiter.

12. A method according to claim 7, further comprising winding the cables around the radius limiter before attaching the radius limiter to the container.

13. A radius limiter configured to be slidably mounted to a sidewall of a telecommunications packaging container with a friction fit, the radius limiter defining a spool having a curved surface and cable management fingers extending away from the curved surface for retaining cables around the spool, wherein the radius limiter defines a planar support wall with at least two mounting clips each defining a retaining surface extending parallel to the support wall, the mounting clips configured for mounting the radius limiter to the sidewall of the telecommunications packaging container.

14. A radius limiter according to claim 13, wherein each mounting clip has a U-shaped configuration in cooperation with the support wall that defines a pocket for receiving the sidewall of the telecommunications packaging container.

* * * * *